US011178406B2

(12) United States Patent
Komiya et al.

(10) Patent No.: US 11,178,406 B2
(45) Date of Patent: Nov. 16, 2021

(54) VIDEO COMPRESSION APPARATUS, ELECTRONIC APPARATUS, AND VIDEO COMPRESSION PROGRAM

(71) Applicant: NIKON CORPORATION, Tokyo (JP)

(72) Inventors: Daisaku Komiya, Tokyo (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/651,695

(22) PCT Filed: Sep. 27, 2018

(86) PCT No.: PCT/JP2018/036129
§ 371 (c)(1),
(2) Date: Jun. 10, 2020

(87) PCT Pub. No.: WO2019/065915
PCT Pub. Date: Apr. 4, 2019

(65) Prior Publication Data
US 2020/0304809 A1     Sep. 24, 2020

(30) Foreign Application Priority Data

Sep. 29, 2017   (JP) .............................. JP2017-192102

(51) Int. Cl.
*H04N 19/172* (2014.01)
*H04N 19/146* (2014.01)
(Continued)

(52) U.S. Cl.
CPC ......... *H04N 19/172* (2014.11); *H04N 19/146* (2014.11); *H04N 19/513* (2014.11); *H04N 19/85* (2014.11)

(58) Field of Classification Search
None
See application file for complete search history.

(56) References Cited

U.S. PATENT DOCUMENTS

2004/0028282 A1   2/2004 Kato et al.
2006/0023109 A1   2/2006 Mabuchi et al.
(Continued)

FOREIGN PATENT DOCUMENTS

GN    101360240 A    2/2009
GN    104272721 A    1/2015
(Continued)

OTHER PUBLICATIONS

Nov. 27, 2018 Search Report issued in International Patent Application No. PCT/JP2018/036129.
(Continued)

*Primary Examiner* — Christopher Braniff
(74) *Attorney, Agent, or Firm* — Oliff PLC

(57) ABSTRACT

A video compression apparatus includes: an acquisition unit configured to acquire video data including a plurality of frames outputted from an imaging element that has a first imaging region to image a subject and a second imaging region to image a subject and for which a first frame rate can be set for the first imaging region and a second frame rate higher than the first frame rate can be set for the second imaging region; and a compression unit configured to compress the video data acquired by the acquisition unit based on the first frame rate and the second frame rate.

10 Claims, 34 Drawing Sheets

(51) Int. Cl.
   *H04N 19/513*   (2014.01)
   *H04N 19/85*    (2014.01)

(56) References Cited

U.S. PATENT DOCUMENTS

| | | |
|---|---|---|
| 2010/0119156 A1 | 5/2010 | Noguchi et al. |
| 2013/0300905 A1 | 11/2013 | Mabuchi et al. |
| 2014/0104471 A1 | 4/2014 | Mabuchi et al. |
| 2015/0077590 A1* | 3/2015 | Kuriyama .......... H04N 5/37452 |
| | | 348/231.99 |
| 2015/0155325 A1 | 6/2015 | Mabuchi et al. |
| 2016/0112644 A1 | 4/2016 | Nishi |
| 2018/0122847 A1 | 5/2018 | Mabuchi et al. |

FOREIGN PATENT DOCUMENTS

| | | |
|---|---|---|
| JP | 2006-49361 A | 2/2006 |
| JP | 2006-324834 A | 11/2006 |
| JP | 2009-49979 A | 3/2009 |
| JP | 2014-165855 A | 9/2014 |
| WO | 2013/164915 A1 | 11/2013 |
| WO | 2014/192152 A1 | 12/2014 |

OTHER PUBLICATIONS

Feb. 3, 2021 Office Action issued in Chinese Patent Application No. 201880065130.X.

Feb. 3, 2021 Search Report issued in Chinese Patent Application No. 201880065130.X.

* cited by examiner

VIDEO COMPRESSION APPARATUS, ELECTRONIC APPARATUS, AND VIDEO COMPRESSION PROGRAM

CLAIM OF PRIORITY

The present application claims priority from Japanese patent application JP 2017-192102 filed on Sep. 29, 2017, the content of which is hereby incorporated by reference into this application.

BACKGROUND

The present invention relates to a video compression apparatus, an electronic apparatus, and a video compression program.

An electronic device has been suggested in which a backside illumination-type imaging chip and a signal processing chip are layered (hereinafter referred to as a layered imaging element) (see Japanese Unexamined Patent Application Publication No. 2006-49361). The layered imaging element is configured so that the backside illumination-type imaging chip and the signal processing chip are layered so that the former and the latter are connected via a micro bump for each predetermined region. However, if the layered imaging element has a plurality of imaging conditions that can be set within an imaging region, a frame imaged under the plurality of imaging conditions is outputted. The video compression of such a frame has been conventionally not considered.

SUMMARY

A video compression apparatus according to one aspect of the technology disclosed in the present application comprises: an acquisition unit configured to acquire video data including a plurality of frames outputted from an imaging element that has a first imaging region to image a subject and a second imaging region to image a subject and for which a first frame rate can be set for the first imaging region and a second frame rate higher than the first frame rate can be set for the second imaging region; and a compression unit configured to compress the video data acquired by the acquisition unit based on the first frame rate and the second frame rate.

A video compression apparatus according to another aspect of the technology disclosed in the present application is a video compression apparatus for compressing video data including a plurality of frames outputted from an imaging element that has a first imaging region to image a subject and a second imaging region to image a subject and for which a first frame rate can be set for the first imaging region and a second frame rate higher than the first frame rate can be set for the second imaging region, comprising: a generation unit configured to generate, with regard to the respective plurality of frames and based on difference data between the frame and the prediction frame for predicting the frame and the prediction frame, reference frames referred to by frames inputted temporally after the frame; and a motion compensation unit configured to execute a motion compensation on a specific reference frame among the plurality of reference frames generated by the generation unit using a frame among the plurality of frames that was imaged by the second frame rate.

An electronic apparatus according to one aspect of the technology disclosed in the present application comprises: an imaging element that has a first imaging region to image a subject and a second imaging region to image a subject and for which a first frame rate can be set for the first imaging region and a second frame rate higher than the first frame rate can be set for the second imaging region and that images the subject at frame rates set for the respective imaging regions to output a plurality of frames of video data; and a compression unit configured to compress the respective plurality of frames imaged by the imaging element based on the first frame rate and the second frame rate.

An electronic apparatus according to another aspect of the technology disclosed in the present application comprises: an imaging element that has a first imaging region to image a subject and a second imaging region to image a subject and for which a first frame rate can be set for the first imaging region and a second frame rate higher than the first frame rate can be set for the second imaging region and that images the subject at frame rates set for the respective imaging regions to output a plurality of frames of video data; a generation unit configured to generate, with regard to the respective plurality of frames and based on difference data between the frame and the prediction frame for predicting the frame and the prediction frame, a reference frame referred to by a frame inputted temporally after the frame; and a motion compensation unit configured to execute a motion compensation on a specific reference frame among the reference frames generated by the generation unit using a frame among the plurality of frames that was imaged by the second frame rate.

A video compression program according to one aspect of the technology disclosed in the present application is a video compression program that cause a processor to compress video data including a plurality of frames outputted from an imaging element that has a first imaging region to image a subject and a second imaging region to image a subject and for which a first frame rate can be set for the first imaging region and a second frame rate higher than the first frame rate can be set for the second imaging region; the video compression program causes the processor to execute: an acquisition processing to acquire the video data; and a compression processing to compress the video data acquired by the acquisition processing based on the first frame rate and the second frame rate.

A video compression program according to another aspect of the technology disclosed in the present application is a video compression program that cause a processor to compress video data including a plurality of frames outputted from an imaging element that has a first imaging region to image a subject and a second imaging region to image a subject and for which a first frame rate can be set for the first imaging region and a second frame rate higher than the first frame rate can be set for the second imaging region; the video compression program causes the processor to execute: a generation processing to generate, with regard to the respective plurality of frames and based on difference data between the frame and the prediction frame for predicting the frame as well as the prediction frame, a reference frame referred to by a frame inputted temporally after the frame; and a motion compensation processing to use a specific reference frame among the reference frames generated by the generation processing to execute the motion compensation on a frame imaged at the second frame rate among the plurality of frames.

DETAILED DESCRIPTION OF THE EMBODIMENT

<Configuration Example of Imaging Element>

First, the following section will describe a layered imaging element provided in an electronic device. It is noted that this layered imaging element is disclosed in Japanese Unexamined Patent Application Publication No. 2012-139026 previously applied by the applicant of this application. The electronic device is an imaging apparatus such as a digital camera or a digital video camera.

Figure 1:
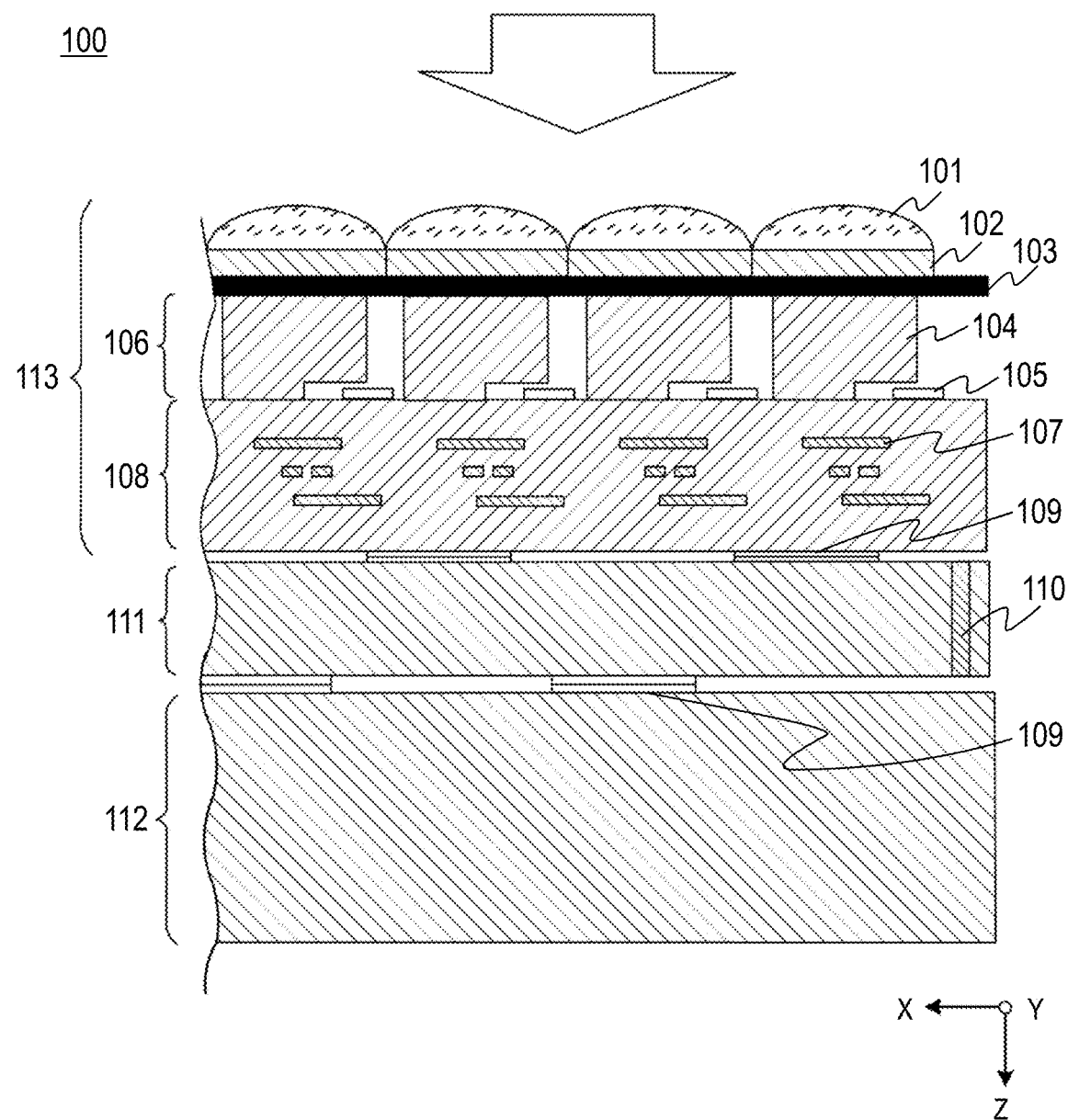
FIG. 1 is a cross-sectional view of a layered the imaging element.

FIG. 1 is a cross-sectional view of a layered the imaging element 100. The layered imaging element (hereinafter simply referred to as "imaging element") 100 includes a backside illumination-type imaging chip to output a pixel signal corresponding to incident light (hereinafter simply referred to as "imaging chip") 113, a signal processing chip 111 to process a pixel signal, and a memory chip 112 to store a pixel signal. The imaging chip 113, the signal processing chip 111, and the memory chip 112 are layered and are electrically connected by a bump 109 made of conductive material such as Cu.

As shown in FIG. 1, the incident light is inputted in a positive direction in the Z axis mainly shown by the outlined arrow. In this embodiment, the imaging chip 113 is configured so that a face to which the incident light is inputted is called a back face. As shown by the coordinate axes, a left direction orthogonal to Z axis when viewed on the paper is a positive X axis direction and a front direction orthogonal to the Z axis and the X axis when viewed on the paper is a positive Y axis direction. In some of the subsequent drawings, the coordinate axes are shown so as to show the directions of the drawings based on the coordinate axes of FIG. 1 as a reference.

One example of the imaging chip 113 is a backside illumination-type MOS (Metal Oxide Semiconductor) image sensor. A PD (photo diode) layer 106 is provided at the back face side of a wiring layer 108. The PD layer 106 is provided in a two-dimensional manner and has a plurality of PDs 104 in which the electric charge depending on the incident light is accumulated and transistors 105 provided to correspond to the PDs 104.

The side at which the PD layer 106 receives the incident light has color filters 102 via a passivation film 103. The color filters 102 have a plurality of types to allow light to be transmitted through wavelength regions different from one another. The color filters 102 have a specific arrangement corresponding to the respective PDs 104. The arrangement of the color filters 102 will be described later. A combination of the color filter 102, the PD 104, and the transistor 105 constitutes one pixel.

A side at which the color filter 102 receives the incident light has a microlens 101 corresponding to each pixel. The microlens 101 collects the incident light toward the corresponding PD 104.

The wiring layer 108 has a wiring 107 to transmit a pixel signal from the PD layer 106 to the signal processing chip 111. The wiring 107 may have a multi-layer structure or may include a passive element and an active element.

A surface of the wiring layer 108 has thereon a plurality of bumps 109. The plurality of bumps 109 are aligned with a plurality of bumps 109 provided on an opposing face of the signal processing chip 111. The pressurization of the imaging chip 113 and the signal processing chip 111 for example causes the aligned bumps 109 to be bonded to have an electrical connection therebetween.

Similarly, the signal processing chip 111 and the memory chip 112 have therebetween faces opposed to each other that have thereon a plurality of bumps 109. These bumps 109 are mutually aligned and the pressurization of the signal processing chip 111 and the memory chip 112 for example causes the aligned bumps 109 to be bonded to have an electrical connection therebetween.

The bonding between the bumps 109 is not limited to a Cu bump bonding by the solid phase diffusion and may use a micro bump coupling by the solder melting. One bump 109 may be provided relative to one block (which will be described later) for example. Thus, the bump 109 may have a size larger than the pitch of the PD 104. Surrounding regions other than a pixel region in which pixels are arranged may additionally have a bump larger than the bump 109 corresponding to the pixel region.

The signal processing chip 111 has a TSV (silicon through-electrode) 110 to provide the mutual connection among circuits provided on the top and back faces, respectively. The TSV 110 is preferably provided in the surrounding region. The TSV 110 also may be provided in the surrounding region of the imaging chip 113 and the memory chip 112.

Figure 2:
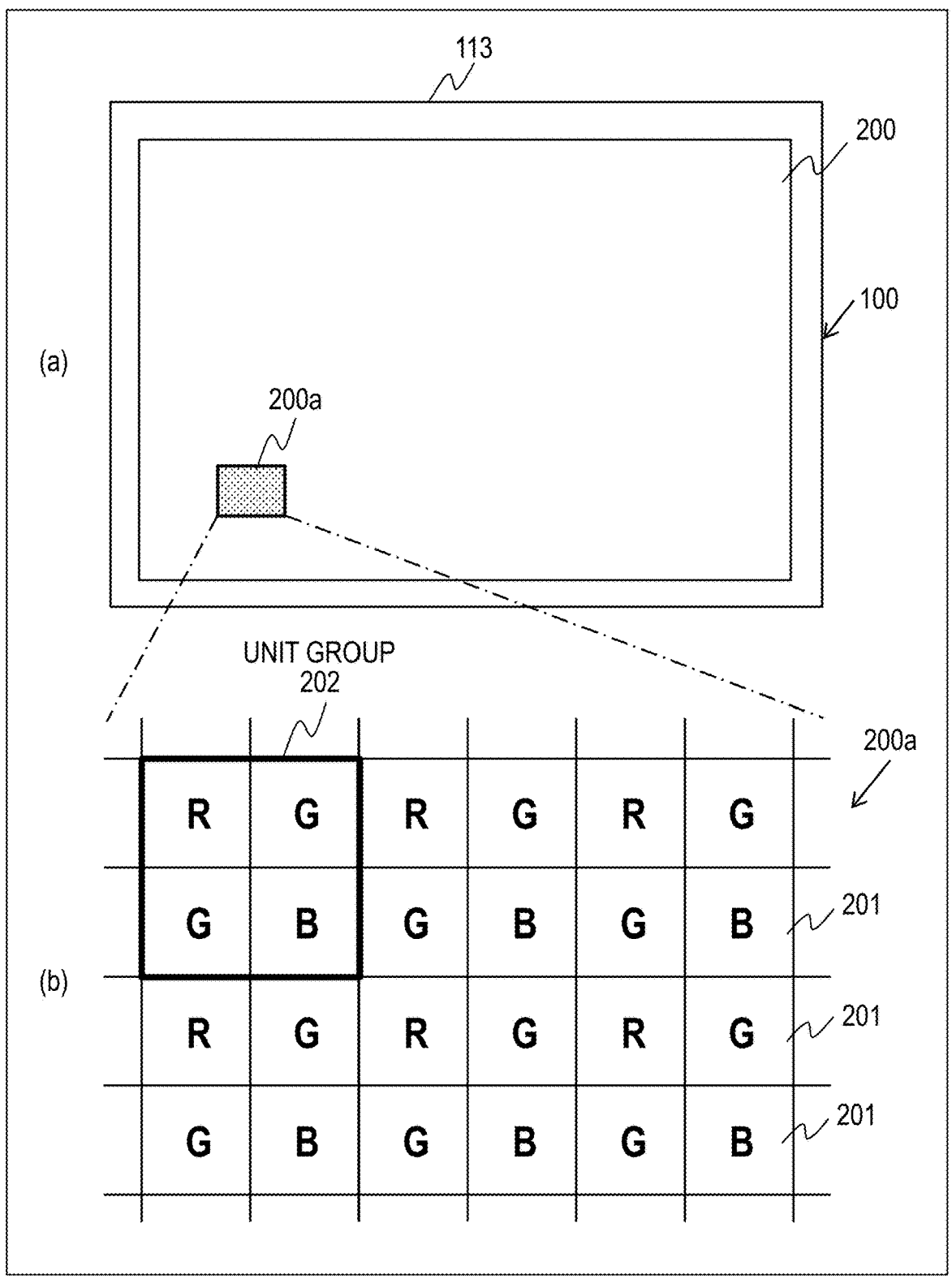
FIG. 2 illustrates the pixel arrangement of the imaging chip.

FIG. 2 illustrates the pixel arrangement of the imaging chip 113. In particular, (a) and (b) of FIG. 2 illustrate the imaging chip 113 observed from the back face side. In FIG. 2, (a) of FIG. 2 is a plan view schematically illustrating an imaging face 200 that is a back face of the imaging chip 113. In FIG. 2, (b) of FIG. 2 is an enlarged plan view illustrating a partial region 200a of the imaging face 200. As shown in (b) of FIG. 2, the imaging face 200 has many pixels 201 arranged in a two-dimensional manner.

The pixels 201 have color filter (not shown), respectively. The color filters consist of the three types of red (R), green (G), and blue (B). In (b) of FIG. 2, the reference numerals "R", "G", and "B" show the types of color filters owned by the pixels 201. As shown in (b) of FIG. 2, the imaging element 100 has the imaging face 200 on which the pixels 201 including the respective color filters as described above are arranged based on a so-called Bayer arrangement.

The pixel 201 having a red filter subjects red waveband light of the incident light to a photoelectric conversion to output a light reception signal (photoelectric conversion signal). Similarly, the pixel 201 having a green filter subjects green waveband light of the incident light to a photoelectric conversion to output a light reception signal. The pixel 201 having a blue filter subjects blue waveband light of the incident light to a photoelectric conversion to output a light reception signal.

The imaging element 100 is configured so that a unit group 202 consisting of the total of pixels 201 composed of 2 pixels×2 pixels adjacent to one another can be individually controlled. For example, when two unit groups 202 different from each other simultaneously start the electric charge accumulation, then one unit group 202 starts the electric charge reading (i.e., the light reception signal reading) after $1/30$ seconds from the start of the electric charge accumulation and the another unit group 202 starts the electric charge reading after $1/15$ seconds from the start of the electric charge accumulation. In other words, the imaging element 100 is configured so that one imaging operation can have a different exposure time (or an electric charge accumulation time or a so-called shutter speed) for each unit group 202.

The imaging element 100 also can set, in addition to the above-described exposure time, an imaging signal amplification factor (a so-called ISO sensibility) that is different for each unit group 202. The imaging element 100 can have, for each unit group 202, a different timing at which the electric charge accumulation is started and/or a different timing at which the light reception signal is read. Specifically, the imaging element 100 can have a different video imaging frame rate for each unit group 202.

In summary, the imaging element 100 is configured so that each unit group 202 has different imaging conditions such as the exposure time, the amplification factor, or the frame rate. For example, a reading line (not shown) to read an imaging signal from a photoelectric conversion unit (not shown) owned by the pixel 201 is provided for each unit group 202 and an imaging signal can be read independently for each unit group 202, thereby allowing each unit group 202 to have a different exposure time (shutter speed).

An amplifier circuit (not shown) to amplify the imaging signal generated by the electric charge subjected to the photoelectric conversion is independently provided for each unit group 202. The amplification factor by the amplifier circuit can be controlled independently for each amplifier circuit, thereby allowing each unit group 202 to have a different signal amplification factor (ISO sensibility).

The imaging conditions that can be different for each unit group 202 may include, in addition to the above-described imaging conditions, the frame rate, a gain, a resolution (thinning rate), an addition line number or an addition row number to add pixel signals, the electric charge accumulation time or the accumulation number, and a digitization bit number for example. Furthermore, a control parameter may be a parameter in an image processing after an image signal is acquired from a pixel.

Regarding the imaging conditions, the brightness (diaphragm value) of each unit group 202 can be controlled by allowing the imaging element 100 to include a liquid crystal panel having a zone that can be independently controlled for each unit group 202 (one zone corresponds to one unit group 202) so that the liquid crystal panel is used as a light attenuation filter that can be turned ON or OFF for example.

The number of the pixels 201 constituting the unit group 202 is not limited to the above-described 4 (or 2×2) pixels. The unit group 202 may have at least one pixel 201 or may include more-than-four pixels 201.

Figure 3:
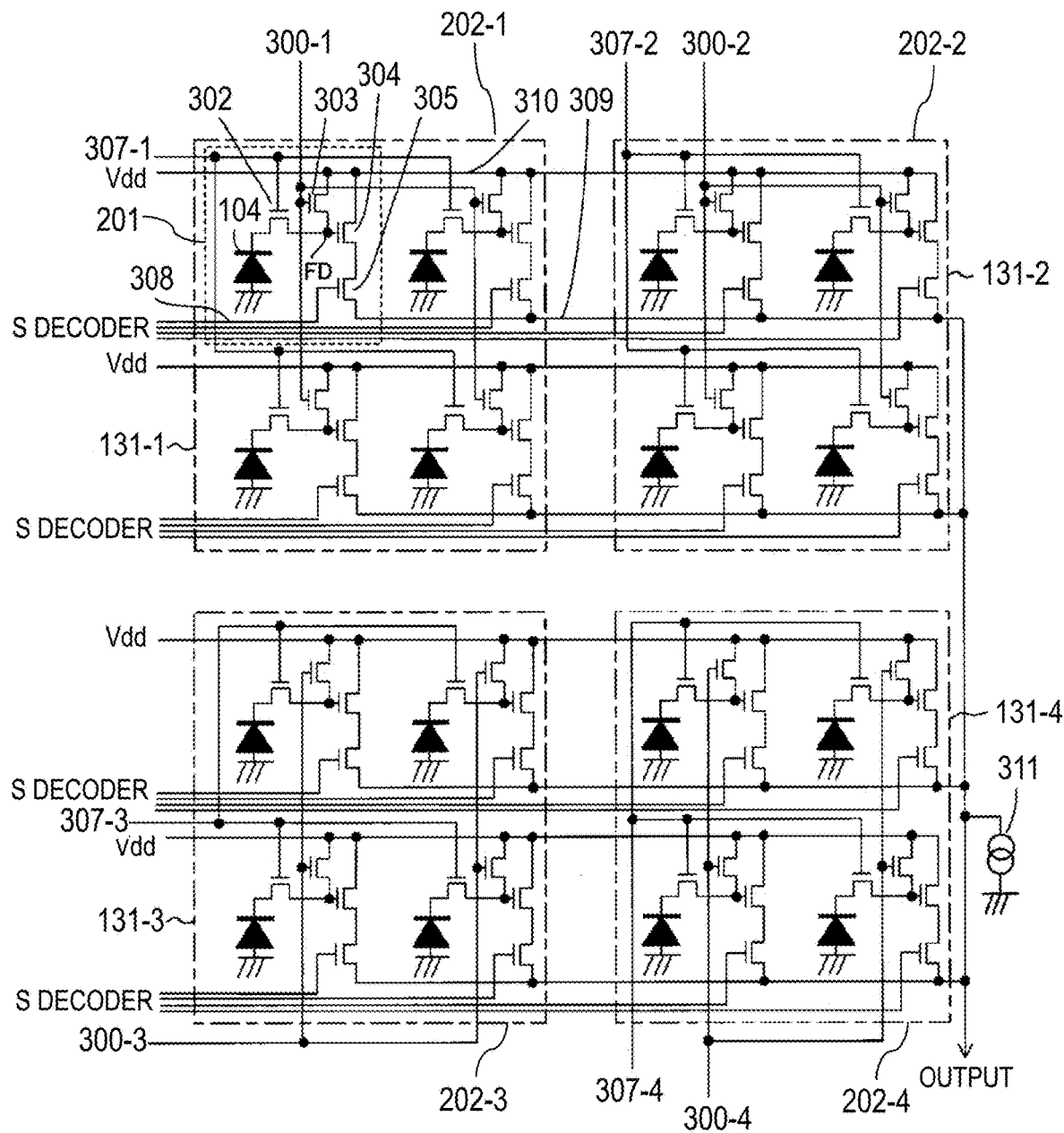
FIG. 3 is a circuit diagram illustrating the imaging chip.

FIG. 3 is a circuit diagram illustrating the imaging chip 113. In FIG. 3, a rectangle shown by the dotted line representatively shows a circuit corresponding to one pixel 201. A rectangle shown by a dashed line corresponds to one unit group 202 (202-1 to 202-4). At least a part of each transistor described below corresponds to the transistor 105 of FIG. 1.

As described above, the pixel 201 has a reset transistor 303 that is turned ON or OFF by the unit group 202 as a unit. A transfer transistor 302 of pixel 201 is also turned ON or OFF by the unit group 202 as a unit. In the example shown in FIG. 3, a reset wiring 300-1 is provided that is used to turn ON or OFF the four reset transistors 303 corresponding to the upper-left unit group 202-1. A TX wiring 307-1 is also provided that is used to supply a transfer pulse to the four transfer transistors 302 corresponding to the unit group 202-1.

Similarly, a reset wiring 300-3 is provided that is used to turn ON of OFF the four reset transistors 303 corresponding to the lower-left the unit group 202-3 so that the reset wiring 300-3 is provided separately from the reset wiring 300-1. A TX wiring 307-3 is provided that is used to supply a transfer pulse to the four transfer transistors 302 corresponding to the unit group 202-3 so that the TX wiring 307-3 is provided separately from the TX wiring 307-1.

An upper-right unit group 202-2 and a lower-right unit group 202-4 similarly have a reset wiring 300-2 and a TX wiring 307-2 as well as a reset wiring 300-4 and a TX wiring 307-4 that are provided in the respective unit groups 202.

The 16 PDs 104 corresponding to each pixel 201 are connected to the corresponding transfer transistors 302, respectively. The gate of each transfer transistor 302 receives a transfer pulse supplied via the TX wiring of each unit group 202. The drain of each transfer transistor 302 is connected to the source of the corresponding reset transistor 303. A so-called floating diffusion FD between the drain of the transfer transistor 302 and the source of the reset transistor 303 is connected to the gate of the corresponding amplification transistor 304.

The drain of each reset transistor 303 is commonly connected to a Vdd wiring 310 to which a supply voltage is supplied. The gate of each reset transistor 303 receives a reset pulse supplied via the reset wiring of each unit group 202.

The drain of each amplification transistor 304 is commonly connected to the Vdd wiring 310 to which a supply voltage is supplied. The source of each amplification transistor 304 is connected to the drain of the corresponding the selection transistor 305. The gate of each the selection transistor 305 is connected to a decoder wiring 308 to which a selection pulse is supplied. The decoder wirings 308 are provided independently for 16 selection transistors 305, respectively.

The source of each selection transistor 305 is connected to a common output wiring 309. A load current source 311 supplies a current to an output wiring 309. Specifically, the output wiring 309 to the selection transistor 305 is formed by a source follower. It is noted that the load current source 311 may be provided at the imaging chip 113 side or may be provided at the signal processing chip 111 side.

The following section will describe the flow from the start of the accumulation of the electric charge to the pixel output after the completion of the accumulation. A reset pulse is applied to the reset transistor 303 through the reset wiring of each unit group 202 and a transfer pulse is simultaneously applied the transfer transistor 302 through the TX wiring of each unit group 202 (202-1 to 202-4). Then, the PD 104 and a potential of the floating diffusion FD are reset for each unit group 202.

When the application of the transfer pulse is cancelled, each PD 104 converts the received incident light to electric charge to accumulate the electric charge. Thereafter, when a transfer pulse is applied again while no reset pulse is being applied, the accumulated electric charge is transferred to the floating diffusion FD. The potential of the floating diffusion FD is used as a signal potential after the accumulation of the electric charge from the reset potential.

Then, when a selection pulse is applied to the selection transistor 305 through the decoder wiring 308, a variation of the signal potential of the floating diffusion FD is transmitted to the output wiring 309 via the amplification transistor 304 and the selection transistor 305. This allows the pixel signal corresponding to the reset potential and the signal potential to be outputted from the unit pixel to the output wiring 309.

As described above, the four pixels forming the unit group 202 have common reset wiring and TX wiring. Specifically, the reset pulse and the transfer pulse are simultaneously applied to the four pixels within the unit group 202, respectively. Thus, all pixels 201 forming a certain unit group 202 start the electric charge accumulation at the same timing and complete the electric charge accumulation at the same timing. However, a pixel signal corresponding to the accumulated electric charge is selectively outputted from the output wiring 309 by sequentially applying the selection pulse to the respective selection transistors 305.

In this manner, the timing at which the electric charge accumulation is started can be controlled for each unit group 202. In other words, images can be formed at different timings among different unit groups 202.

Figure 4:
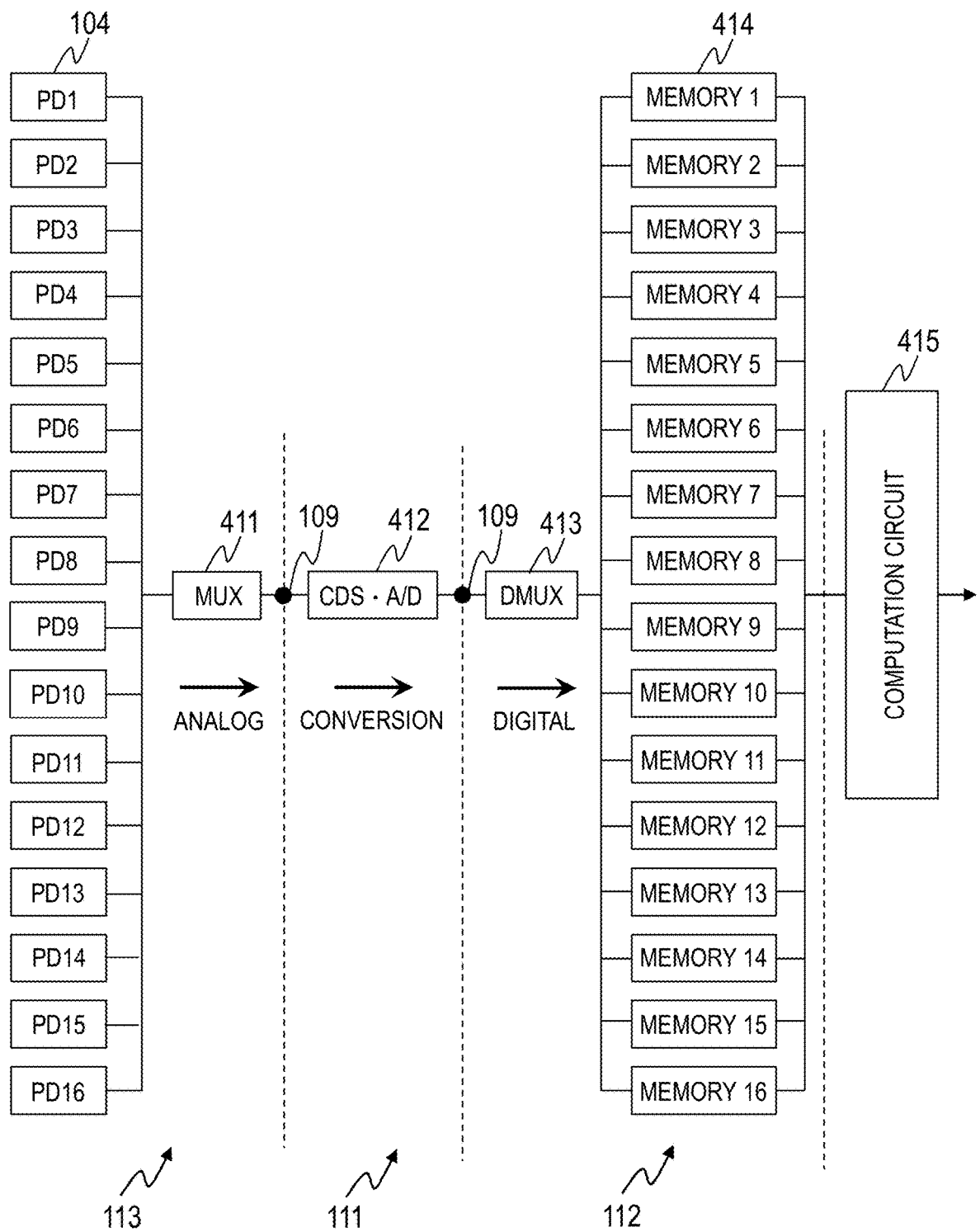
FIG. 4 is a block diagram illustrating an example of the functional configuration of the imaging element.

FIG. 4 is a block diagram illustrating an example of the functional configuration of the imaging element 100. An analog multiplexer 411 sequentially selects the sixteen PDs 104 forming the unit group 202 to output the respective pixel signals to the output wiring 309 provided to correspond to the unit group 202. The multiplexer 411 is formed in the imaging chip 113 together with the PDs 104.

The pixel signal outputted via the multiplexer 411 is subjected to the correlated double sampling (CDS) and the analog/digital (A/D) conversion performed by the signal processing circuit 412 formed in the signal processing chip 111. The A/D-converted pixel signal is sent to a demultiplexer 413 and is stored in a pixel memory 414 corresponding to the respective pixels. The demultiplexer 413 and the pixel memory 414 are formed in the memory chip 112.

A computation circuit 415 processes the pixel signal stored in the pixel memory 414 to send the result to the subsequent image processing unit. The computation circuit 415 may be provided in the signal processing chip 111 or may be provided in the memory chip 112. It is noted that FIG. 4 shows the connection of the four unit groups 202 but they actually exist for each of the four unit groups 202 and operate in a parallel manner.

However, the computation circuit 415 does not have to exist for each of the four unit groups 202. For example, one computation circuit 415 may provide a sequential processing while sequentially referring to the values of the pixel memories 414 corresponding to the respective four unit groups 202.

As described above, the output wirings 309 are provided to correspond to the respective unit groups 202. The imaging element 100 is configured by layering the imaging chip 113, the signal processing chip 111, and the memory chip 112. Thus, these output wirings 309 can use the electrical connection among chips using the bump 109 to thereby providing a wiring arrangement without causing an increase of the respective chips in the face direction.

<Block Configuration Example of Electronic Device>

Figure 5:
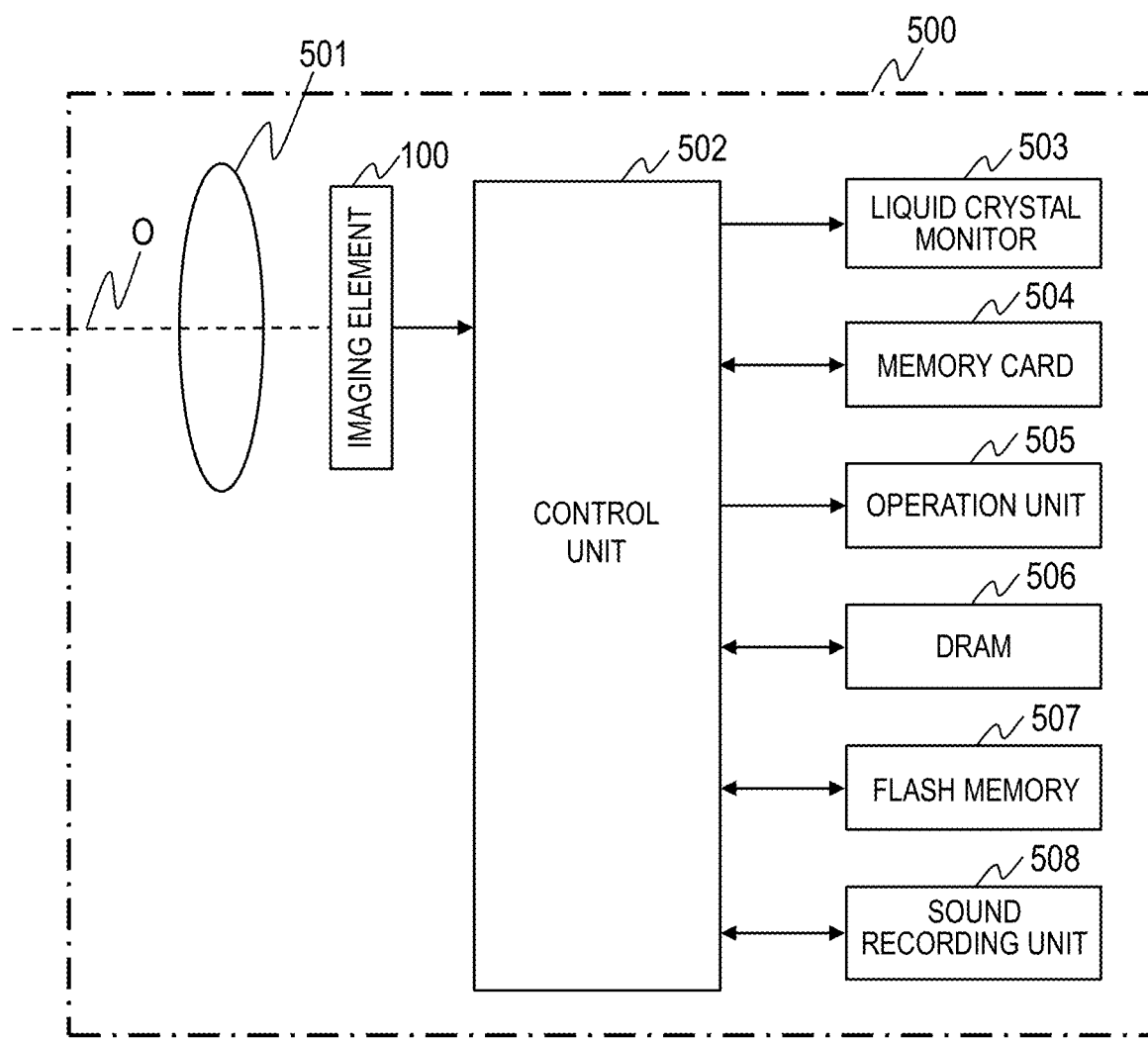
FIG. 5 illustrates the block configuration example of an electronic device.

FIG. 5 illustrates the block configuration example of an electronic device. An electronic device 500 is a lens integrated-type camera for example. The electronic device 500 includes an imaging optical system 501, an imaging element 100, a control unit 502, a liquid crystal monitor 503, a memory card 504, an operation unit 505, a DRAM 506, a flash memory 507, and a sound recording unit 508. The control unit 502 includes a compression unit for compressing video data as described later. Thus, a configuration in the electronic device 500 that includes at least the control unit 502 functions as a video compression apparatus.

The imaging optical system 501 is composed of a plurality of lenses and allows the imaging face 200 of the imaging element 100 to form a subject image. It is noted that FIG. 5 shows the imaging optical system 501 as one lens for convenience.

The imaging element 100 is an imaging element such as a CMOS (Complementary Metal Oxide Semiconductor) or a CCD (Charge Coupled Device) and images a subject image formed by the imaging optical system 501 to output an imaging signal. The control unit 502 is an electronic circuit to control the respective units of the electronic device 500 and is composed of a processor and a surrounding circuit thereof.

The flash memory 507, which is a nonvolatile storage medium, includes a predetermined control program written therein in advance. The control unit 502 reads the control program from the flash memory 507 to execute the control program to thereby control the respective units. This control program uses, as a work area, the DRAM 506 functioning as a volatile storage medium.

The liquid crystal monitor 503 is a display apparatus using a liquid crystal panel. The control unit 502 allows, at a predetermined cycle (e.g., 60/1 seconds), the imaging element 100 to form a subject image repeatedly. Then, the imaging signal outputted from the imaging element 100 is subjected to various image processings to prepare a so-called through image to display the through image on the liquid crystal monitor 503. The liquid crystal monitor 503 displays, in addition to the above through image, a screen used to set imaging conditions for example.

The control unit 502 prepares, based on the imaging signal outputted from the imaging element 100, an image file (which will be described later) to record the image file on the memory card 504 functioning as a portable recording medium. The operation unit 505 has various operation units such as a push button. The operation unit 505 outputs, depending on the operation of these operation members, an operation signal to the control unit 502.

The sound recording unit 508 is composed of a microphone for example and converts the environmental sound to an acoustic signal to input the resultant signal to the control unit 502. It is noted that the control unit 502 may record a video file not in the memory card 504 functioning as a portable recording medium but in a recording medium (not shown) included in the electronic device 500 such as a hard disk.

<Configuration Example of Video File>

Figure 6:
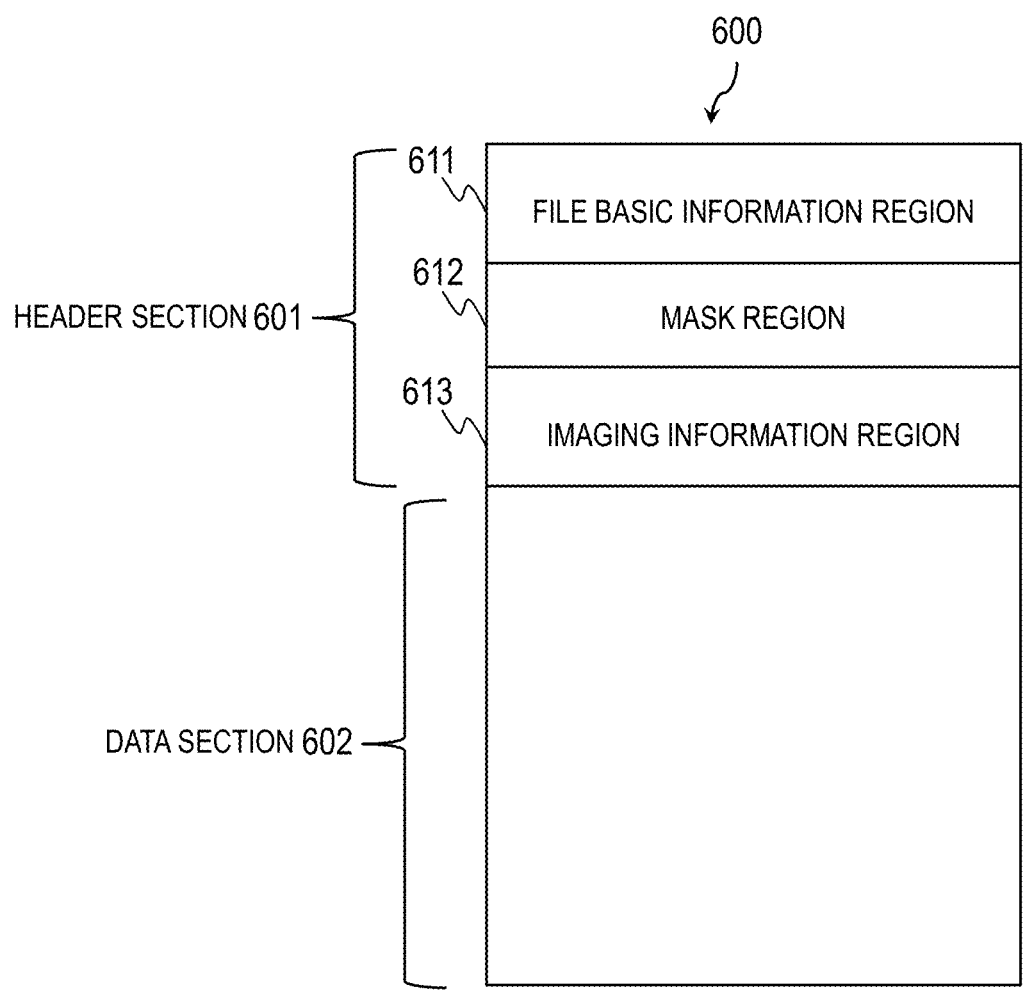
FIG. 6 illustrates a configuration example of a video file.

FIG. 6 illustrates a configuration example of a video file. A video file 600 is generated during the compression processing by a compression unit 902 (which will be described later) within the control unit 502 and is stored in the memory card 504, the DRAM 506, or the flash memory 507. The video file 600 is composed of two blocks of a header section 601 and a data section 602. The header section 601 is a block positioned at the top of the video file 600. The header section 601 includes therein a file basic information region 611, a mask region 612, and an imaging information region 613 stored in the above-described order.

The file basic information region 611 includes, for example, the records for the size or offset of the respective units within the video file 600 (e.g., the header section 601, the data section 602, the mask region 612, the imaging information region 613). The mask region 612 includes the records for imaging condition information and/or mask information (which will be described later) for example. The imaging information region 613 includes the record for imaging-related information such as the model name of the electronic device 500 or information for the imaging optical system 501 (e.g., information related to an optical characteristic such as aberration). The data section 602 is a block positioned at the rear side of the header section 601 and includes the record for the image information or acoustic information for example.

<Relation Between the Imaging Face and the Subject Image>

Figure 7:
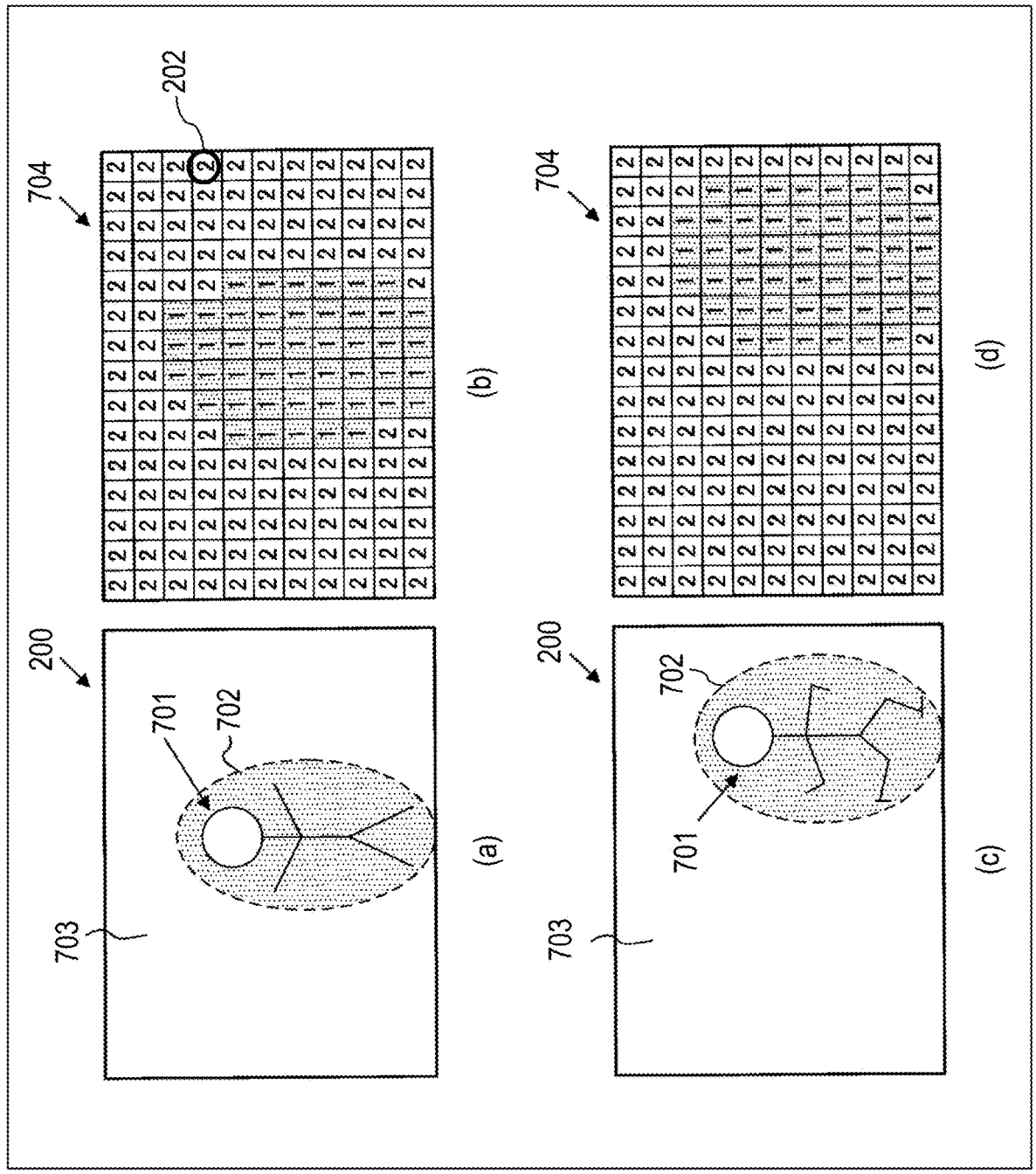
FIG. 7 illustrates the relation between an imaging face and a subject image.

FIG. 7 illustrates the relation between an imaging face and a subject image. In FIG. 7, (a) of FIG. 7 is a schematic view illustrating the imaging face 200 (imaging range) of the imaging element 100 and a subject image 701. In (a) of FIG. 7, the control unit 502 images the subject image 701. The imaging operation of (a) of FIG. 7 also may be used as an imaging operation performed to prepare a live view image (a so-called through image).

The control unit 502 subjects the subject image 701 obtained by the imaging operation of (a) of FIG. 7 to a predetermined image analysis processing. The image analysis processing is a processing to use a well-known subject detection technique (a technique to compute a feature quantity to detect a range in which a predetermined subject exists) for example to detect a main subject region and a background region. The image analysis processing causes the imaging face 200 to be divided to a main subject region 702 including a main subject and a background region 703 including the background.

It is noted that (a) of FIG. 7 shows that a region approximately including the subject image 701 is shown as the main subject region 702. However, the main subject region 702 may have a shape formed along the external form of the subject image 701. Specifically, the main subject region 702 may be set so as not to include images other than the subject image 701.

The control unit 502 sets different imaging conditions for each unit group 202 in the main subject region 702 and each unit group 202 in the background region 703. For example, a precedent unit group 202 is set to have a higher shutter speed than that of a subsequent unit group 202. This suppresses, in the imaging operation of (c) of FIG. 7 after the imaging operation of (a) of FIG. 7, the main subject region 702 from having image blur.

The control unit 502 is configured, when the influence by a light source such as sun existing in the background region 703 causes the main subject region 702 to have a backlight status, to set the unit group 202 of the former to have a relatively-high ISO sensibility or a lower shutter speed. The control unit 502 is also configured to set the unit group 202 of the latter to have a relatively-low ISO sensibility or a higher shutter speed. This can prevent, in the imaging operation of (c) of FIG. 7, the black defect of the main subject region 702 in the backlight status and the blown out highlights of the background region 703 having a high light quantity.

It is noted that the image analysis processing may be a processing different from the above-described processing to detect the main subject region 702 and the background region 703. For example, this processing may be a processing to detect a part of the entire imaging face 200 that has a brightness equal to or higher than a certain value (a part having an excessively-high brightness) or that has a brightness lower than the than a certain value (a part having an excessively-low brightness). When the image analysis processing is such a processing, the control unit 502 sets the shutter speed and/or the ISO sensibility so that the unit group 202 included in the former region has an exposure value (Ev value) lower than that of the unit group 202 included in another region.

The control unit 502 sets the shutter speed and/or the ISO sensibility so that the unit group 202 included in the latter region has an exposure value (Ev value) higher than that of the unit group 202 included in another region. This can consequently allow an image obtained through the imaging operation of (c) of FIG. 7 to have a dynamic range wider than the original dynamic range of the imaging element 100.

In FIG. 7, (b) of FIG. 7 shows one example of mask information 704 corresponding to the imaging face 200 shown in (a) of FIG. 7. The position of the unit group 202 belonging to the main subject region 702 stores therein "1" and the position of the unit group 202 belonging to the background region 703 stores therein "2", respectively.

The control unit 502 subjects the image data of the first frame to the image analysis processing to detect the main subject region 702 and the background region 703. This allows, as shown in (c) of FIG. 7, the frame obtained by the imaging operation of (a) of FIG. 7 to be divided to the main subject region 702 and the background region 703. The control unit 502 sets different imaging conditions for each unit group 202 in the main subject region 702 and each unit group 202 in the background region 703 to perform the imaging operation of (c) of FIG. 7 to prepare image data. An example of the resultant mask information 704 is shown in (d) of FIG. 7.

The mask information 704 of (b) of FIG. 7 corresponding to the imaging result of (a) of FIG. 7 and the mask information 704 of (d) of FIG. 7 corresponding to the imaging result of (c) of FIG. 7 are obtained by the imaging operations performed at different times (or have a time difference). Thus, these two pieces of the mask information 704 have different contents when the subject has moved or the user has moved the electronic device 500. In other words, the mask information 704 is dynamic information changing with the time passage. Thus, a certain unit group 202 has different imaging conditions set for the respective frames.

<Specific Example of the Video File>

Figure 8:
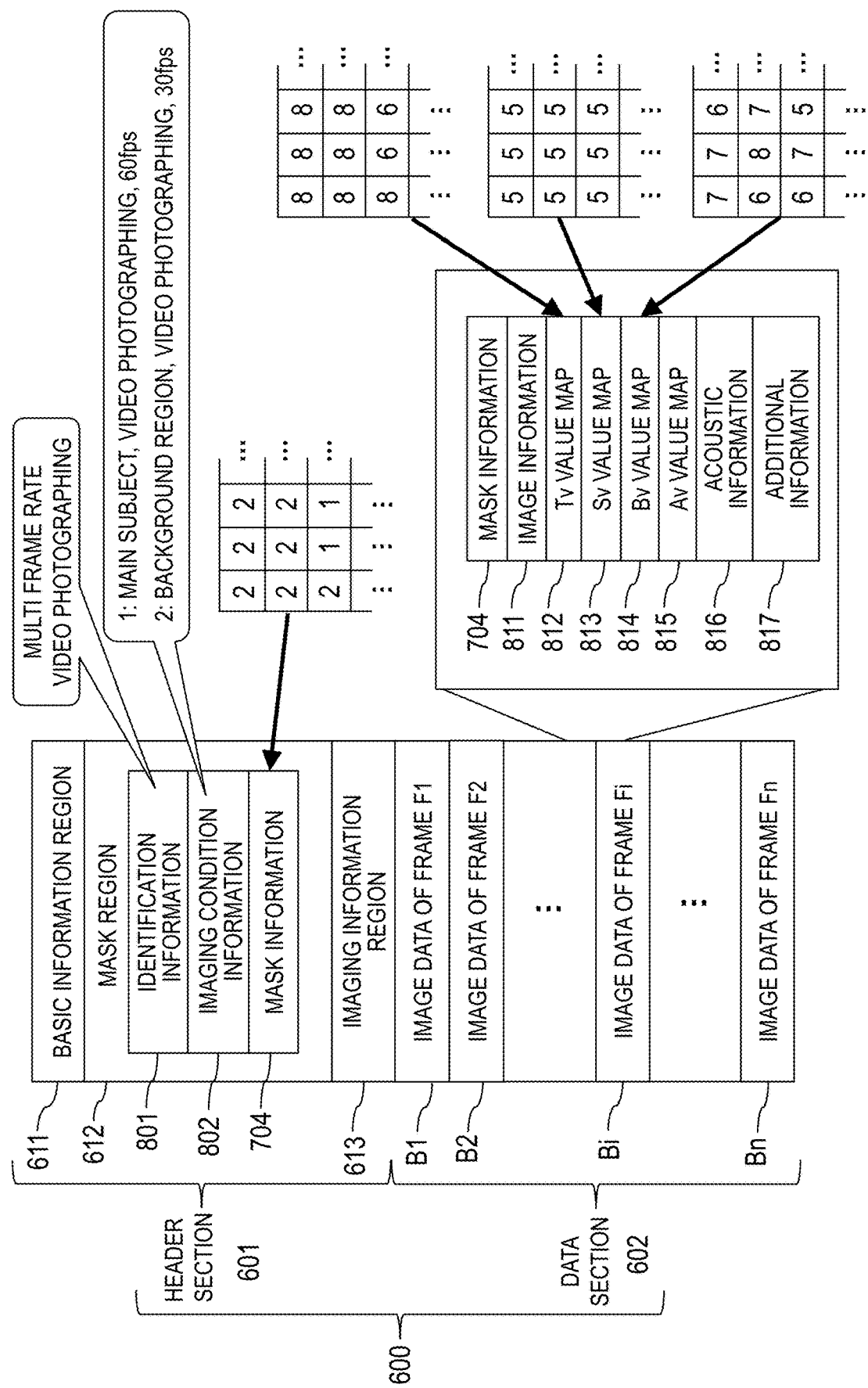
FIG. 8 illustrates a specific configuration example of the video file 600.

FIG. 8 illustrates a specific configuration example of the video file 600. The mask region 612 includes identification information 801, imaging condition information 802, and the mask information 704 recorded in above-described order.

The identification information 801 shows that this video file 600 is prepared by a multi frame rate video imaging function. The multi frame rate video imaging function is a function to use the imaging element 100 for which a plurality of frame rates is set to perform a video photographing operation.

The imaging condition information 802 is information showing what application (objective, role) is owned by the unit group 202. For example, as described above, when the imaging face 200 ((a) of FIG. 7) is divided to the main subject region 702 and the background region 703, the respective unit groups 202 belong to the main subject region 702 or the background region 703.

Specifically, the imaging condition information 802 is information that shows, in order to prepare this video file 600, that the unit group 202 has two applications of "the main subject region is subjected to a video imaging operation at 60 fps" and "the background region is subjected to the video imaging operation at 30 fps" for example and that shows the unique numbers applied to these applications. For example, the number "1" is applied to the application that "the main subject region is subjected to a video imaging operation at 60 fps" and the number 2 is applied to the application that "the background region is subjected to the video imaging operation at 30 fps", respectively.

The mask information 704 is information showing the applications (objectives, roles) of the respective unit groups 202. The mask information 704 is "information obtained by representing the number applied to the imaging condition information 802 as a two-dimensional map corresponding to the position of the unit group 202". Specifically, when the unit group 202 arranged in a two-dimensional manner is identified by the two-dimensional coordinate (x, y) based on two integers (x, y), the application of the unit group 202 existing at the position (x, y) is represented by the number existing at the position (x, y) of the mask information 704.

For example, when the number "1" exists at the coordinate (3,5) of the mask information 704, it can be understood that the unit group 202 positioned at the coordinate (3,5) has the application that "the main subject region is subjected to a video imaging operation at 60 fps". In other words, it can be understood that the unit group 202 positioned at the coordinate (3,5) belongs to the main subject region 702.

It is noted that the mask information 704 is dynamic information changing for each frame. Thus, the mask information 704 is recorded for each frame (i.e., for each data block Bi (which will be described later)) during the compression processing (not shown).

The data section 602 stores therein data blocks B1 to Bn as video data for each frame F (F1 to Fn) in an order of the imaging operations. The data block Bi (I is an integer for which 1 n is established) includes the mask information 704, image information 811, a Tv value map 812, an Sv value map 813, a By value map 814, an Av value information 815, acoustic information 816, and additional information 817.

The image information 811 is information obtained by using the imaging operation of (c) of FIG. 7 to record the imaging signal outputted from the imaging element 100 in a form prior to various image processings. The image information 811 is so-called RAW image data.

The Tv value map 812 is information obtained by representing the Tv value representing the shutter speed set for each unit group 202 so that the Tv value corresponds to the position of the unit group 202. For example, the shutter speed set for the unit group 202 positioned at the coordinate (x, y) can be distinguished by investigating the Tv value stored in the coordinate (x, y) of the Tv value map 812.

The Sv value map 813 is information obtained by representing the Sv value representing the ISO sensibility set for each unit group 202 as a two-dimensional map as in the Tv value map 812.

The By value map 814 is information obtained by representing the subject luminance measured for each unit group 202 during the imaging operation of (c) of FIG. 7 (i.e., the By value representing the luminance of the subject light entered each unit group 202) in the form of a two-dimensional map as in the Tv value map 812.

The Av value information 815 is information representing the diaphragm value during the imaging operation of (c) of FIG. 7. The Av value is not a value existing for each unit group 202, unlike the Tv value, the Sv value, and the By value. Thus, unlike the Tv value, the Sv value, and the By value, only one Av value is stored and the Av value is not information obtained by mapping a plurality of values in a two-dimensional manner.

In order to provide a smooth video reproduction, the acoustic information 816 is divided for each information piece corresponding to one frame and is multiplexed with the data block Bi and the resultant data is stored in the data section 602. It is noted that the acoustic information 816 may be multiplexed not for one frame but for a predetermined number of frames. It is noted that the acoustic information 816 is not always required to be included.

The additional information 817 is information obtained by representing, during the imaging operation of (c) of FIG. 7, the frame rate set for each unit group 202 in the form of a two-dimensional map. How to set the additional information 817 will be described later with reference to FIG. 14 and FIG. 15. It is noted that the additional information 817 may be retained in the frame F but also may be retained in the cache memory of the processor 1201 (which will be described later). When the compression processing is executed real-time in particular, the use of the cache memory is preferred from the viewpoint of a high processing.

As described above, the control unit 502 is configured to record in the memory card 504, by performing the imaging operation based on the multi frame rate video imaging function, the video file 600 in which the image information 811 generated by the imaging element 100 for which imaging conditions can be set for each unit group 202 and data regarding the imaging conditions for each unit group 202 (e.g., the imaging condition information 802, the mask information 704, the Tv value map 812, the Sv value map 813, the By value map 814) are associated.

The following section will describe an illustrative embodiment of the above-described video compression using the imaging element 100.

<Video Compression Example>

Figure 9:
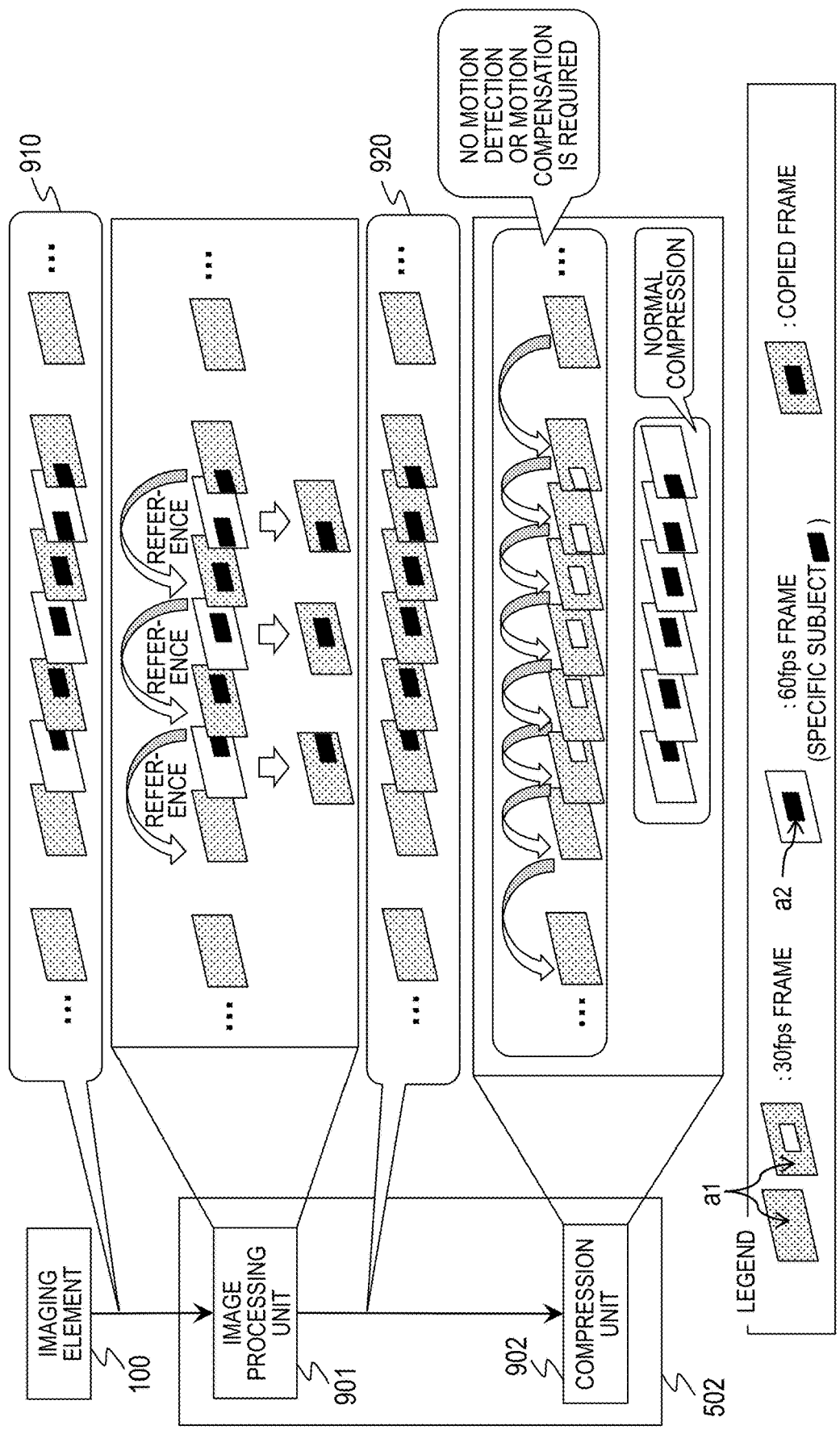
FIG. 9 illustrates a video compression example according to the illustrative embodiment 1.

FIG. 9 illustrates a video compression example according to the illustrative embodiment 1. The electronic device 500 has the above-described imaging element 100 and the control unit 502. The control unit 502 includes an image processing unit 901 and the compression unit 902. The imaging element 100 has a plurality of imaging regions to image a subject as described above. An imaging region is a collection of at least one or more pixels and is the above-described one or more unit groups 202. An imaging region can have a frame rate set for each unit group 202.

It is assumed that the first imaging region of the imaging region has the first frame rate (e.g., 30 [fps]) and the second imaging region other than the first imaging region has the second frame rate higher than the first frame rate (e.g., 60 [fps]). It is noted that the values of the first frame rate and the second frame rate are an example and may be other values so long as the second frame rate is higher than the first frame rate.

The imaging element 100 images a subject to output an image signal (which is shown in FIG. 9 as the first video data 910 including a plurality of frames for convenience) to the image processing unit 901. A frame includes therein a region of image data imaged by a certain imaging region of the imaging element 100. Such a region is called an image region. The first frame is a frame at least including the image data of the first image region a1 among the image data of the first image region a1 (halftone dot meshing) imaged at the first frame rate (30 [fps]) set for the first imaging region and the image data of the second image region a2 (black) imaged at the second frame rate (60 [fps]) set for the second imaging region.

Specifically, when no specific subject (railway train) is detected for example, the first frame is set as the first image region a1 for which the entire frame (scenery) is imaged at the first frame rate (30 [fps]). When a specific subject is detected, the first frame is configured so that a part of the entire frame obtained by imaging a specific subject (railway train) is set as the second image region a2 imaged at the second frame rate (60 [fps]) and the remaining part (scenery) is set as the first image region a1 imaged at the first frame rate (30 [fps]).

The second frame is the frame of the second image region a2 only imaged at the second frame rate (60 [fps]) set for the second imaging region.

For example, when a certain imaging region is composed of one unit group 202 (2×2 pixels), the corresponding image region also has the size of the unit group 202. Similarly, when a certain imaging region is composed of 2×2 unit groups 202 (4×4 pixels), the corresponding image region also has the size of the 2×2 unit groups 202.

In FIG. 9, a frame including the first image region a1 of the first video data 910 outputted from the imaging element 100 is set as the first frame and a frame including the specific subject image of a frame including the first image region a1 only is set as the second frame. It is noted that three or more imaging regions may be provided. In this case, imaging regions after the third imaging region can have a frame rate different from those of the first frame rate and the second frame rate.

The image processing unit 901 executes an image processing on video data (hereinafter referred to as the first video data) 910 inputted from the imaging element 100. Specifically, the image processing unit 901 refers to the first frame temporally prior to the second frame for example to copy the first frame to referred second frame (or synthesize the first frame). The synthesized frame is called the third frame. The third frame is a frame obtained by superimposing the specific subject image in the second frame on the subject image of the first frame. The image processing unit 901 outputs, to the compression unit 902, video data (hereinafter referred to as the second video data) 920 that includes the first frame imaged at 30 [fps] and the third frame as a synthesized frame.

The above-described the first video data 910 cannot be directly compressed by the compression unit 902. Thus, when a frame column includes the first frame and the second frame at the same time, the image processing unit 901 generates the second video data 920 that can be operated by the compression unit 902. This allows a general-purpose compression unit 902 to compress the second video data 920 as in the compression of normal video data by the compression unit 902.

The compression unit 902 compresses the second video data 920 inputted from the image processing unit 901. The compression unit 902 executes the compression by a hybrid coding obtained by combining, for example, a motion compensation inter-frame prediction (Motion Compensation: MC) and a discrete cosine conversion (Discrete Cosine Transform: DCT) with the entropy coding.

The compression unit 902 subjects the first image region a1 shown by the halftone dot meshing of the first frame and the third frame constituting the second video data 920 to a compression processing not requiring the motion detection or the motion compensation. The compression unit 902 compresses the second image region a2 of the specific subject image shown by black by the above-described hybrid coding. In this manner, the first image region a1 other than the specific subject image is not subjected to the motion detection or the motion compensation, thus achieving the reduced processing load of the video compression.

Figure 10:
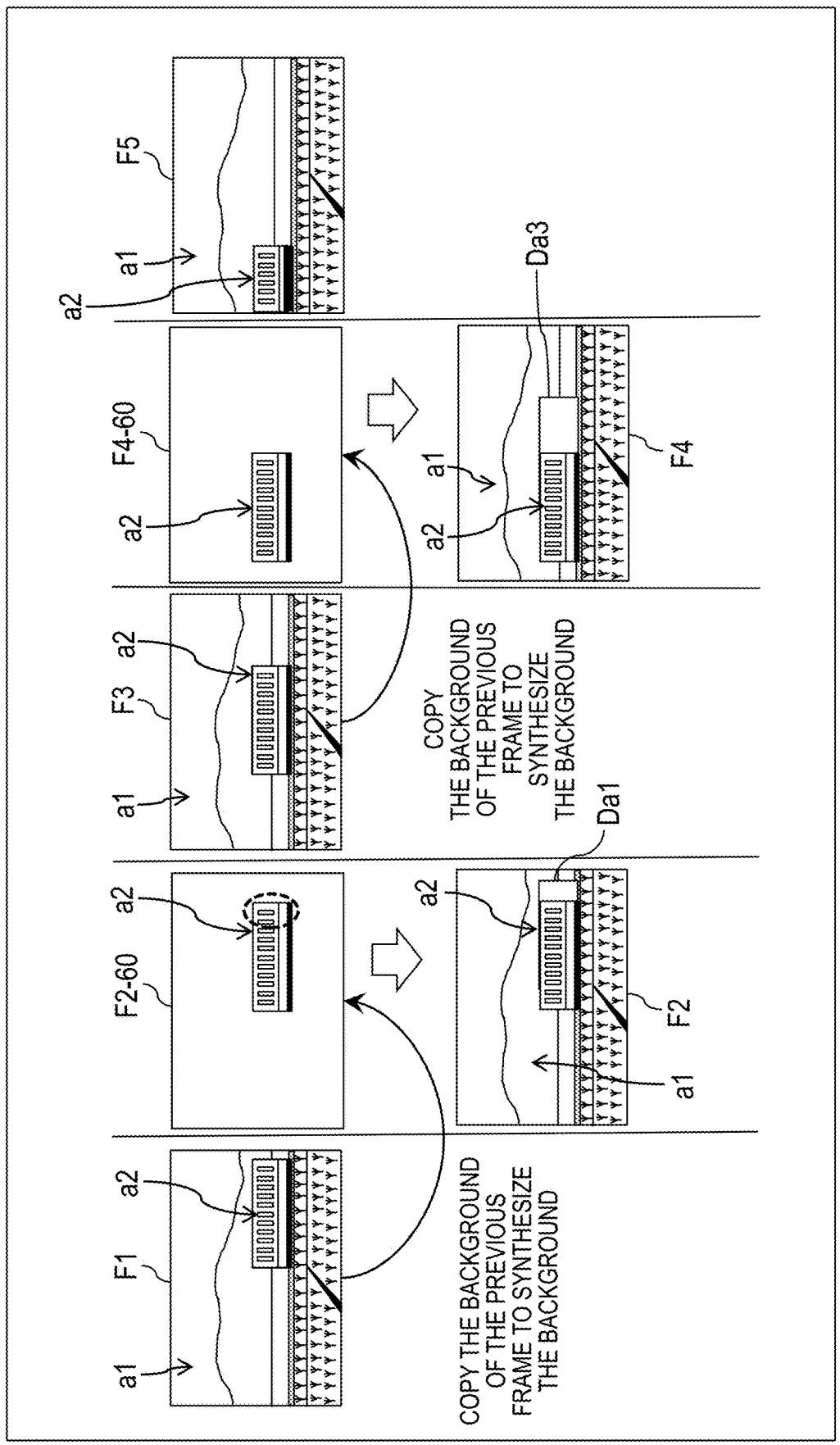
FIG. 10 illustrates an image processing example in the video compression shown in FIG. 9.

FIG. 10 illustrates an image processing example in the video compression shown in FIG. 9. In the image processing example 1, the electronic device 500 photographs a running railway train as a specific subject during a fixed point photographing operation of a scenery including a rice field, mountain, and sky. The railway train as a specific subject is identified by the above-described well-known subject detection technique. The photographed frames are frames F1, F2-60, F3, F4-60, and F5 in the order of time scales. It is assumed that the railway train runs within the frames F1, F2-60, F3, F4-60, and F5 from the right side to the left side.

The frames F1, F3, and F5 are the first frame that includes the image data of the first image region a1 obtained by imaging the first imaging region at the first frame rate of 30 [fps] and the image data of the second image region a2 obtained by imaging the second imaging region at the second frame rate of 60 [fps]. The frames F2-60 and F4-60 are the second frame including the image data of the second image region a2 obtained by imaging the second imaging region at the second frame rate of 60 [fps].

Specifically, the frames F1, F3, and F5 for example are the first frame in which the first image region a1 includes an image of the scenery including the rice field, mountain, and sky and the second image region a2 includes an image of the running railway train as a specific subject. The frames F2-60 and F4-60 are a frame in which the second image region a2 includes the image of the railway train. Specifically, the frames F1, F2-60, F3, F4-60, and F5 have the image data of the second image region a2 including the image of the railway train that is image data imaged in the second imaging region (60 [fps]). The frames F1, F3, and F5 have the image data of the first image region a1 including the image of the scenery that is image data imaged in the first imaging region (30 [fps]). The first imaging region is imaged at the first frame rate. Thus, nothing is imaged in the first image region a1 of the frames F2-60 and F4-60 imaged at the second frame rate.

The frames F1, F2-60, F3, and F4-60 . . . correspond the above-described first video data 910 and cannot be directly compressed by the compression unit 902. When a frame column includes the first frame and the second frame at the same time, the second video data 920 must be generated that can be operated by the compression unit 902.

The image processing unit 901 copies the image data of the second image region a2 of the frames F2-60 (railway train) on the image data of the first image region a1 of the frame F1 temporally previous to the frames F2-60 (the scenery excluding the railway train). This allows the image processing unit 901 to generate the frame F2 that is the third frame.

This operation is similarly performed on the frames F4-60. The image processing unit 901 copies the image data of the second image region a2 of the frames F4-60 (railway train) to the image data of the first image region a1 of the previous frame F3 (the scenery excluding the railway train) temporally previous to the frames F4-60. This allows the image processing unit 901 to generate the frame F4 as the third frame. Then, the image processing unit 901 outputs the second video data 920 including the frames F1-F5.

In this manner, the temporally-previous frames F1 and F3 of the first frame rate are interpolated into the image data of the first image region a1 of the frames F2-60 and F4-60 to thereby allow the first image region a1 to have the frames F1 and F2 having a difference of substantially 0 and to have the frames F3 and F4 having a difference of substantially 0. Thus, a frame column having the first frame and the second frame at the same time can be compressed by the conventional compression unit 902. Furthermore, the compression processing can have a reduced processing load.

It is noted that the image data of the first image region a1 of the frame F1 (the scenery excluding the railway train) is copied to the frame F2. Thus, a part of the frame F1 that was originally the second image region a2 (an end of the railway train) is not copied to the frame F2. Thus, the frame F2 has the range Da1 to which nothing is outputted.

Similarly, the image data of the first image region a1 of the frame F3 (the scenery excluding the railway train) is copied to the frame F4. Thus, a part of the frame F3 that was originally the second image region a2 (the end of the railway train) is not copied to the frame F4. Thus, the frame F4 has the range Da3 to which nothing is outputted.

In the illustrative embodiment 1, the ranges Da1 and Da3 may be painted by the image processing unit 901 with a specific color (e.g., white, black, or gray) or the surrounding pixels may be subjected to a demosaic processing. This can consequently reproduce the frames F2 and F4, . . . that can be subjected to the video compression and that can cause a reduced sense of incongruity.

Figure 11:
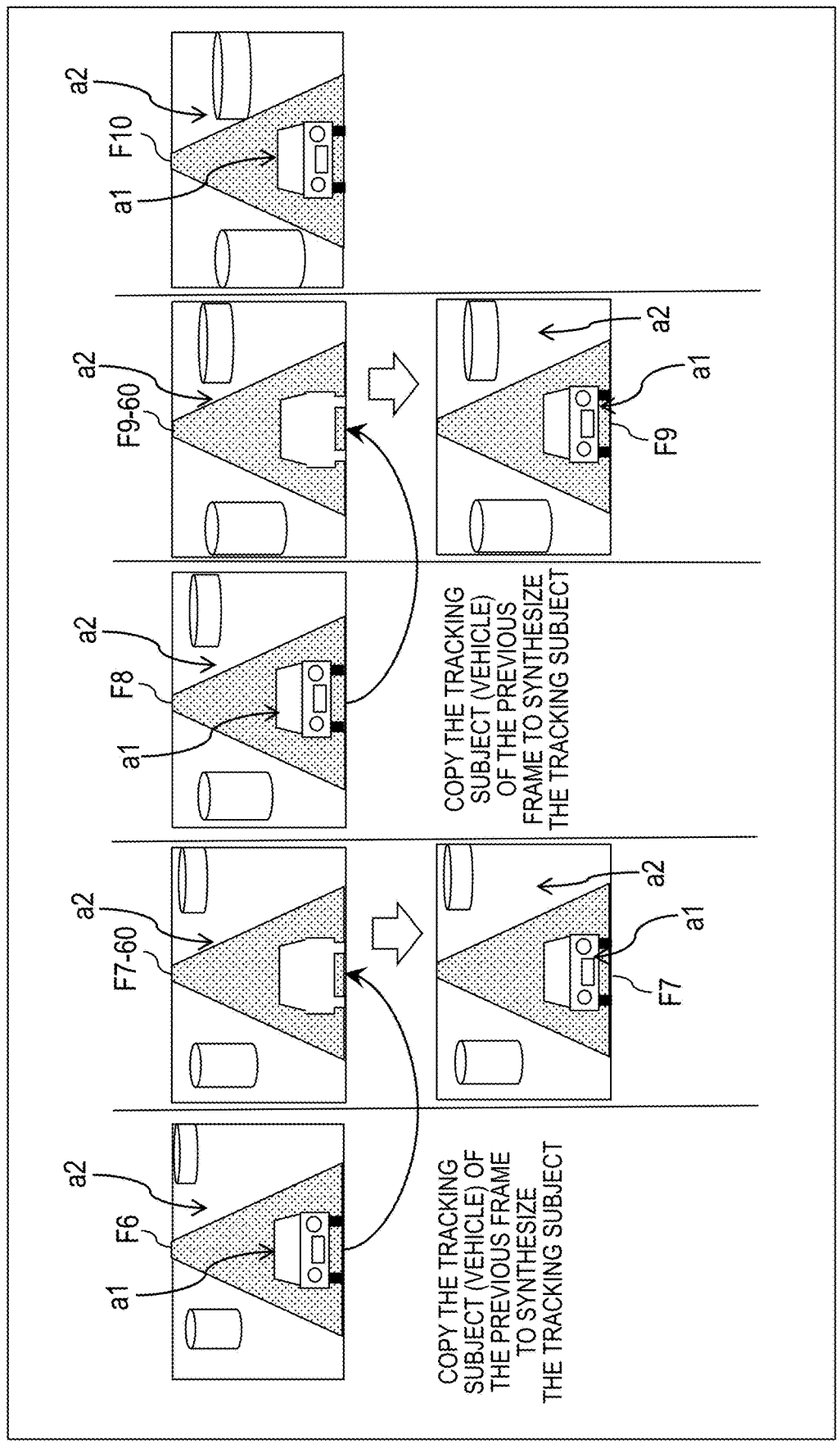
FIG. 11 illustrates the image processing example 2 in the video compression shown in FIG. 9.

FIG. 11 illustrates the image processing example 2 in the video compression shown in FIG. 9. In the image processing example 2, the electronic device 500 is a drive recorder for example and photographs a vehicle running at the front side (preceding vehicle) and the scenery. In this case, the preceding vehicle is a specific subject to be tracked and the scenery changes in accordance with the travel of the running vehicle. The photographed frame is the frames F6, F7-60, F8, F9-60, and F10 in the order of time scales.

The frames F6, F8, and F10 are the first frame that includes the image data of the first image region a1 imaged at the first frame rate of 30 [fps] and the image data of the second image region a2 imaged at the second frame rate of 60 [fps]. The frames F7-60 and F9-60 are the second frame in which the second imaging region includes the image data of the second image region a2 imaged at the second frame rate of 60 [fps].

Specifically, for example the frames F6, F8, and F10 are the first frame in which the preceding vehicle is imaged in the first image region a1 and a changing scenery is imaged in the second image region a2. The frames F7-60 and F9-60 are a frame in which the second image region a2 includes an image of the scenery. Specifically, the frames F6, F7-60, F8, F9-60, and F10 are configured so that the image data of the second image region a2 including the image of the scenery is image data imaged by the second imaging region (60 [fps]). The frames F6, F8, and F10 are configured so that the image data of the first image region a1 including the image of the preceding vehicle is image data imaged by the first imaging region (30 [fps]). The first imaging region is imaged at the first frame rate. Thus, nothing is imaged in the first image region a1 of the frames F7-60 and F9-60 imaged at the second frame rate.

The image processing unit 901 copies the image data of the second image region a2 of the frame F7-60 (scenery) to the image data of the first image region a1 (the preceding vehicle excluding the scenery) of the frame F6 temporally previous to the frame F7-60. This consequently allows the image processing unit 901 to generate the frame F7 as the third frame.

Similarly, the frame F9 is handled so that the image processing unit 901 copies the image data of the second image region a2 of the frame F9-60 (scenery) to the image processing unit 901 to the image data of the first image region a1 of the frame F8 temporally previous to the frame F9-60 (the preceding vehicle excluding the scenery). This consequently allows the image processing unit 901 to generate the frame F9 as the third frame. Then, the image processing unit 901 outputs the second video data 920 including the frames F6-F10.

In this manner, the temporally-previous frames F6 and F8 of the first frame rate are interpolated to the image data of the first image region a1 of the frames F7-60 and F9-60 to thereby allow the first image region a1 to have a difference of 0 between the frames F6 and F7, thus providing the difference of 0 between the frames F8 and F9. Thus, a frame column including the first frame and the second frame at the same time can be compressed using the conventional compression unit 902. The compression processing also can have a reduced processing load.

It is noted that the control unit 502 executes the compression processing of the second video data 920 as a real-time processing but also may execute the compression processing as a batch processing. For example, the control unit 502 may be configured so that the first video data 910 or the second video data 920 from the imaging element 100, a preprocessing unit 900, or the image processing unit 901 are once stored in the memory card 504, the DRAM 506, or the flash memory 507 to read, when there is a trigger issued automatically or by a user operation, the first video data 910 or the second video data 920 (or to read data obtained by subjecting, in the case of the first video data 910, the first video data 910 to the conversion to the second video data 920 by the image processing unit 901) to subject the resultant data to the compression processing by the compression unit 902.

<Configuration Example of the Control Unit 502>

Figure 12:
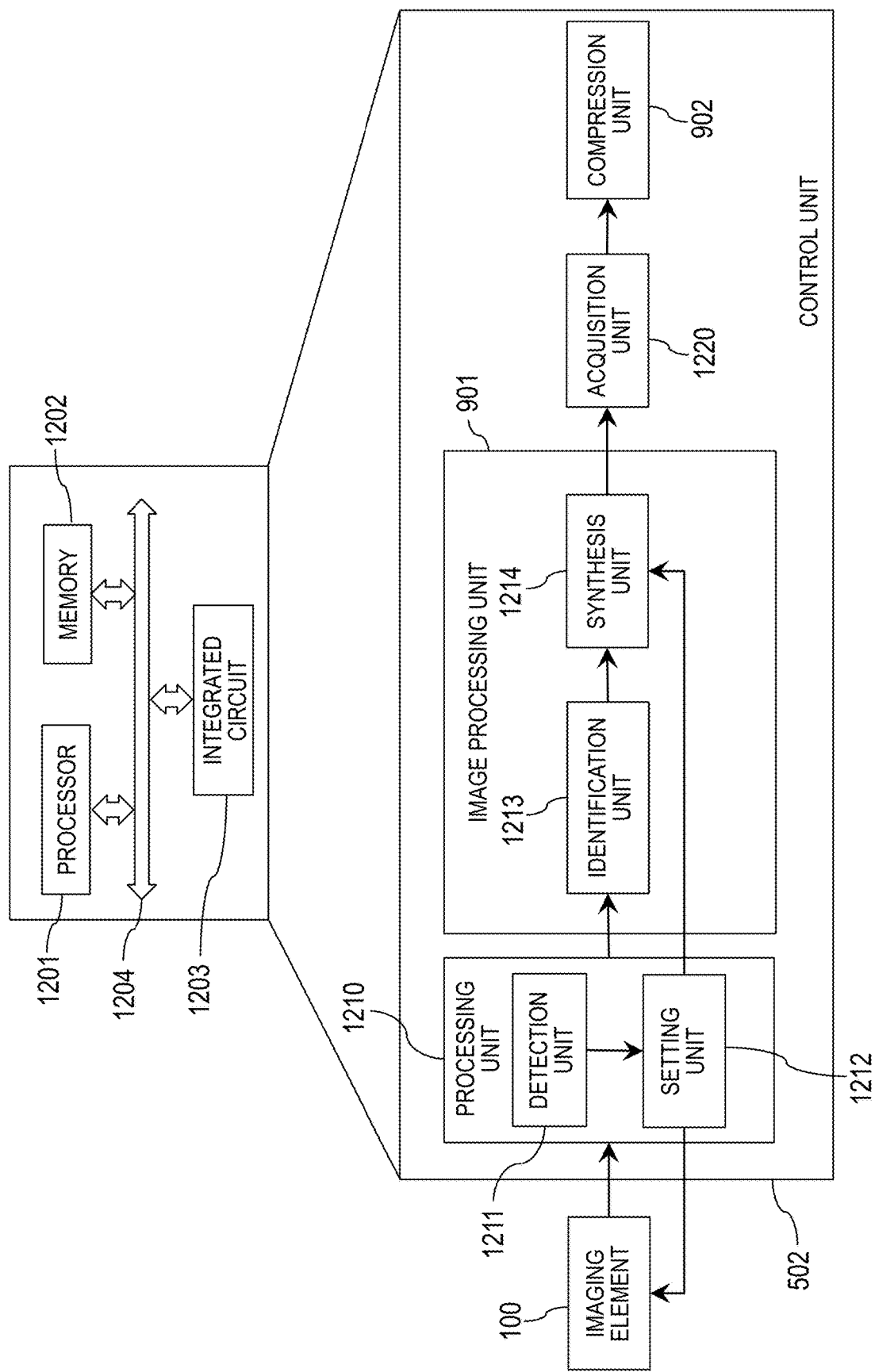
FIG. 12 is a block diagram illustrating a configuration example of the control unit shown in FIG. 5.

FIG. 12 is a block diagram illustrating a configuration example of the control unit 502 shown in FIG. 5. The control unit 502 has a preprocessing unit 1210, the image processing unit 901, an acquisition unit 1220, and the compression unit 902. The control unit 502 is composed of a processor 1201, a memory 1202, an integrated circuit 1203, and a bus 1204 providing the connection thereamong.

The preprocessing unit 1210, the image processing unit 901, the acquisition unit 1220, and the compression unit 902 may be realized by allowing a program stored in the memory 1202 to be executed by the processor 1201 or may be realized by the integrated circuit 1203 (e.g., ASIC (Application Specific Integrated Circuit) or FPGA (Field-Programmable Gate Array)). The processor 1201 may use the memory 1202 as a work area. The integrated circuit 1203 may use the memory 1202 as a buffer to temporarily retain various pieces of data including image data.

The preprocessing unit 1210 subjects the first video data 910 from the imaging element 100 to the preprocessing of the image processing by the image processing unit 901. Specifically, the preprocessing unit 1210 has a detection unit 1211 and a setting unit 1212 for example. The detection unit 1211 detects a specific subject by the above-described well-known subject detection technique.

The setting unit 1212 applies the additional information 817 to the respective frames constituting the first video data 910 from the imaging element 100. The setting unit 1212 changes the frame rate of an imaging region of the imaging face 200 of the imaging element 100 in which a specific subject is detected from the first frame rate (e.g., 30 [fps]) to the second frame rate (60 [fps]).

Specifically, the setting unit 1212 detects the motion vector of the specific subject from a difference between the imaging region in which a specific subject is detected in the input frame and an imaging region in which the specific subject of an inputted frame is detected for example to predict the imaging region of the specific subject at the next input frame. The setting unit 1212 outputs, to the imaging element 100, an instruction to change the frame rate for the predicted imaging region to the second frame rate.

The image processing unit 901 executes the image processing on the respective frames of the first video data 910 outputted from the preprocessing unit 1210. Specifically, the image processing unit 901 has an identification unit 1213 and a synthesis unit 1214.

The identification unit 1213 identifies a difference region between the second image region a2 corresponding to the second imaging region in the first frame and the second image region a2 corresponding to the second imaging region in the second frame based on the above-described first frame (e.g., the frame F1 of FIG. 10) and the above-described second frame (e.g., the frame F2-60 of FIG. 10) among a plurality of frames of the first video data 910. The difference region between the frame F1 and the frame F2-60 is used as the first image region a1 at the rear side of the railway train in the frame F2-60.

As shown in FIG. 9 to FIG. 11, the synthesis unit 1214 copies the first frame including the image data of the temporally-previous first image region a1 (e.g, the frame F1 of FIG. 10) to the second frame including the image data of the second image region a2 only (e.g., the frame F2-60 of FIG. 10) to synthesize the data to generate the third frame (e.g., the frame F2 of FIG. 10). It is noted that the synthesis unit 1214 copies, to the difference region (range Da1) identified by the identification unit 1213, the image data of the second image region a2 (the end part of the railway train) at the same position as that of the difference region of the first frame (see the circle shown by the dotted line of the frame F2-60 of FIG. 10). This can provide a difference of substantially 0 between the first frame and the third frame.

The acquisition unit 1220 retains the second video data 920 outputted from the image processing unit 901 in the memory 1202 and outputs, at a predetermined timing, a plurality of frames included in the second video data 920 one by one to the compression unit 90 in the order of time scales.

As shown in FIG. 9, the compression unit 902 compresses the inputted second video data 920. Specifically, the compression unit 902 subjects the image data of the first image region a1 of the first frame and the third frame constituting the second video data 920 to a compression processing not requiring a motion detection or a motion compensation and subjects the image data of the second image region a2 including an image of a specific subject to the compression using the above-described hybrid coding for example. As described above, regions other than the one including the specific subject image are not subjected to the motion detection or the motion compensation, thus reducing the video compression processing load.

<Configuration Example of the Compression Unit 902>

Figure 13:
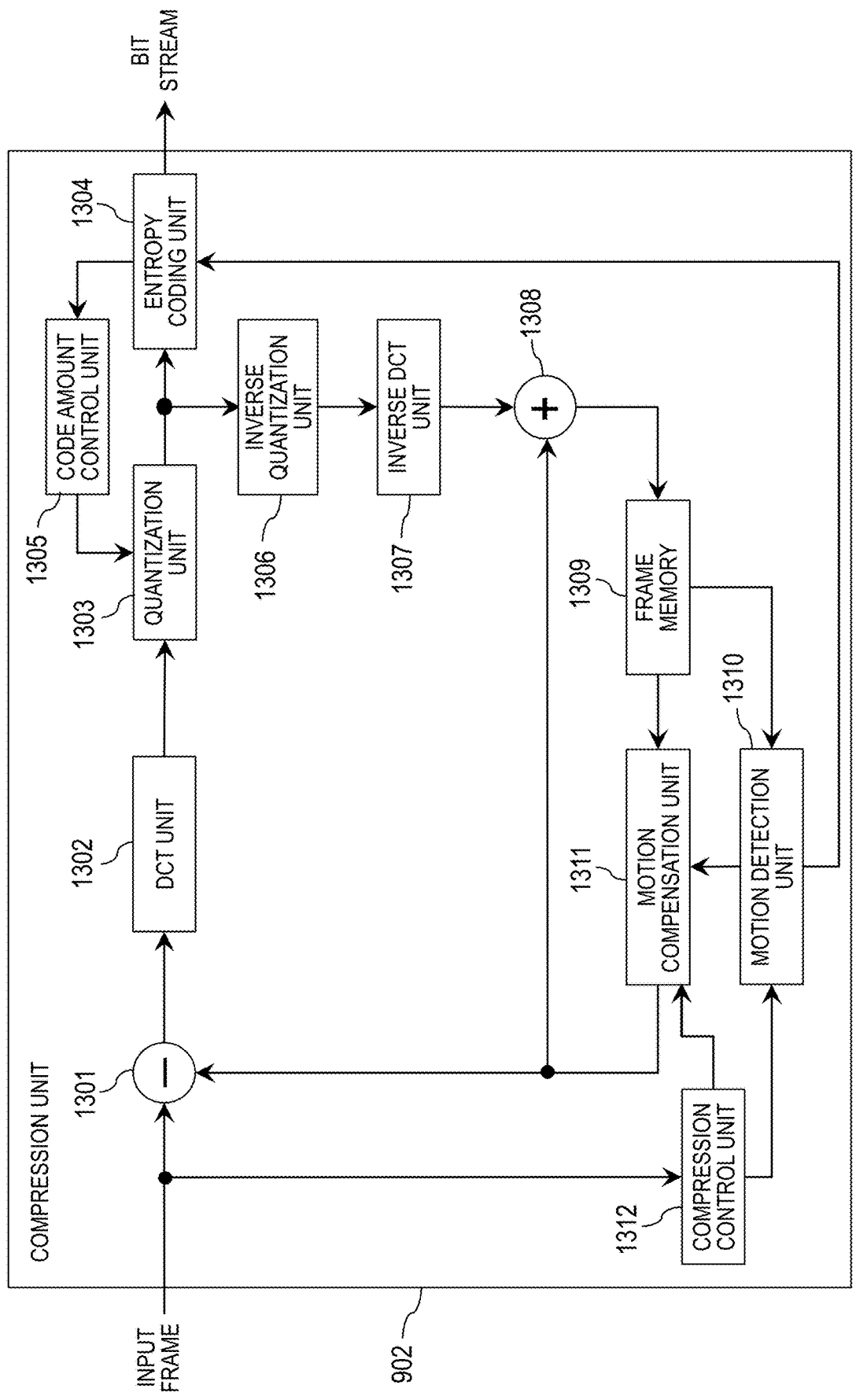
FIG. 13 is a block diagram illustrating the configuration of the compression unit.

FIG. 13 is a block diagram illustrating the configuration of the compression unit 902. As described above, the compression unit 902 compresses the respective frames of the second video data 920 by the hybrid coding obtained by combining the motion compensation inter-frame predicted (MC) and the discrete cosine conversion (DCT) with the entropy coding.

The compression unit 902 includes a subtraction unit 1301, a DCT unit 1302, a quantization unit 1303, an entropy coding unit 1304, a code amount control unit 1305, an inverse quantization unit 1306, an inverse DCT unit 1307, a generation unit 1308, a frame memory 1309, a motion detection unit 1310, a motion compensation unit 1311, and a compression control unit 1312. The subtraction unit 1301 to the motion compensation unit 1311 have a configuration similar to that of the conventional compression unit.

Specifically, the subtraction unit 1301 subtracts, from an input frame, a prediction frame from the motion compensation unit 1311 that predicts the input frame to output difference data. The DCT unit 1302 subjects the difference data from the subtraction unit 1301 to the discrete cosine conversion.

The quantization unit 1303 quantizes the difference data subjected to the discrete cosine conversion. The entropy coding unit 1304 executes the entropy coding on the quantized difference data and also executes the entropy coding on the motion vector from the motion detection unit 1310.

The code amount control unit 1305 controls the quantization by the quantization unit 1303. The inverse quantization unit 1306 executes the inverse quantization on the difference data quantized by the quantization unit 1303 to obtain the difference data subjected to the discrete cosine conversion. The inverse DCT unit 1307 executes an inverse discrete cosine conversion on the difference data subjected to the inverse quantization.

The generation unit 1308 adds the difference data subjected to the inverse discrete cosine conversion to the prediction frame from the motion compensation unit 1311 to generate a reference frame that is referred to by a frame inputted temporally later than the input frame. The frame memory 1309 retains the reference frame obtained from the generation unit 1308. The motion detection unit 1310 uses the input frame and the reference frame to detect a motion vector. The motion compensation unit 1311 uses the reference frame and the motion vector to generate the prediction frame.

Specifically, the motion compensation unit 1311 uses a specific reference frame among a plurality of reference frames retrained by the frame memory 1309 and a motion vector for example to execute the motion compensation on the frame imaged at the second frame rate. The use of the reference frame as a specific reference frame can suppress the high-load motion compensation that requires reference frames other than the specific reference frame. Furthermore, the specific reference frame set as one reference frame obtained from the temporally-previous frame of the input frame can avoid the high-load motion compensation and can reduce the motion compensation processing load.

The compression control unit 1312 controls the motion detection unit 1310 and the motion compensation unit 1311. Specifically, the compression control unit 1312 executes the first compression control method to set a specific motion vector showing that there is no motion is detected by the motion detection unit 1310 and the second compression control method to skip the motion detection itself for example.

Regarding the first compression control method, the compression control unit 1312 controls the motion detection unit 1310 to set, with regard to the first image region a1 imaged at the first frame rate (e.g., 30 [fps]), the specific motion vector showing not the detection of the motion vector but the nonexistence of the motion to output the specific motion vector to the motion compensation unit 1311 and to detect, with regard to the second image region a2 set at the second frame rate (e.g., 60 [fps]), the motion vector to output the motion vector to the motion compensation unit 1311. The specific motion vector is a motion vector that has no defined direction and that has a motion amount of 0.

In this case, the compression control unit 1312 controls the motion compensation unit 1311 to subject the image data of the first image region a1 to the motion compensation based on the specific motion vector and the reference frame and subjects the image data of the second image region a2 to motion compensation based on the motion vector detected by the motion detection unit 1310.

Regarding the second compression control method, the compression control unit 1312 controls the motion detection unit 1310 to fail to subject the first image region a1 imaged at the first frame rate (e.g., 30 [fps]) to the motion vector detection and to subject the second image region a2 imaged at the second frame rate (e.g., 60 [fps]) to the motion vector detection.

In this case, the compression control unit 1312 controls the motion compensation unit 1311 to subject the image data of the first image region a1 to the motion compensation based on the reference frame. Specifically, the nonexistence of the motion vector allows the compression control unit 1312 to control the motion compensation unit 1311 to determines, with regard to the image data of the first image region a1, a prediction frame to predict a reference frame for a frame temporally previous to the input frame. The compression control unit 1312 controls the motion compensation unit 1311 to subject the image data of the second image region a2 to the motion compensation based on the motion vector detected by the reference frame and the motion detection unit 1310.

According to the first compression control method, the motion vector is a specific motion vector, thus simplifying the motion detection at the first image region a1. This can consequently reduce the video compression processing load. According to the second compression control method, no motion detection is executed on the first image region a1, thus requiring a less video compression processing load than in the case of the first compression control method.

<Example of the Operation Processing Procedure of the Control Unit 502>

Figure 14:
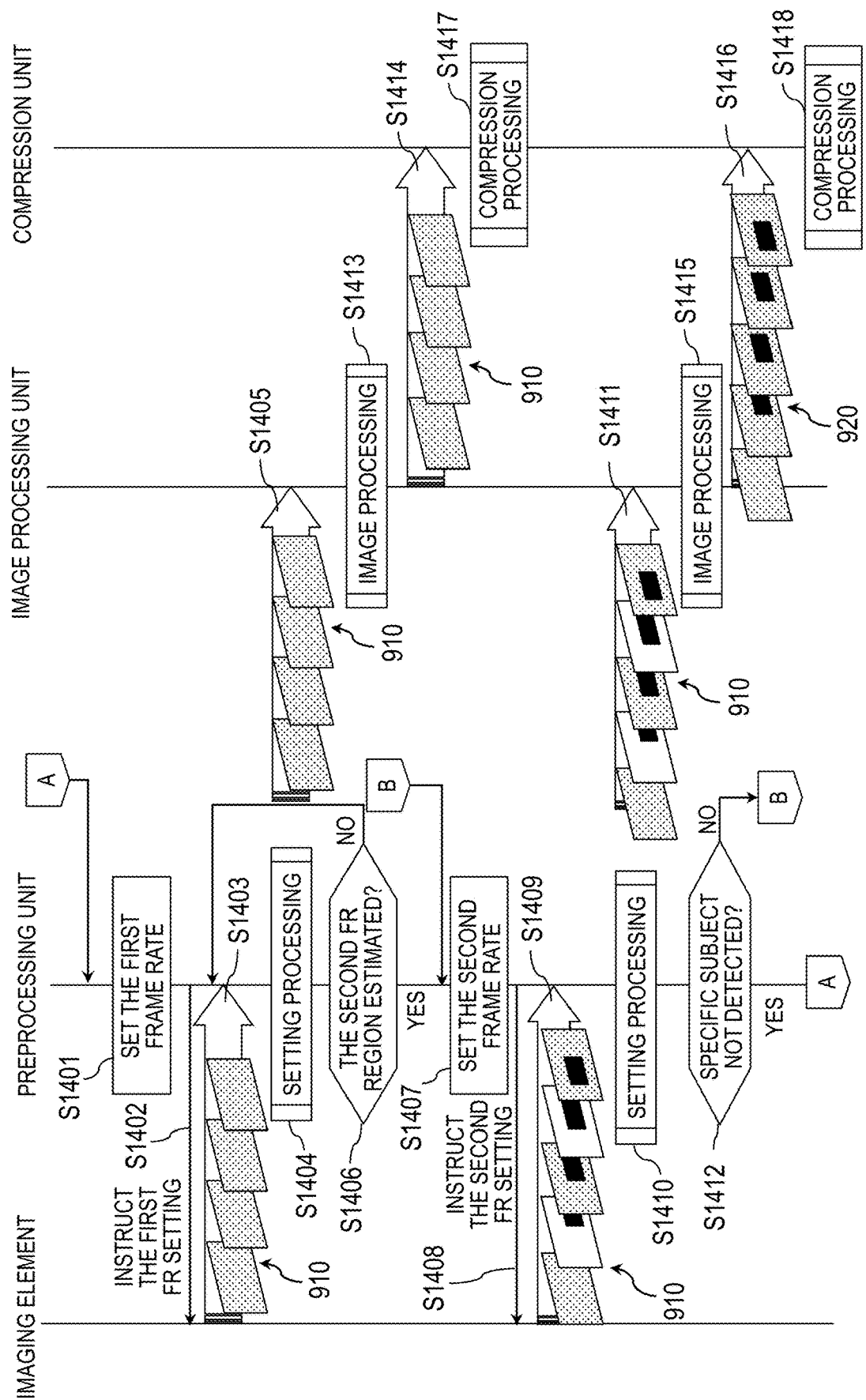
FIG. 14 is a sequence diagram illustrating the operation processing procedure example of the control unit.

FIG. 14 is a sequence diagram illustrating the operation processing procedure example of the control unit 502. In FIG. 14, the acquisition unit 1220 is omitted for the convenience of illustration. The preprocessing unit 1210 sets the imaging conditions of the entire imaging face 200 of the imaging element 100 to the first frame rate (e.g., 30 [fps]) by allowing the user to operate the operation unit 505 for example or by automatically setting the imaging conditions of the entire imaging face 200 of the imaging element 100 to the first frame rate (e.g., 30 [fps]) when no specific subject is detected in Step S1412 (Step S1412: Yes) (Step S1401).

The preprocessing unit 1210 sends the first frame rate setting instruction including the setting details of Step S1401 to the imaging element 100 (Step S1402). This allows the imaging element 100 to be set so that the imaging conditions for the entire imaging face 200 are set to the first frame rate. The imaging element 100 images the subject at the first frame rate and outputs the first video data 910 to the preprocessing unit 1210 (Step S1403).

Upon receiving the first video data 910 (Step S1403), the preprocessing unit 1210 executes the setting processing (Step S1404). The setting processing (Step S1404) sets the additional information 817 for the respective frames of the first video data 910. The additional information 817 is a frame rate set for the image region in the frame imaged in each imaging region as described above. For example, the image region to which the first frame rate (e.g., 30 [fps]) is added as the additional information 817 is recognized as the first image region a1 while the image region to which the second frame rate (e.g., 60 [fps]) is added as the additional information 817 is recognized as the second image region a2.

The preprocessing unit 1210 outputs, to the image processing unit 901, the first video data 910 for which the additional information 817 is added to each frame (Step S1405).

The preprocessing unit 1210 waits for the input of the first video data 910 of Step S1403 when the setting processing (Step S1404) does not detect the image region of the second frame rate of the next input frame (Step S1406: No). On the other hand, when the setting processing (Step S1404) detects the image region of the second frame rate of the next input frame (Step S1406: Yes), then the preprocessing unit 121 changes the setting for the second image region a2 including the specific subject to the second frame rate (e.g., 60 [fps]) (Step S1407).

Then, the preprocessing unit 1210 sends, to the imaging element 100, the second frame rate setting instruction including the details of the setting change of Step S1407 (Step S1408). This allows the imaging element 100 sets the imaging conditions for the second imaging region of the entire imaging face 200 to the second frame rate. The imaging element 100 images the subject in the first imaging region at the first frame rate and images the subject in the second imaging region at the second frame rate and outputs the first video data 910 to the preprocessing unit 1210 (Step S1409).

Upon receiving the first video data 910 (Step S1409), the preprocessing unit 1210 executes an additional information setting processing (Step S1410). The additional information setting processing (Step S1410) is the same processing as the additional information setting processing (Step S1404). The details of the additional information setting processing (Step S1410) will be described later for FIG. 15. The preprocessing unit 1210 outputs, to the image processing unit 901, the first video data 910 for which the additional information 817 is added to each frame (Step S1411).

When no specific subject is detected (Step S1412: Yes), the preprocessing unit 1210 returns to Step S1401 to change the setting for the entire imaging face 200 to the first frame rate (Step S1401). When the specific subject is continuously detected on the other hand (Step S1412: No), then the processing returns to Step S1407 to change the second image region a2 depending on the detection position of the specific subject to the second frame rate (Step S1407). It is noted that the setting for the image region in which no specific subject is no more detected in this case is changed by the preprocessing unit 1210 to the first frame rate.

Upon receiving the first video data 910 (Step S1405), then the image processing unit 901 refers to the additional information 817 to execute the image processing (Step S1413). It is noted that, in the image processing (Step S1413), the image processing unit 901 refers to the additional information 817 of each frame to identify that the respective frames of the first video data 910 include the first frame only.

Thus, since no specific subject is imaged, the image processing unit 901 does not generate the third frame. The details of the image processing (Step S1413) will be described later for FIG. 18. The image processing unit 901 outputs the first video data 910 to the compression unit 902 (Step S1414)

Upon receiving the first video data 910 (Step S1411), the image processing unit 901 refers to the additional information 817 to execute the image processing (Step S1415). It is noted that, in the image processing (Step S1415), the image processing unit 901 refers to the additional information 817 of each frame to identify that the respective frames of the first video data 910 include the first frame and the second frame.

Thus, the first frame and the second frame include image of the specific subject. Thus, the image processing unit 901 generates the third frame. The details of the image processing (Step S1415) will be described for FIG. 18. The image processing unit 901 outputs, to the compression unit 902, the second video data 920 including the first frame and the third frame (Step S1416).

Upon receiving the first video data 910 (Step S1414), the compression unit 902 subjects the first video data 910 to the compression processing (Step S1417). The first video data 910 is composed of the first frame only. The compression unit 902 executes a compression encoding operation not requiring a motion detection or a motion compensation in the compression processing (Step S1417). The details of the compression processing (Step S1417) will be described later for FIG. 19 to FIG. 24.

Upon receiving the second video data 920 (Step S1416), the compression unit 902 subjects the second video data 920 to the compression processing (Step S1418). The second video data 920 is composed of the first frame and the third frame. Thus, the compression unit 902 is configured, in the compression processing (Step S1418), to subject the first image region a1 to the compression encoding operation not requiring the motion detection or the motion compensation and to subject the second image region a2 to a normal hybrid coding compression. The details of the compression processing (Step S1418) will be described later for FIG. 19 to FIG. 24.

<Setting Processing (Steps S1404 and S1410)>

Figure 15:
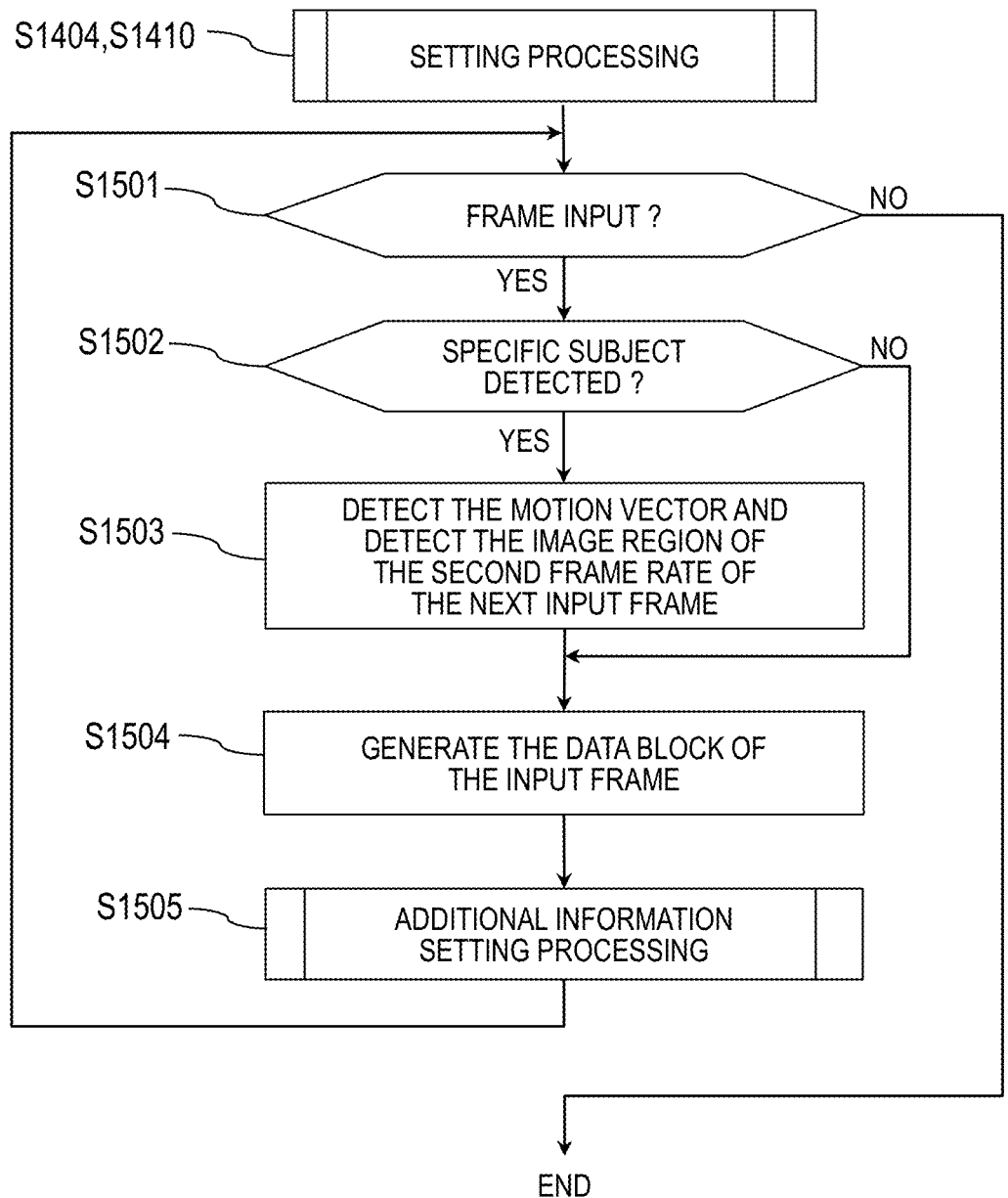
FIG. 15 is a flowchart illustrating the detailed processing procedure example of the setting processing shown in FIG. 14 (Steps S1404 and S1410).

FIG. 15 is a flowchart illustrating the detailed processing procedure example of the setting processing shown in FIG. 14 (Steps S1404 and S1410). In FIG. 15, the imaging element 100 has the first frame rate (e.g., 30 [fps]) in advance. The subject detection technique of the detection unit 1211 is used to track the image region having the second frame rate (e.g., 60 [fps]) to feedback the result to the imaging element 100. It is noted that the image regions of the first frame rate and the second frame rate may be always fixed.

The preprocessing unit 1210 waits for the input of the frames constituting the first video data 910 (Step S1501: No). Upon receiving the input of the frames (Step S1501: Yes), the preprocessing unit 1210 judges whether or not a specific subject such as a main subject is detected by the detection unit 1211 (Step S1502). When no specific subject is detected (Step S1502: No), the processing proceeds to Step S1504.

When a specific subject is detected (Step S1502: Yes) on the other hand, the preprocessing unit 1210 uses the detection unit 1211 to compare the temporally-previous previous frame (e.g., a reference frame) with the input frame to detect a motion vector to predict the image region of the second frame rate for the next input frame to output the predicted image region to the imaging element 100 to proceed to Step S1504 (Step S1503). This allows the imaging element 100 sets the imaging conditions for the unit group 202 constituting the imaging region corresponding to the predicted image region to the second frame rate and sets the imaging conditions for the remaining unit group 202 to the first frame rate to image the subject.

Then, the preprocessing unit 1210 generates the data block Bi shown in FIG. 8 for the input frame (Step S1504) to execute the additional information setting processing (Step S1505) to return to Step S1501. The additional information setting processing (Step S1505) is a processing to set the above-described additional information, the details of which will be described for FIG. 16.

When there is no input for the frame (Step S1501: No), the input of the first video data 910 is completed. Thus, the preprocessing unit 1210 completes the setting processing (Steps S1404 and S1410).

<Additional Information Setting Processing (Step S1505)>

Figure 16:
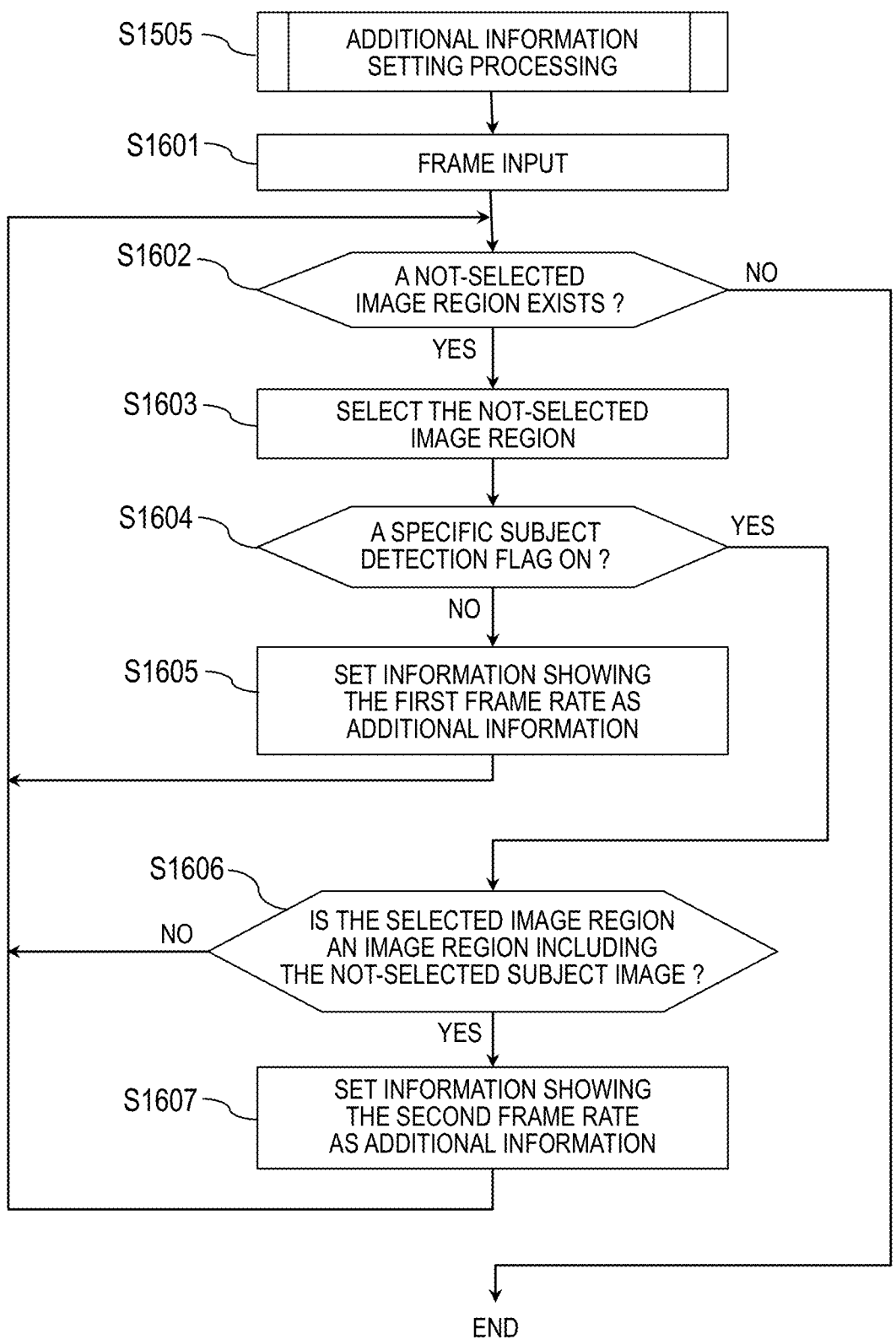
FIG. 16 is a flowchart illustrating the detailed processing procedure example of the additional information setting processing (Step S1505) shown in FIG. 15.

FIG. 16 is a flowchart illustrating the detailed processing procedure example of the additional information setting processing (Step S1505) shown in FIG. 15. Upon receiving a frame (Step S1601), the preprocessing unit 1210 judges whether the input frame includes a not-selected image region or not (Step S1602). When the input frame includes a not-selected image region (Step S1602: Yes), the preprocessing unit 1210 selects one not-selected image region (Step S1603) to judge whether a detection flag is ON for a specific subject or not (Step S1604). The detection flag is information showing the existence or nonexistence of the detection of the specific subject and is set to OFF as default (non-detection).

When a specific subject is detected in Step S1406 of FIG. 14 (Step S1406: Yes), the preprocessing unit 1210 changes the detection flag from OFF to ON (detected). When no specific subject is detected in Step S1412 (Step S1412: Yes), the preprocessing unit 1210 changes the detection flag from ON to OFF.

Returning to FIG. 16, when the detection flag is OFF (Step S1604: No), the preprocessing unit 1210 sets, for the additional information 817, information showing the first frame rate for the selected image region (Step S1605) and returns to Step S1602. When the detection flag is ON (Step S1604: Yes) on the other hand, the preprocessing unit 1210 judges whether or not the selected image region is an image region including the specific subject image (Step S1606).

When there is no specific subject image (Step S1606: No), the processing returns to Step S1602. When there is a specific subject image (Step S1606: Yes) on the other hand, the preprocessing unit 1210 sets, for the additional information 817, information showing the second frame rate for the selected image region (Step S1607) to return to Step S1602.

When there is no not-selected image region in Step S1602 (Step S1602: No), the preprocessing unit 1210 completes the additional information setting processing. Thereafter, the preprocessing unit 1210 sends frame rate setting instruction to the imaging element 100 (Steps S1402 and S1408).

By setting the additional information 817 for the image region of each frame, the preprocessing unit 1210 can identify the imaging region of the imaging element 100 corresponding to which image region is set to which frame rate. Alternatively, the image processing unit 901 and the compression unit 902 can identify, based on the additional information 817, the frame rate of each image region of the inputted frame.

<Video File Generation Processing>

Figure 17:
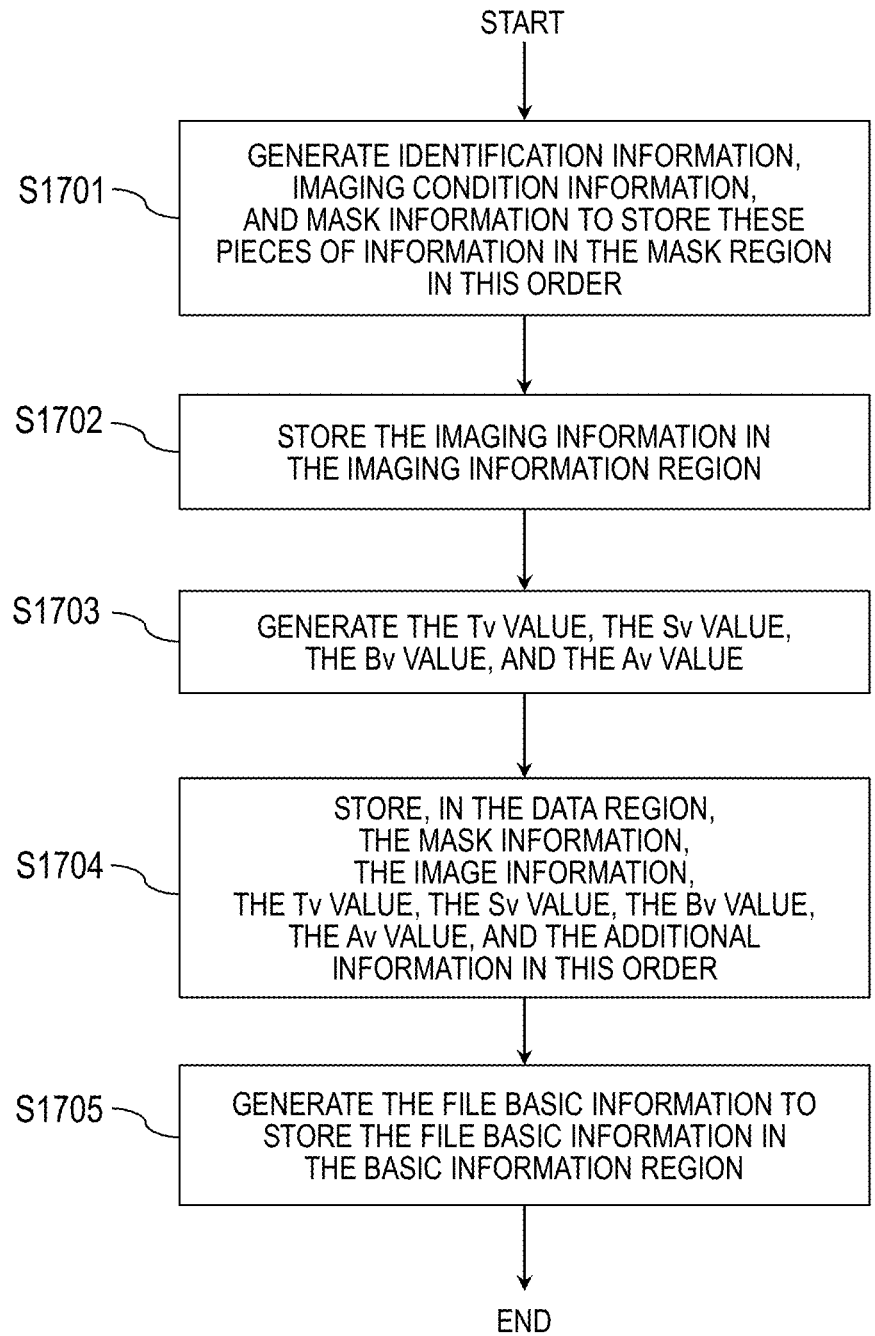
FIG. 17 is a flowchart illustrating a video file generation processing procedure example.

FIG. 17 is a flowchart illustrating a video file generation processing procedure example. The video file generation processing is executed during the compression processing by the compression unit 902 for example. However, when the video file 600 is generated without being compressed, the video file generation processing may be executed after the image processing unit 901.

As shown in FIG. 8, the control unit 502 generates the identification information 801, the imaging condition information 802, and the mask information 704 to store these pieces of information in the mask region 612 in this order (Step S1701). Next, the preprocessing unit 1210 stores imaging information in the imaging information region 613 (Step S1702).

Then, the control unit 502 generates the Tv value map 812, the Sv value map 813, the By value map 814, and the Av value information 815 (Step S1703). Next, the preprocessing unit 1210 stores, in a data region, the mask information 704, the image information 811, the Tv value map 812, the Sv value map 813, the By value map 814, and the Av value information 815 in this order (Step S1704).

Finally, the control unit 502 generates the file basic information to store the information in the file basic information region 611 at the top of the header section 601 (Step S1705). This allows the control unit 502 to generate the video file 600.

<Image Processing (Steps S1413 and S1415)>

Figure 18:
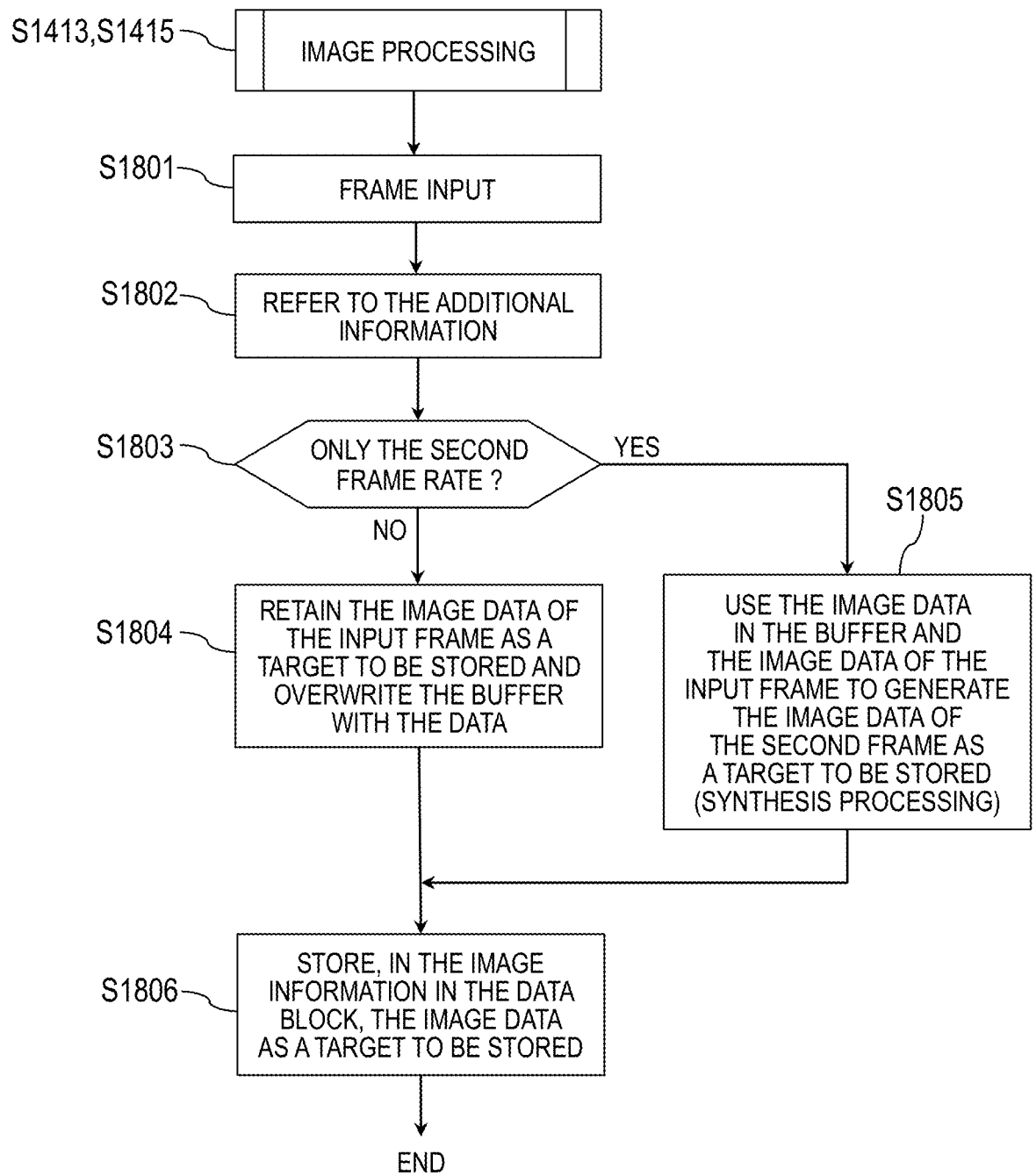
FIG. 18 is a flowchart illustrating the detailed processing procedure example of the image processing shown in FIG. 14 (Step S1413 and S1415).

FIG. 18 is a flowchart illustrating the detailed processing procedure example of the image processing shown in FIG. 14 (Step S1413 and S1415). Upon receiving a frame (Step S1801), the image processing unit 901 refers to the additional information 817 (Step S1802). The image processing unit 901 judges whether or not the frame rate in the additional information 817 is the second frame rate only (Step S1803).

When or not the frame rate in the additional information 817 is not the second frame rate only (Step S1803: No), the additional information 817 includes the first frame rate only or the first frame rate and the second frame rate. Thus, the image processing unit 901 retains the image information of the input frame as a target to be stored and overwrites the buffer with this information (Step S1804) and the processing proceeds to Step S1806.

When the additional information 817 is composed of the second frame rate only (Step S1803: Yes) on the other hand, the image information in the buffer overwritten in Step S1804 and the image information of the input frame are used to generate the image information of the second frame as a target to be stored (Step S1805). Then, the processing proceeds to Step S1806.

In the image processing (Step S1413), the additional information 817 is composed of the first frame rate only (Step S1803: No). In the image processing (Step S1415) on the other hand, the additional information 817 includes the first frame rate and the second frame rate (Step S1803: No) or includes the second frame rate only (Step S1803: Yes).

This allows, as shown in FIG. 9 to FIG. 11, the image processing unit 901 to interpolate the temporally-previous first image region a1 of the first frame rate in the frame consisting of the second image region a2 of the second frame, providing the synthesis with the frame including the first image region a1 and the second image region a2. Thus, a difference in the frame rate in one frame can be absorbed.

<Compression Processing Example: First Compression Control Method>

Next, the following section will describe the compression processing by the compression unit 902 by describing the compression processing divided to the first compression control method and the second compression control method.

Figure 19:
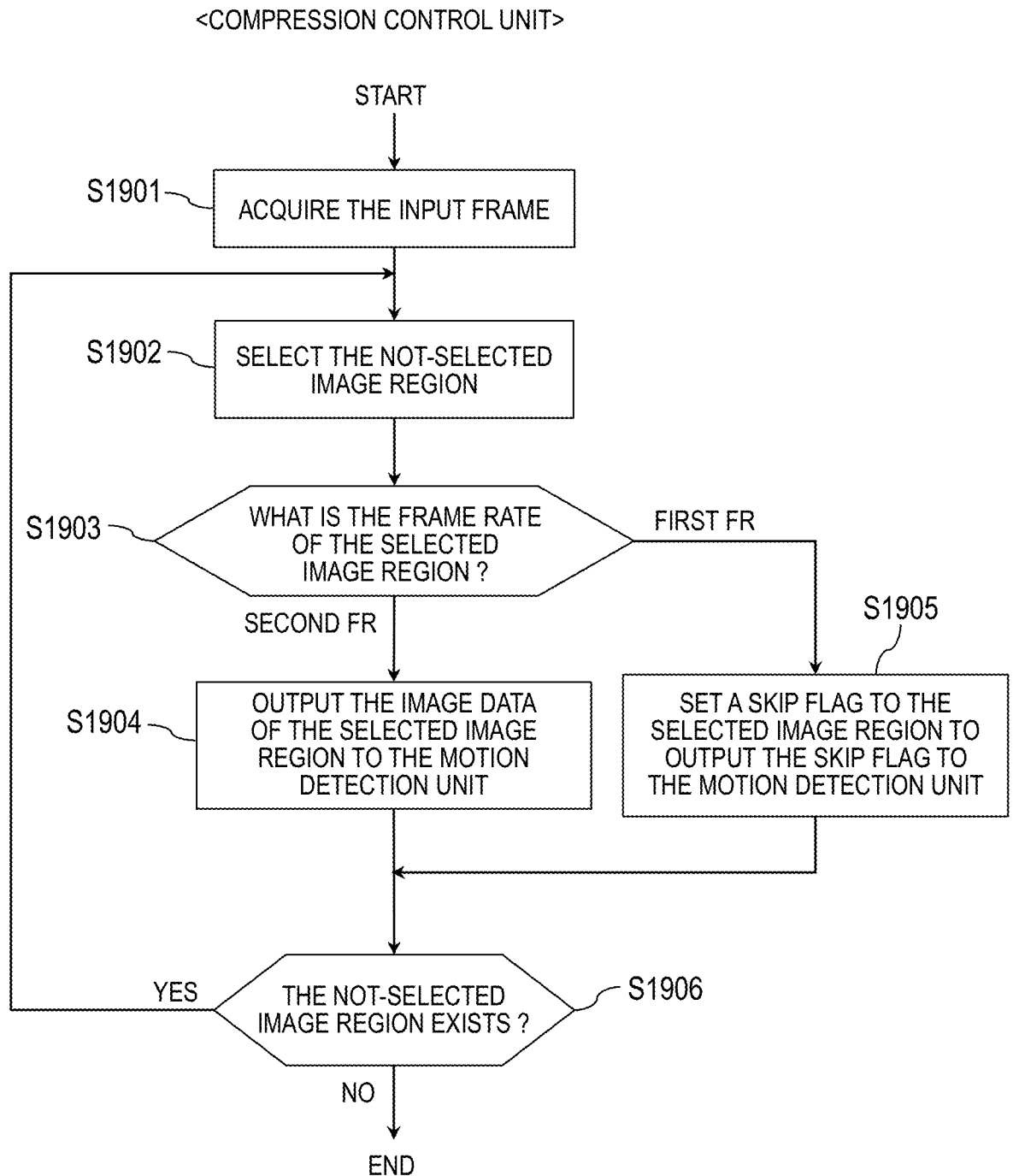
FIG. 19 is a flowchart illustrating the compression control processing procedure example of the first compression control method by the compression control unit.

FIG. 19 is a flowchart illustrating the compression control processing procedure example of the first compression control method by the compression control unit 1312. The compression control unit 1312 acquires an input frame (Step S1901) and select, from the acquired input frame, a not-selected image region (Step S1902). Then, the compression control unit 1312 refers to the frame rate of the selected image region from the additional information 817 (Step S1903).

When the frame rate of the selected image region is the second frame rate (Step S1903: the second FR), the compression control unit 1312 outputs the image data of the selected image region to the motion detection unit 1310 (Step S1904). This allows the motion detection unit 1310 uses, with regard to the selected image region of the second frame rate, the reference frame as usual to detect a motion vector.

When the frame rate of the selected image region is the first frame rate (Step S1903: the first FR) on the other hand, the compression control unit 1312 sets a skip flag to the selected image region of the first frame rate to output the skip flag to the motion detection unit 1310 (Step S1905). This allows the motion detection unit 1310 to set, with regard to the selected image region of the first frame rate, a specific motion vector showing the nonexistence of motion.

After Step S1904 or S1905, the compression control unit 1312 judges whether or not the acquired input frame has a not-selected image region (Step S1906). When the acquired input frame has a not-selected image region (Step S1906: Yes), the processing returns to Step S1902. When the acquired input frame does not have a not-selected image region (Step S1906: No), the compression control unit 1312 completes a series of processings.

Figure 20:
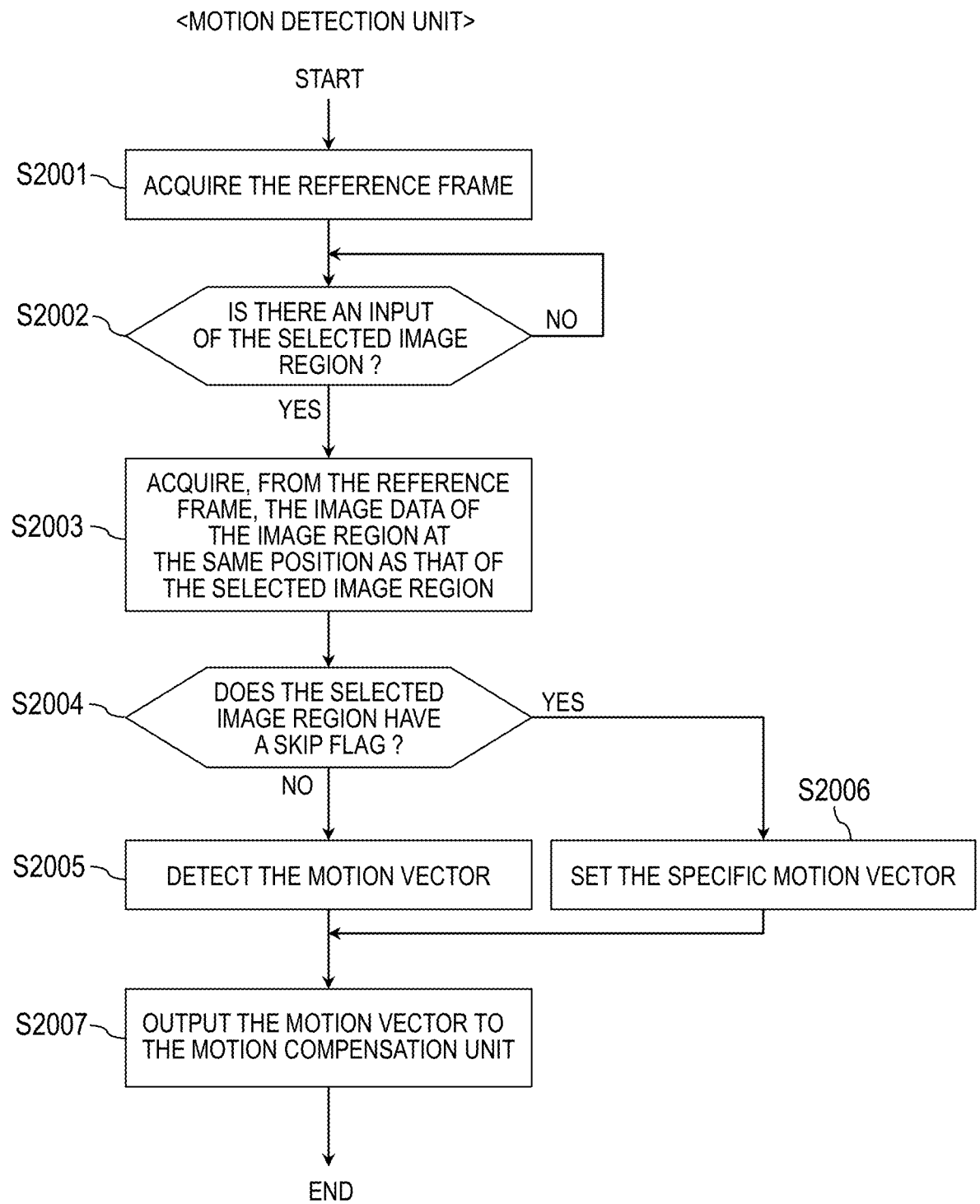
FIG. 20 is a flowchart illustrating the motion detection processing procedure example of the first compression control method by the motion detection unit.

FIG. 20 is a flowchart illustrating the motion detection processing procedure example of the first compression control method by the motion detection unit 1310. The motion detection unit 1310 acquires, from the frame memory 1309, the reference frame temporally previous to the input frame (Step S2001) and waits for the input of the selected image region outputted in Step S1904 or S1905 of FIG. 19 (Step S2002: No).

When the selected image region is inputted (Step S2002: Yes), the motion detection unit 1310 acquires, from the reference frame, the image data of the image region at the same position as that of the selected image region (Step S2003). Then, the motion detection unit 1310 judges whether or not the selected image region has a skip flag (Step S2004). When the selected image region does not have a skip flag (Step S2004: No), the frame rate of the selected image region is the second frame rate. Thus, the motion detection unit 1310 uses the image data of the selected image region and the image data of the image region of the reference frame acquired in Step S2003 to detect a motion vector (Step S2005).

When the selected image region has a skip flag (Step S2004: Yes) on the other hand, the motion detection unit 1310 sets a specific motion vector showing the nonexistence of a motion (Step S2006). This allows the motion detection processing by the motion detection unit 1310 to always use the specific motion vector showing the nonexistence of a motion. Thus, the selected image region of the first frame rate has a reduced motion detection processing load. Then, the motion detection unit 1310 outputs the motion vector obtained in Step S2005 or S2006 to the motion compensation unit 1311 (Step S2007) to complete a series of processings.

Figure 21:
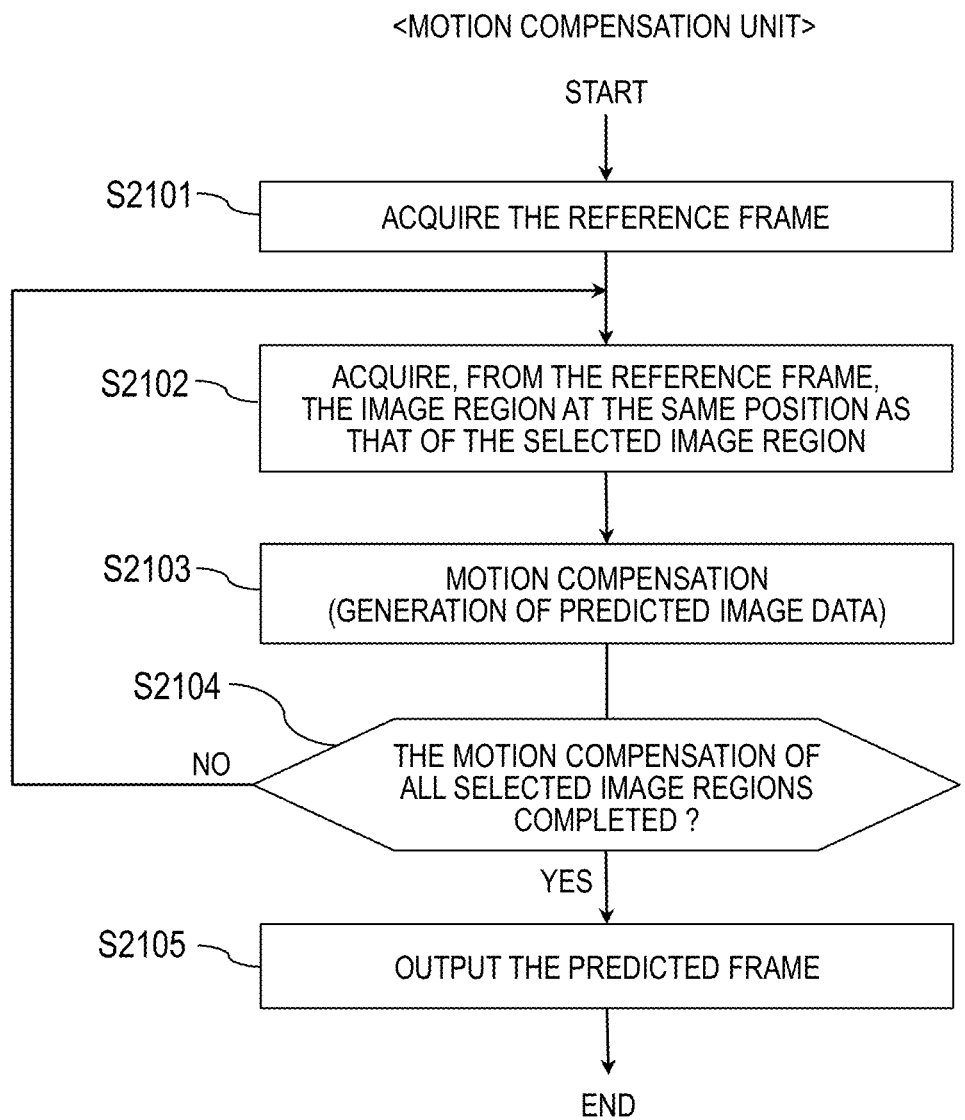
FIG. 21 is a flowchart illustrating the motion compensation processing procedure example of the first compression control method by the motion compensation unit.

FIG. 21 is a flowchart illustrating the motion compensation processing procedure example of the first compression control method by the motion compensation unit 1311. The motion compensation unit 1311 acquires a reference frame from the frame memory 1309 (Step S2101). The motion compensation unit 1311 acquires, from the reference frame, an image region at the same position as that of the selected image region (Step S2102).

Then, the motion compensation unit 1311 uses a motion vector for the selected image region from the motion detection unit 1310 and the image region of the reference frame acquired in Step S2102 to execute the motion compensation (Step S2103). This allows the motion compensation unit 1311 to generate the predicted image data in the selected image region.

Then, the motion compensation unit 1311 judges whether or not the motion compensation of all selected image regions is completed (Step S2104). Specifically, when the compression control unit 1312 judges that there is a not-selected image region in Step S1906 (Step S1907: Yes) for example, the motion compensation unit 1311 judges that all selected image regions are not yet subjected to the motion compensation (Step S2104: No). Then, the processing returns to Step S2102.

When the compression control unit 1312 judges that a not-selected image region does not exist in Step S1906 (Step S1906: No) on the other hand, the motion compensation unit 1311 judges that the motion compensation of all selected image regions is completed (Step S2104: Yes). Then, the motion compensation unit 1311 outputs, to the subtraction unit 1301 and the generation unit 1308, a prediction frame coupled with predicted image data for all selected image regions (Step S2105) and completes a series of processings.

<Compression Processing Example: The Second Compression Control Method>

Figure 22:
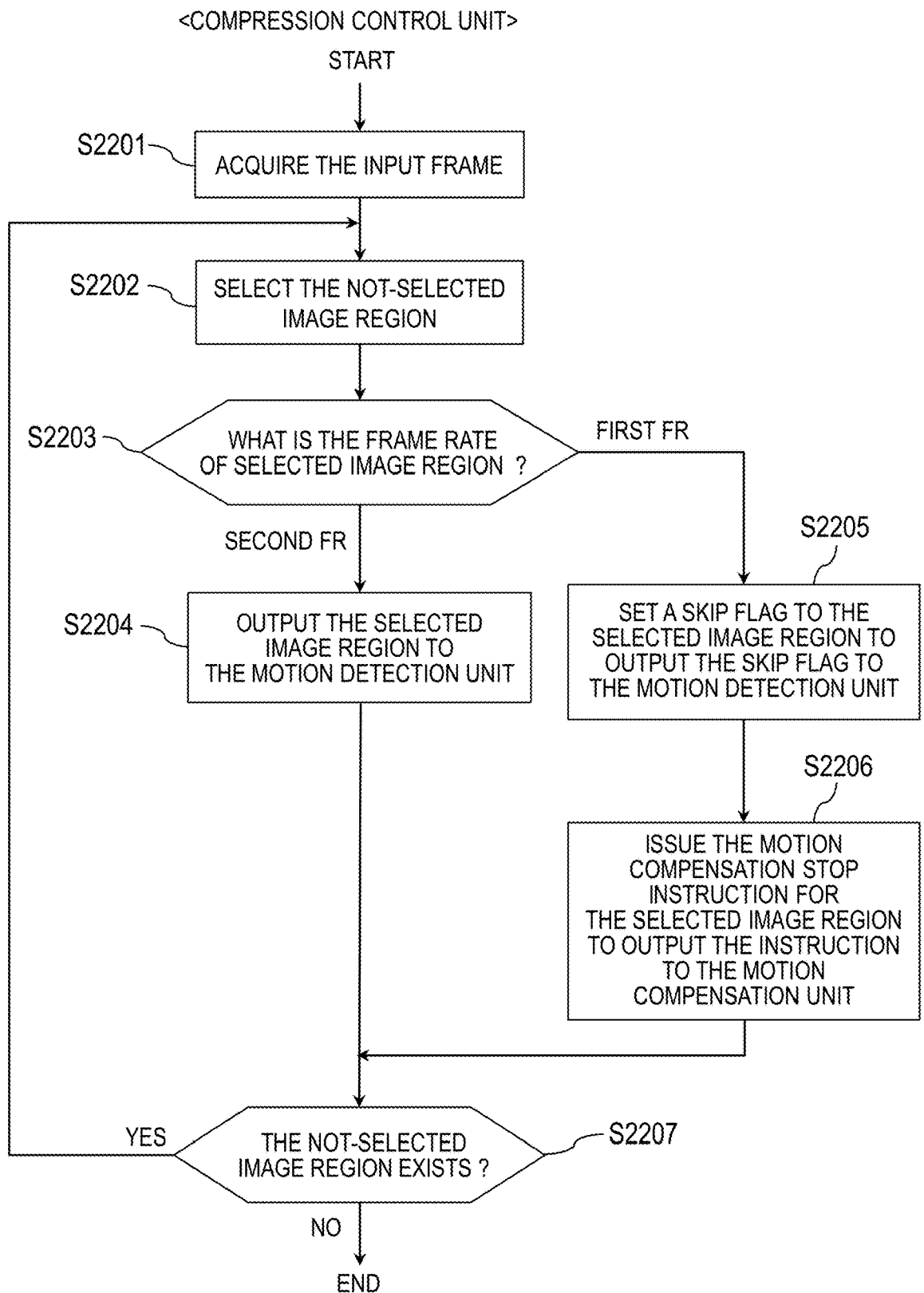
FIG. 22 is a flowchart illustrating the second compression control method by the compression control unit.

FIG. 22 is a flowchart illustrating the second compression control method by the compression control unit 1312. The compression control unit 1312 acquires an input frame (Step S2201) to select, from the acquired input frame, a not-selected image region (Step S2202). Then, the compression control unit 1312 refers to the frame rate of the selected image region from the additional information 817 (Step S2203).

When the frame rate of the selected image region is the second frame rate (Step S2203: the second FR), the compression control unit 1312 outputs the selected image region to the motion detection unit 1310 (Step S2204). This allows the motion detection unit 1310 to use, with regard to the selected image region of the second frame rate, a reference frame as usual to detect a motion vector.

When the frame rate of the selected image region is the first frame rate (Step S2203: the first FR) on the other hand, the compression control unit 1312 sets a skip flag for the selected image region of the first frame rate to output the skip flag to the motion detection unit 1310 (Step S2205). This allows the motion detection unit 1310 does not execute a motion detection on the selected image region of the first frame rate. Then, the compression control unit 1312 issues the motion compensation stop instruction of the selected image region to output the motion compensation stop instruction to the motion compensation unit 1311 (Step S2206). This can consequently stop the execution of the motion compensation of the selected image region.

After Step S2204 or S2206, the compression control unit 1312 judges whether or not the acquired input frame has a not-selected image region (Step S2207). When the acquired input frame has a not-selected image region (Step S2207: Yes), the processing returns to Step S2202. When the acquired input frame does not have a not-selected image region (Step S2207: No) on the other hand, the compression control unit 1312 completes a series of processings.

Figure 23:
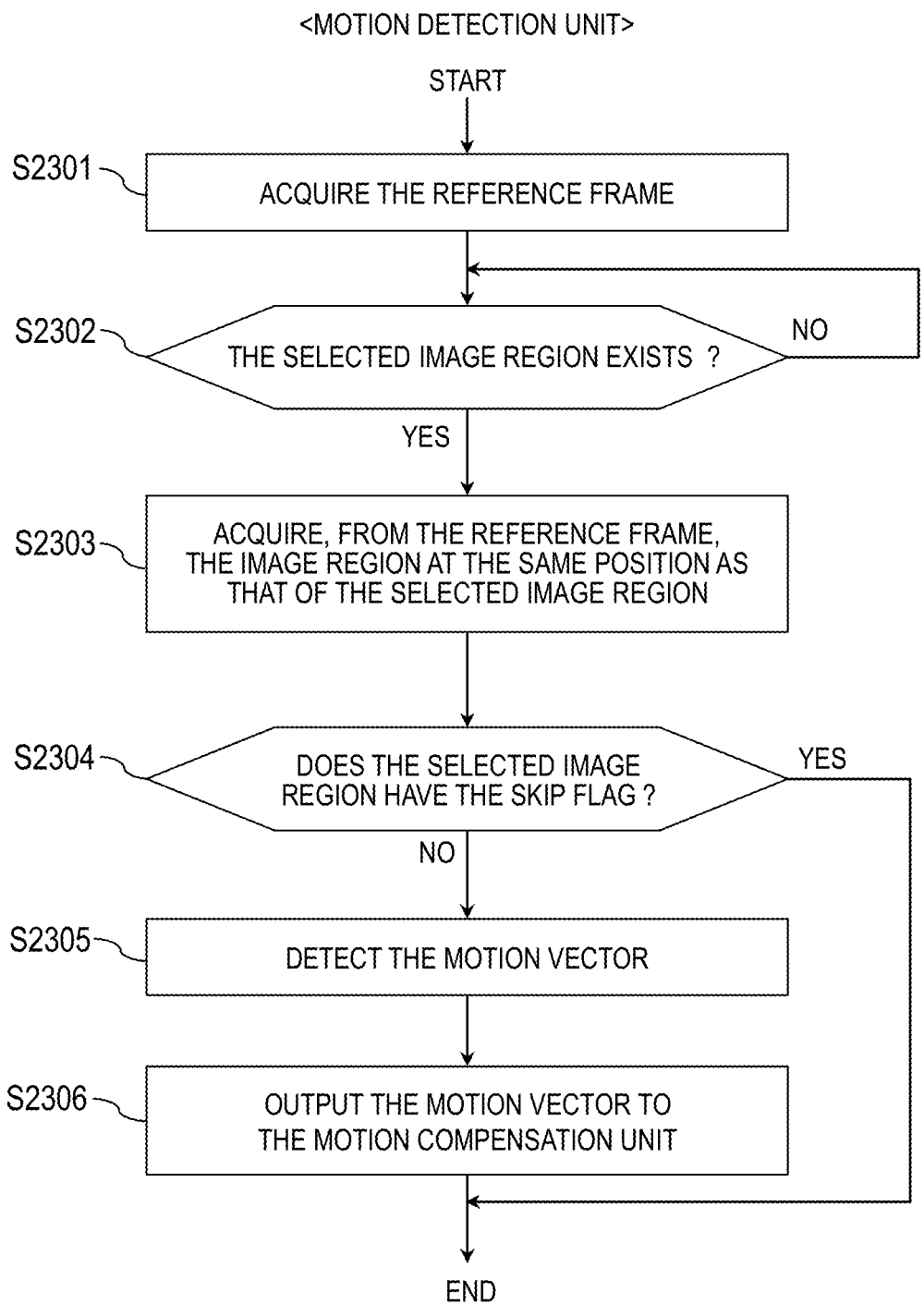
FIG. 23 is a flowchart illustrating the motion detection processing procedure example of the second compression control method by the motion detection unit.

FIG. 23 is a flowchart illustrating the motion detection processing procedure example of the second compression control method by the motion detection unit 1310. The motion detection unit 1310 acquires the reference frame temporally previous to the input frame from the frame memory 1309 (Step S2301) and waits for the input of the selected image region outputted in Step S2204 or S2205 of FIG. 22 (Step S2302: No).

Upon receiving the selected image region (Step S2302: Yes), the motion detection unit 1310 acquires, from the reference frame, the image data of the image region at the same position of that of the selected image region (Step S2303). Then, the motion detection unit 1310 judges whether or not the selected image region has a skip flag (Step S2304). When the selected image region does not have a skip flag (Step S2304: No), then the frame rate of the selected image region is the second frame rate. Thus, the motion detection unit 1310 uses the image data of the selected image region and the image data of the image region of the reference frame acquired in Step S2003 to detect a motion vector (Step S2305).

Then, the motion detection unit 1310 outputs, to the motion compensation unit 1311, the motion vector obtained in Step S2305 (Step S2306) to complete a series of processings. When the selected image region has a skip flag (Step S2304: Yes) on the other hand, the motion detection unit 1310 completes a series of processings without executing a motion detection.

Figure 24:
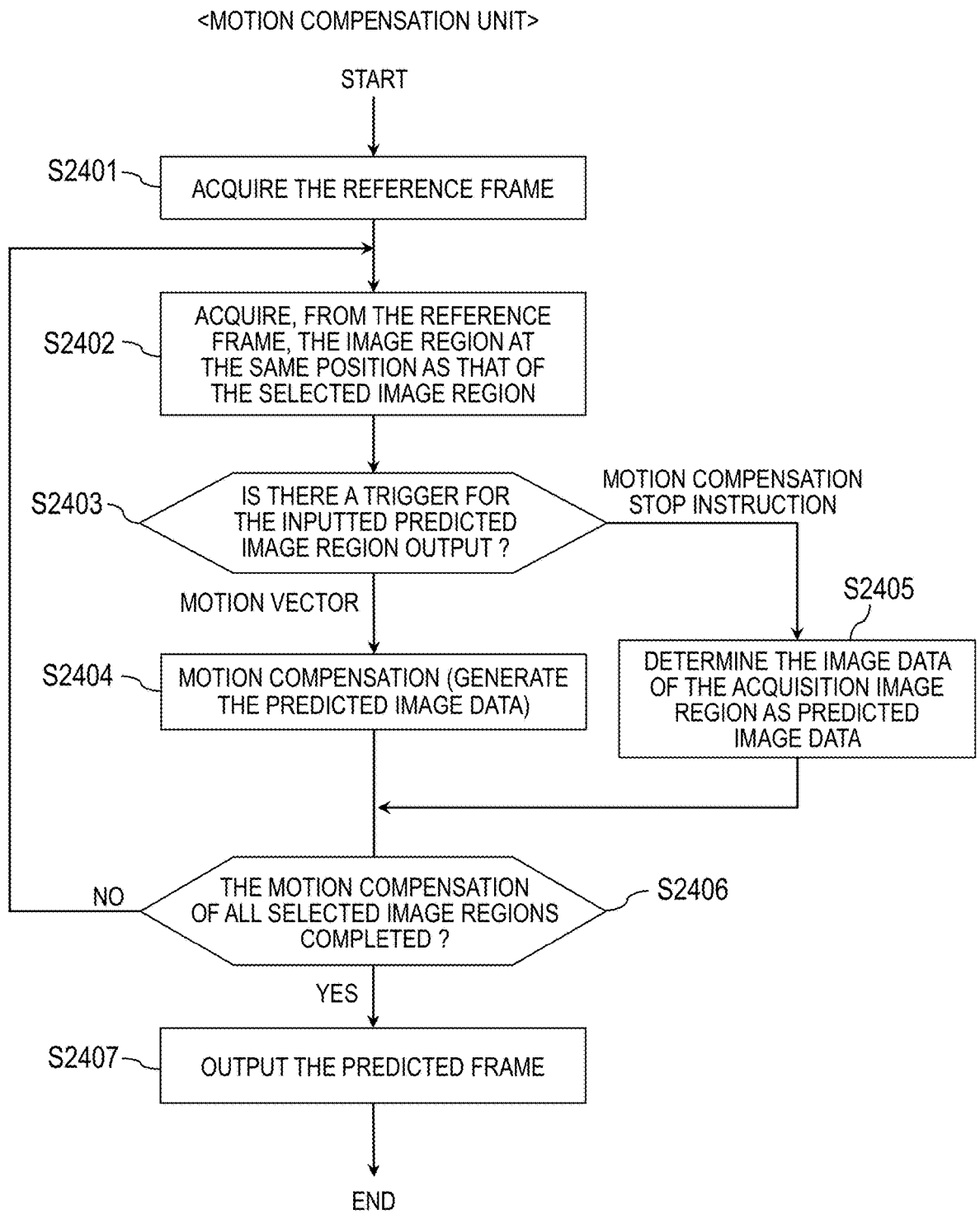
FIG. 24 is a flowchart illustrating the motion compensation processing procedure example of the second compression control method by the motion compensation unit.

FIG. 24 is a flowchart illustrating the motion compensation processing procedure example of the second compression control method by the motion compensation unit 1311. The motion compensation unit 1311 acquires a reference frame from the frame memory 1309 (Step S2401). The motion compensation unit 1311 acquires, from the reference frame, the image region at the same position as that of the selected image region (Step S2402).

Then, the motion compensation unit 1311 judges whether or not a trigger input of the motion compensation for the selected image region is any of the motion vector or the motion compensation stop instruction (Step S2403). When the trigger input is a motion vector (Step S2403: motion vector), the motion compensation unit 1311 uses the motion vector for the selected image region from the motion detection unit 1310 and the image region of the reference frame acquired in Step S2402 to execute the motion compensation (Step S2404). This allows the motion compensation unit 1311 can generate the predicted image data in the selected image region.

When the trigger input is a motion compensation stop instruction (Step S2403: motion compensation stop instruction) on the other hand, the motion compensation unit 1311 determines the image data of the acquisition image region as the image data of the predicted image region (predicted image data) (Step S2405).

Then, the motion compensation unit 1311 judges, after Step S2404 or S2405, whether or not the motion compensation of all selected image regions is completed (Step S2406). Specifically, when the compression control unit 1312 judges that there is a not-selected image region in Step S2207 for example (Step S2007: Yes), the motion compensation unit 1311 judges that the motion compensation of all selected image regions is not completed (Step S2406: No) and the processing returns to Step S2402.

When the compression control unit 1312 determines in Step S2207 that a not-selected image region does not exist (Step S2207: No) on the other hand, the motion compensation unit 1311 judges that the motion compensation of all selected image regions is completed (Step S2406: Yes). Then, the motion compensation unit 1311 outputs, to the subtraction unit 1301 and the generation unit 1308, a prediction frame coupled with the predicted image data for all selected image regions (Step S2407) and completes a series of processings.

(1-1) In this manner, the above-described video compression apparatus has the acquisition unit 1220 and the compression unit 902. The acquisition unit 1220 has the first imaging region to image a subject and the second imaging region to image the subject. The acquisition unit 1220 acquires video data including a plurality of frames outputted from the imaging element 100 for which the first frame rate (e.g., 30 [fps]) can be set for the first imaging region and the second frame rate higher than the first frame rate (e.g., 60 [fps]) can be set for the second imaging region. The compression unit 902 compressed the video data acquired by the acquisition unit 1220 (the second video data 920) based on the first frame rate and the second frame rate.

This can realize, with regard to one frame for which different frame rates are set, the compression depending on the frame rates by the general-purpose compression unit 902. This also can provide a reduced processing load than in the case of the compression when one frame rate is set.

(1-2) Furthermore, according to the above (1-1) video compression apparatus, the image data of the first image region a1 in the frame imaged at the first frame rate is compressed based on the first frame rate and the image data of the second image region a2 in the frame imaged at the second frame rate is compressed based on the second frame rate.

This allows, with regard to one frame for which different frame rates are set, the compression of the image region depending on the respective frame rates, thus providing a reduced processing load than in the compression when one frame rate is set.

(1-3) Furthermore, the above (1-2) video compression apparatus has the motion detection unit 1310 and the motion compensation unit 1311. The motion detection unit 1310 sets, with regard to the image data of the first image region a1, a specific motion vector showing that no motion exists of an object in the image data of the first image region a1 and executes the detection of a motion vector with regard to the image data of the second image region a2. The motion compensation unit 1311 subjects the image data of the first image region a1 to the motion compensation based on a specific motion vector and subjects the image data of the second image region a2 to the motion compensation based on the motion vector detected by the motion detection unit 1310.

This allows, with regard to the image data of the first image region a1, the specific motion vector to be set instead of the detection of the motion vector. This, no motion detection is executed, thus realizing a reduced compression processing load.

(1-4) Furthermore, the above (1-3) video compression apparatus has the generation unit 1308. The generation unit 1308 generates, with regard to the respective plurality of frames and based on difference data between a frame and a prediction frame for predicting a frame inputted temporally after the frame as well as the prediction frame, a reference frame referred to by a frame inputted temporally previous to the frame. In this case, the motion compensation unit 1311 subjects the image data of the first image region a1 to the motion compensation based on a specific motion vector and the reference frame and subjects the image data of the second image region a2 to the motion compensation based on the motion vector and the reference frame.

This can provide the execution of the motion compensation even when the specific motion vector is used, thus realizing the compression processing requiring a reduced load.

(1-5) Furthermore, the above (1-2) video compression apparatus has the generation unit 1308, the motion detection unit 1310, and the motion compensation unit 1311. The generation unit 1308 generates, with regard to the respective plurality of frames and based on difference data between a frame and the prediction frame for predicting the frame and a prediction frame, a reference frame referred to by a frame inputted temporally after the frame. The motion detection unit 1310 does not subject the image data of the first image region a1 to the detection of a motion vector and subjects the image data of the second image region a2 to the detection of a motion vector. The motion compensation unit 1311 subjects the image data of the first image region a1 to the motion compensation based on the reference frame and subjects the image data of the second image region a2 to the motion compensation based on the reference frame and the motion vector detected by the motion detection unit 1310.

Thus, the image data of the first image region a1 is not subjected to the motion detection, thus providing the compression processing requiring a reduced load.

(1-6) Furthermore, according to the above (1-5) video compression apparatus, the motion compensation unit 1311 determines, with regard to the image data of the first image region a1, as the reference frame as the prediction frame for predicting the frame temporally after the frame.

This can provide the execution of the motion compensation even when no motion vector is detected, thus realizing the compression processing requiring a reduced load.

(1-7) Furthermore, the above (1-1) video compression apparatus has the image processing unit 901. The image processing unit 901 updates the second frame as the third frame based on the first frame and the second frame among a plurality of frames. The first frame is a frame imaged by at least the first imaging region among the first imaging region set by the first frame rate and the second imaging region set by the second frame rate.

Furthermore, the second frame is a frame imaged by the second imaging region temporally after the first frame. The third frame is a frame obtained by synthesizing the second frame with the image data of the first image region a1 in the first frame and the image data of the second image region a2 in the second frame. The compression unit 902 compresses, based on the first frame rate, the image data of the first image region a1 among the third frame updated by the image processing unit 901 and compresses the image data of the second image region a2 based on the second frame rate.

This can consequently suppress missing image data in the second frame due to a difference in the frame rate. Thus, even when one frame has different frame rates, the interpolated third frame can be used to provide the compression processing.

(1-8) Furthermore, according to the above (1-7) video compression apparatus, the image processing unit 901 can use the image data of the second image region a2 in the second frame with regard to regions overlapped in the image data of the second image region a2 in the second frame and in the image data of the first image region a1 in the first frame to thereby update the second frame as the third frame.

As a result, with regard to a region in which the top part of the railway train of the frame F2-60 as the second frame and the background region of the frame F1 as the first frame are overlapped for example, the image processing unit 901 uses the top part of the railway train of the frame F2 as the second frame with priority. This can provide an image causing a reduced sense of incongruity (the frame F2 as the third frame).

(1-9) Furthermore, according to the above (1-7) video compression apparatus, the image processing unit 901 uses, with regard to a region in the second frame that does not belong to the second image region a2 in the second frame or the first image region a1 in the first frame, the image data of the second image region a2 in the first frame to thereby update the second frame as the third frame.

As a result, with regard to an image region between the end part of the railway train of the second frame of the frame F2-60 as the second frame and the background region of the frame F1 as the first frame for example, the image data of the second image region a2 in frame F1 as the first frame (the end of the railway train) is used with priority. Thus, an image causing a reduced sense of incongruity (the frame F2 as the third frame) can be obtained.

(1-10) Furthermore, another video compression apparatus compresses video data including a plurality of frames outputted from the imaging element 100 that has the first imaging region to image a subject and the second imaging region to image a subject and for which the first frame rate can be set for the first imaging region and the second frame rate higher than the first frame rate can be set for the second imaging region. This video compression apparatus has the generation unit 1308 and the motion compensation unit 1311.

The generation unit 1308 generates, with regard to the respective plurality of frames and based on difference data between a frame and the prediction frame for predicting the frame as well as a prediction frame, a reference frame referred to by a frame inputted temporally after the frame. The motion compensation unit 1311 uses a specific reference frame among a plurality of reference frames generated by the generation unit 1308 to execute the motion compensation on a frame among a plurality of frames that is imaged at the second frame rate.

This can fix the reference frame to the specific reference frame, thus providing an efficient motion compensation.

(1-11) Furthermore, according to the above (1-10) video compression apparatus, the respective plurality of frames include the image data of the first image region a1 corresponding to the first imaging region for which at least the first frame rate among the first frame rate and the second frame rate higher than the first frame rate is set. The motion compensation unit 1311 executed the motion compensation on the image data of the first image region a1 using, as a specific reference frame, a reference frame generated by a frame temporally previous to the frame.

This can use the temporally-previous reference frame as a specific reference frame to thereby refer to a frame closest to the frame. This can provide the motion compensation having a higher accuracy while providing an efficient motion compensation.

(1-12) Furthermore, the above-described electronic device 500 has the imaging element 100 and the compression unit 902. The imaging element 100 has the first imaging region to image a subject and the second imaging region to image a subject. The first frame rate can be set for the first imaging region and the second frame rate higher than the first frame rate can be set for the second imaging region. The frame rates set for the respective imaging regions are used to image a subject to output a plurality of frames as video data. The compression unit 902 compresses the respective plurality of frames imaged by the imaging element 100 based on the first frame rate and the second frame rate.

This can realize the electronic device 500 that can provide, for one frame for which different frame rates are set, the compression depending on the frame rates. Thus, the processing load can be reduced than in the case where one frame rate is set.

(1-13) Furthermore, another electronic device 500 compresses video data including a plurality of frames outputted from the imaging element 100 that has the first imaging region to image a subject and the second imaging region to image a subject and for which the first frame rate can be set for the first imaging region and the second frame rate higher than the first frame rate can be set for the second imaging region. This electronic device 500 has the generation unit 1308 and the motion compensation unit 1311.

The generation unit 1308 generates, with regard to the respective plurality of frames and based on difference data between a frame and the prediction frame for predicting the frame as well as a prediction frame, a reference frame referred to by a frame inputted temporally after the frame. The motion compensation unit 1311 uses a specific reference frame among a plurality of reference frames generated by the generation unit 1308 to execute the motion compensation on a frame imaged at the second frame rate among the plurality of frames.

This can fix the reference frame to the specific reference frame, thus realizing the electronic device 500 providing an efficient motion compensation.

It is noted that the above-described electronic device 500 of (1-12) and (1-13) illustratively includes, for example, a digital camera, a digital video camera, a smart phone, a tablet, a monitoring camera, a drive recorder, or a drone.

(1-14) Furthermore, the above-described video compression program has allows the processor 1201 to execute the compression of video data including a plurality of frames outputted from the imaging element 100 that has the first imaging region to image a subject and the second imaging region to image a subject and for which the first frame rate can be set for the first imaging region and the second frame rate higher than the first frame rate can be set for the second imaging region. This video compression program allows the processor 1201 to execute an acquisition processing to acquire video data and a compression processing to compress the video data acquired by the acquisition processing based on the first frame rate and the second frame rate.

This can provide, with regard to one frame for which different frame rates are set, the compression depending on the frame rates realized by software. This can provide a reduced processing load than the compression in the case where one frame rate is set.

(1-15) Furthermore, the above-described another video compression program allows the processor 1201 to execute the compression of video data including a plurality of frames outputted from the imaging element 100 that has the first imaging region to image a subject and the second imaging region to image a subject and for which the first frame rate can be set for the first imaging region and the second frame rate higher than the first frame rate can be set for the second imaging region.

This video compression program allows the processor 1201 to execute, with regard to the respective plurality of frames, a generation processing to generate, based on difference data between a frame and the prediction frame for predicting the frame as well as a prediction frame, a reference frame referred to by a frame inputted temporally after the frame and a motion compensation processing to use a specific reference frame among the reference frames generated by the generation processing to execute the motion compensation on a frame imaged at the second frame rate among a plurality of frames.

This can fix the reference frame to the specific reference frame, thus providing an efficient motion compensation realized by software.

It is noted that the above-described video compression program of (1-14) and (1-15) may be recorded in portable recording media such as CD-ROM, DVD-ROM, a flash memory, or the memory card 504. The above-described video compression program of (1-14) and (1-15) may be recorded in a server providing a downloading operation to a video compression apparatus or the electronic device 500.

The following section will describe the illustrative embodiment 2. In the illustrative embodiment 1, the frames F2, F4, . . . shown in FIG. 10 have the ranges Da1, Da3, . . . . Thus, the ranges Da1, Da3, . . . are subjected by the image processing unit 901 to a painting operation with a specific color or a demosaic processing. In the illustrative embodiment 2, the image processing unit 901 generates the frames F2, F4, . . . causing a reduced sense of incongruity without executing such an image processing.

It is noted that, in the illustrative embodiment 2, a configuration that includes the image processing unit 901 and that does not include the imaging element 100 or the compression unit 902 is called an image processing apparatus. It is noted that, in the illustrative embodiment 1, the compression unit 902 compresses the frame subjected to the image processing by the image processing apparatus (the image processing unit 901). However, this compression is not always required. Thus, not-compressed frame may be directly outputted to the liquid crystal monitor 503. It is noted that, in the illustrative embodiment 2, the parts common in the illustrative embodiment 1 are denoted with the same reference numerals and will not be described further.

<Modified Example of Video Compression>

The following section will describe the modified example of the video compression in the illustrative embodiment 2. In FIG. 10, the image processing example 1 is described in which the electronic device 500 photographs a running railway train as a specific subject during a fixed point photographing of the scenery including a rice field, mountain, and sky. The following section will specifically describe the flow of the processing of the video processing example 1.

Figure 25:
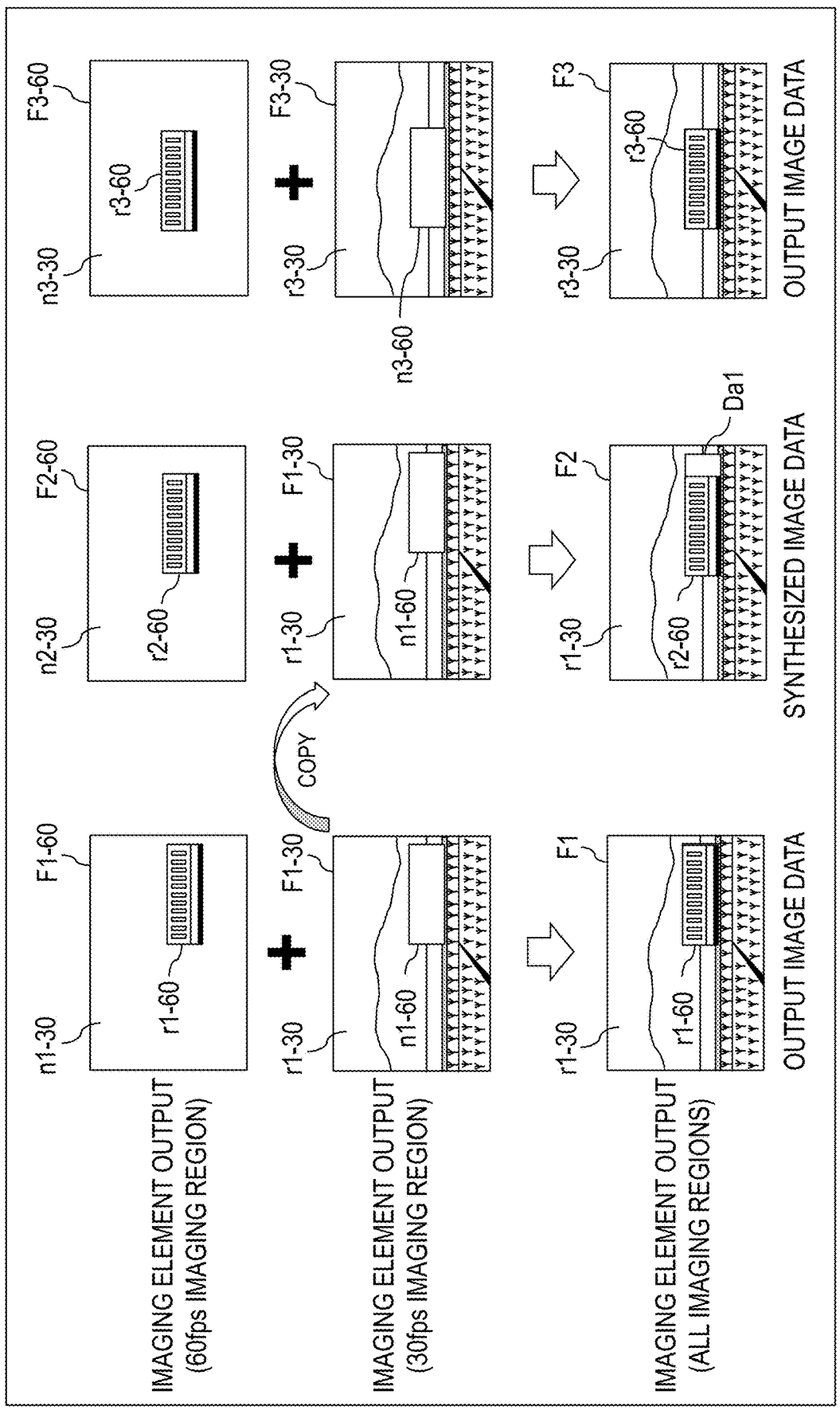
FIG. 25 illustrates the flow of the identification processing of the video processing example 1 shown in FIG. 10.

FIG. 25 illustrates the flow of the identification processing of the video processing example 1 shown in FIG. 10. As has been described for FIG. 10, the imaging element 100 outputs the frames F1, F2-60, F3, . . . in the order of time scales. It is assumed that the railway train runs from right to left within the frames F1, F2-60, and F3.

In FIG. 25, the branch numbers of the frames F1-F3 show the frame rates of the frames F1-F3. For example, the odd number frame F1-30 shows the image data of the first image region r1-30 of the frame F1 imaged at the frame rate of 30 [fps]. The frame F1-60 shows the image data of the second image region r1-60 of the frame F1 imaged at the frame rate of 60 [fps].

The frame F1-60 has the second image region r1-60 imaged at the frame rate of 60 [fps] that has the image data of the railway train. However, the frame F1-30 does not include the second image region r1-60. Such a region in the frame F1-30 is called a non-image region n1-60. Similarly, in the case of the frame F1-60, the first image region r1-30 of the frame F1-30 imaged at the frame rate of 30 [fps] has the scenery image data. However, the frame F1-60 does not have the scenery image data in the second image region r1-60. Such a region in frame F1-60 is called a non-image region n1-30.

Similarly, in the case of the frame F3, the frame F3-30 is composed of the first image region r3-30 to which the scenery image data is outputted and the non-image region n3-60 to which nothing is outputted. The frame F3-60 is composed of the second image region r3-60 to which the image data of the railway train is outputted and the non-image region n3-60 to which nothing is outputted. This also applies to odd number frames after the frames F3-30 and F3-60 (not shown).

The even number frame F2-60 is a frame composed of the image data (railway train) of the second image region r2-60 imaged at the frame rate of 60 [fps] and the non-image region n2-30 to which nothing is outputted. This also applies to even number frames (not shown) after these frames.

The image processing unit 901 synthesizes the image data of the second image region r2-60 of the frame F2-60 (railway train) and the image data of the first image region r1-30 of the frame F1-30 (scenery) to thereby generate the frame F2 as synthesized image data. In this case, as has been described for FIG. 10, the frame F2 has the range Da1 in which the non-image region n1-60 of the frame F1-30 and the non-image region n2-30 of the frame F2-60 are overlapped.

In the illustrative embodiment 1, the image processing unit 901 paints the range Da1 with a specific color or subjects the range Da1 to the demosaic processing. However, in the illustrative embodiment 2, the image processing unit 901 copies the image data of the range Da1 in another image region without executing such an image processing. This allows the image processing unit 901 to generate the frame F2 causing a reduced sense of incongruity. This also applies to the range Da3 and will be described by paying attention on the range Da1 in the illustrative embodiment 2.
<Synthesis Example of Frame F2>

Next, the following section will describe the synthesis example of the frame F2 by the image processing unit 901 (the synthesis unit 1214).

Synthesis Example 1

Figure 26:
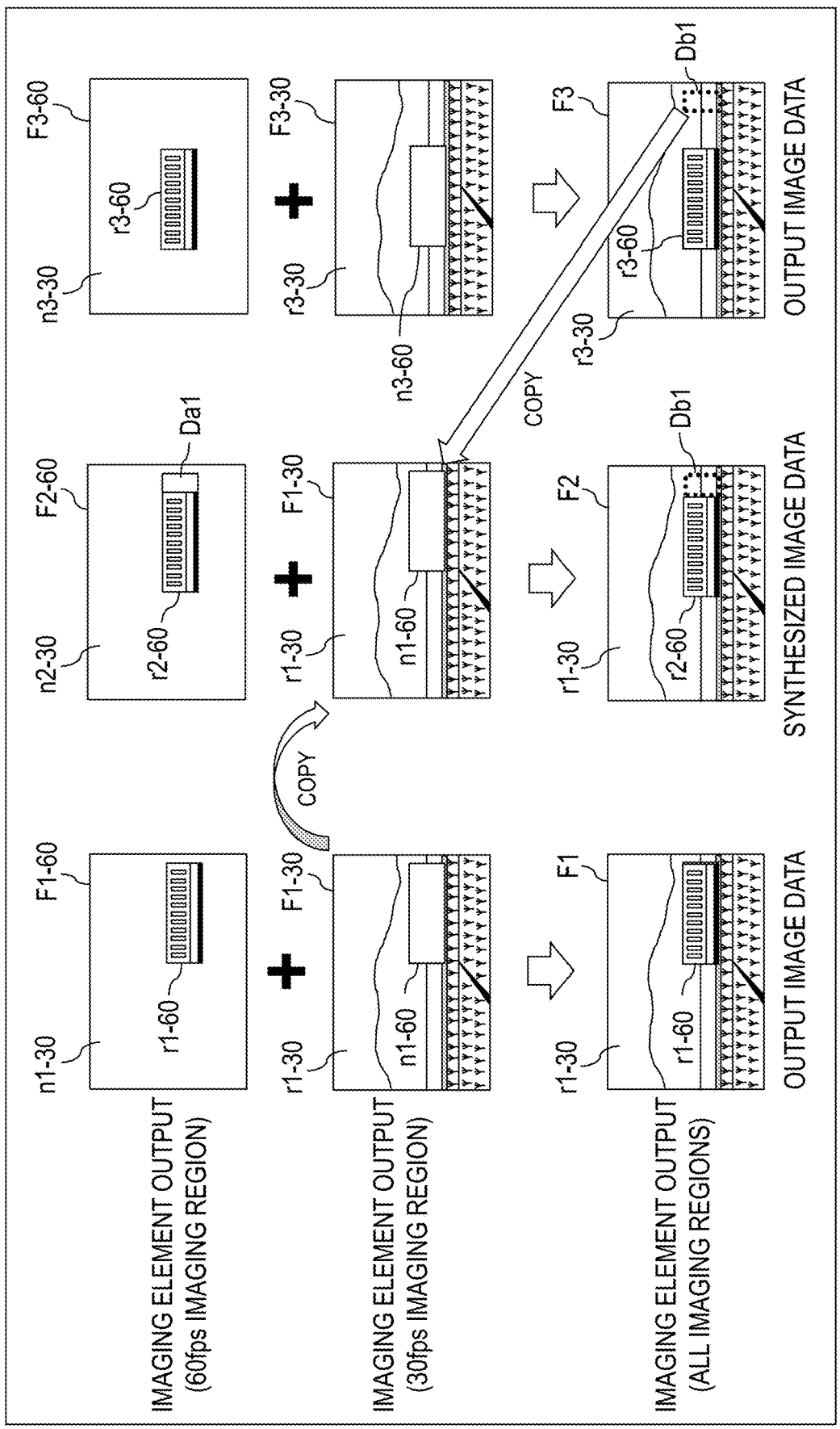
FIG. 26 illustrates the synthesis example 1 of the frame F2 of 60 [fps] according to illustrative embodiment 2.

FIG. 26 illustrates the synthesis example 1 of the frame F2 of 60 [fps] according to illustrative embodiment 2. The synthesis example 1 is an example to use, as another image region as a copy target to the range Da1, the range Db1 at the same position as that of the range Da1 in the first image region r3-30 of the frame F3 temporally after the frame F2-60. The image data of the range Db1 is a part of the scenery.

In FIG. 26, the image processing unit 901 identifies the range Da1 in which the non-image region n1-60 of the frame F1-30 and the non-image region n2-30 of frame F2-60 are overlapped to identify, from the frame F3, the range Db1 at the same position as that of the identified range Da1. Then, the image processing unit 901 copies the image data of the range Db1 to the range Da1 in the frame F2. This allows the image processing unit 901 can generate the frame F2 causing a reduced sense of incongruity.

Synthesis Example 2

Figure 27:
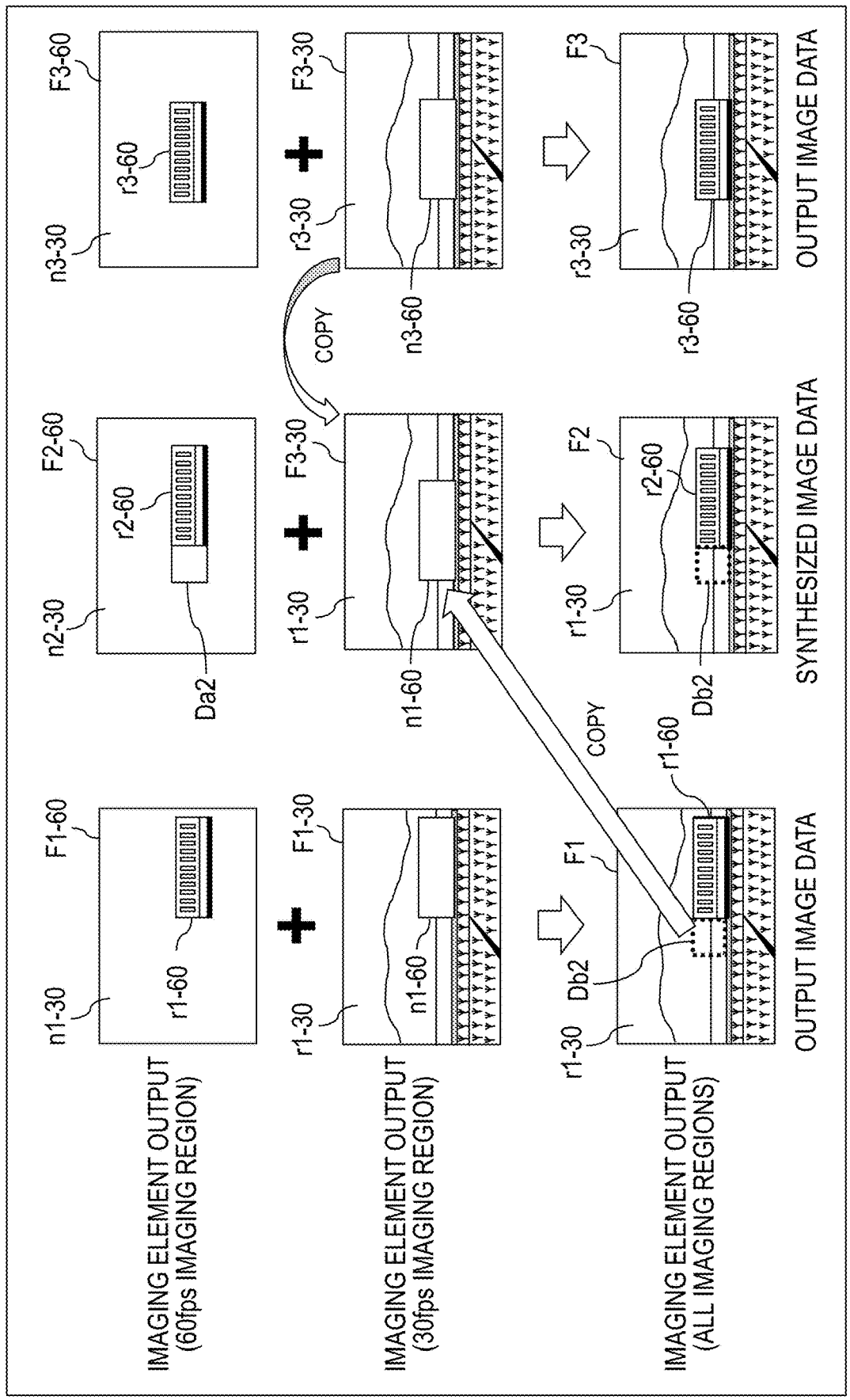
FIG. 27 illustrates the synthesis example 2 of the frame F2 of 60 [fps] according to illustrative embodiment 2.

FIG. 27 illustrates the synthesis example 2 of the frame F2 of 60 [fps] according to illustrative embodiment 2. In the synthesis example 1, the image data of the first image region r1-30 of the frame F1-30 is a copy source to the first image region of the frame F2 and the image data of frame F3 is a copy source to the range Da1. However, in the synthesis example 2 has an inverse configuration in which the image data of the first image region r3-30 of the frame F3-30 is a copy source to the first image region of the frame F2 and the image data of the range Db2 of the frame F1 is a copy source to the range Da2.

The range Da2 is a range in which the non-image region n3-60 of the frame F3-30 and the non-image region n2-30 of the frame F2-60 are overlapped. The range Db2 of the frame F1 is a range at the same position as that of the range Da2.

In FIG. 27, the image processing unit 901 identifies the range Da2 in which the non-image region n3-60 of the frame F3-30 and the non-image region n2-30 of the frame F2-60 are overlapped to identify, from the frame F1, the range Db2 at the same position as that of the identified range Da2. Then, the image processing unit 901 copies the range Db2 to the image data of the range Da2 in the frame F2. This allows the image processing unit 901 to generate the frame F2 causing a reduced sense of incongruity.

Synthesis Example 3

The synthesis example 3 is an example in which any one of the synthesis example 1 and the synthesis example 2 is selected and synthesized. In the synthesis example 3, the image processing unit 901 identifies the range Da1 in the synthesis example 1 and the range Da2 in the synthesis example 2. The image processing unit 901 selects any one of the ranges Da1 and Da2 to use the synthesis example in which the selected range is identified. The image processing unit 901 uses the synthesis example 1 when the range Da1 is selected and uses the synthesis example 2 when the range Da2 is selected.

The image processing unit 901 uses the narrowness of the range as a selection reference to select any one of the ranges Da1 and Da2. In the examples of FIG. 26 and FIG. 27, the range Da1 is narrower than the range Da2 and thus the synthesis example 1 is applied to the range Da1. By selecting a narrower range, the sense of incongruity due to copying can be minimized.

Synthesis Example 4

Figure 28:
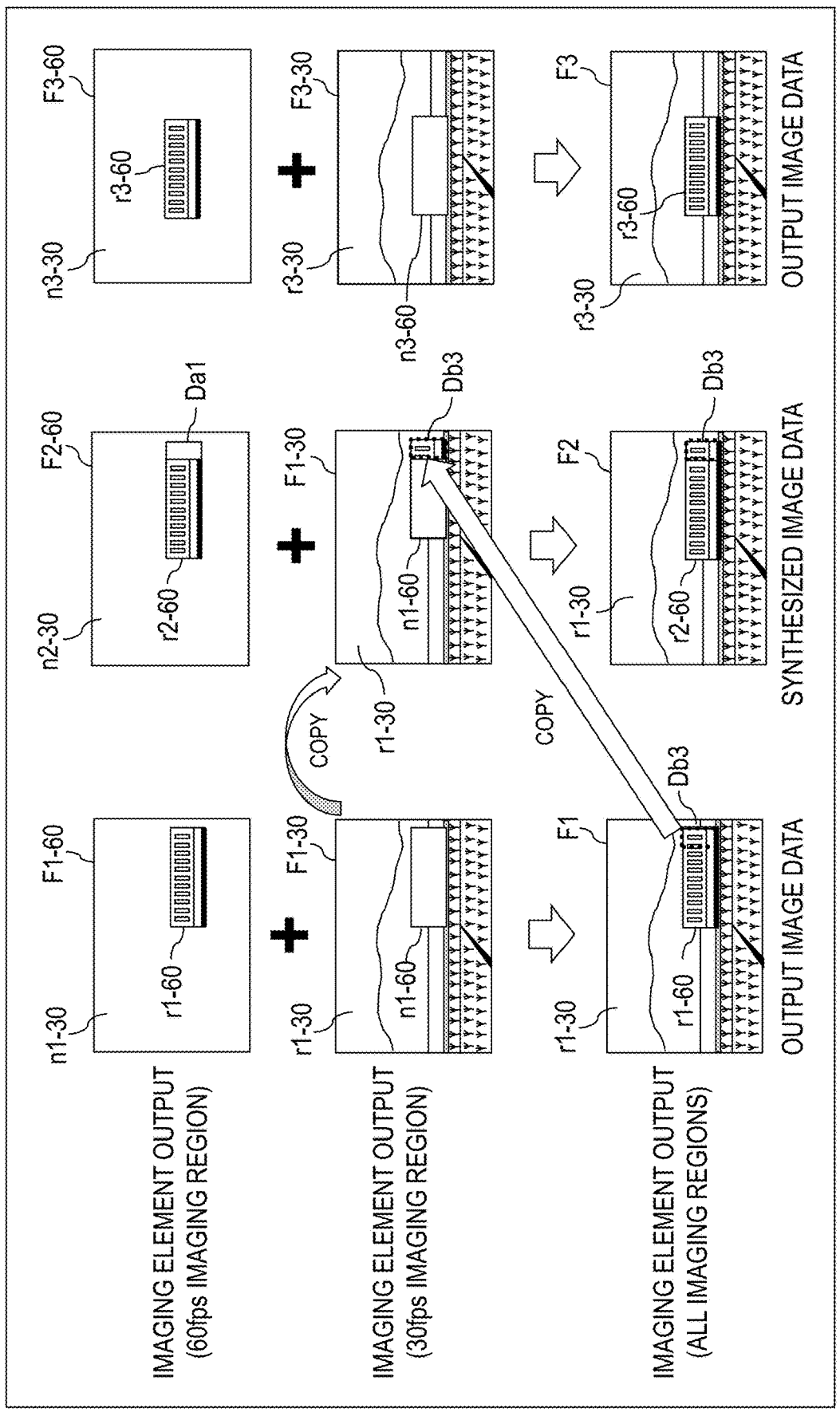
FIG. 28 illustrates the synthesis example 4 of the frame F2 of 60 [fps] according to illustrative embodiment 2.

FIG. 28 illustrates the synthesis example 4 of the frame F2 of 60 [fps] according to illustrative embodiment 2. The synthesis example 4 sets the copy source of the range Da1 in the synthesis example 1 not to the image data of the range Db1 in the first image region r3-30 of the frame F3 (a part of the scenery) but to the image data of the range Db3 in the second image region r1-60 of the frame F1 (the end of the railway train). This allows the image data of the second image region r2-60 in the frame F2 (railway train) is added with the image data of the range Db3. However, the image data of the range Db3 is added in an opposite direction to the direction along which the image data of the second image region r2-60 (railway train) proceeds. Thus, when the user sees the video, the user misapprehends that the image data of the second image region r2-60 (railway train) is the afterimage of the running railway train. Thus, the frames F2, F4, . . . causing a reduced sense of incongruity can be also generated in this case.
<Synthesis Processing Procedure Example of Frame F2>

The following section will describe the synthesis processing procedure example of the frame F2 according to the above-described synthesis example 1 to synthesis example 4. In the following flowchart, the second frame is a frame imaged only at the second frame rate (e.g., 60 [fps]) as a synthesis target (e.g., the frame F2 of FIG. 25 to FIG. 28).

The first frame is a frame that is temporally previous to the second frame and that includes an image region imaged at at least the first frame rate among the first frame rate (e.g., 30 [fps]) and the second frame rate (e.g., frame F1 of FIG. 25 to FIG. 28).

The third frame is a frame that is temporally after the second frame and that includes an image region imaged at at least the first frame rate among the first frame rate and the second frame rate (e.g., frame F3 of FIG. 25 to FIG. 28).

Synthesis Example 1

Figure 29:
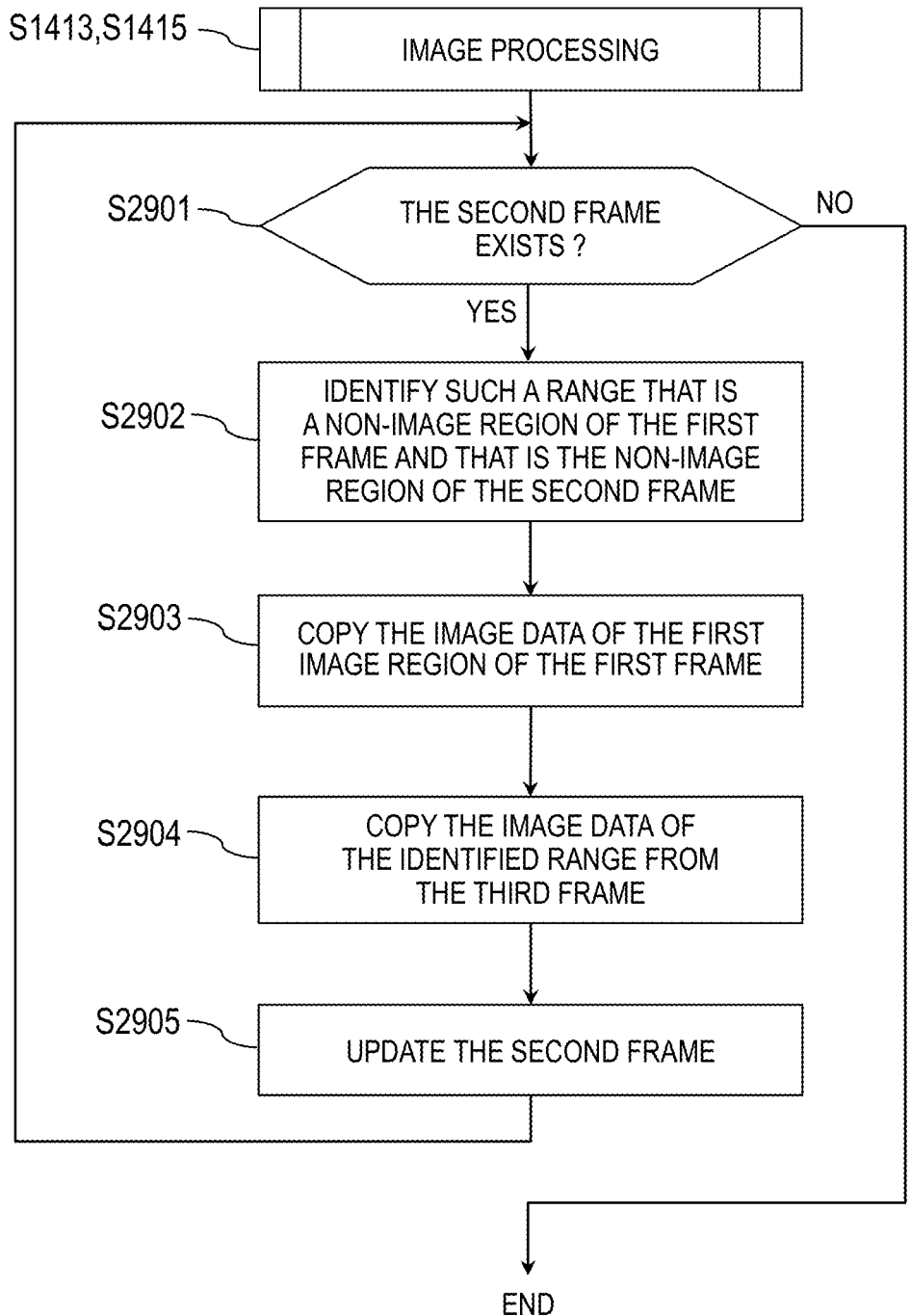
FIG. 29 is a flowchart illustrating the synthesis processing procedure example 1 by the synthesis example 1 of the frame F2 by the image processing unit.

FIG. 29 is a flowchart illustrating the synthesis processing procedure example 1 by the synthesis example 1 of the frame F2 by the image processing unit 901. It is noted that the input frame is sequentially accumulated in the buffer. The image processing unit 901 judges whether or not the buffer has the second frame (Step S2901). When the buffer has the second frame (Step S2901: Yes), the image processing unit 901 identifies a range that is the non-image region of the first frame and the non-image region of the second frame (Step S2902). Specifically, the image processing unit 901 identifies the range Da1 in which the non-image region n1-60 of the frame F1-30 and the non-image region n2-30 of the frame F2-60 are overlapped for example.

Next, the image processing unit 901 copies the image data of the first image region a1 of the first frame (Step S2903). Specifically, the image processing unit 901 copies the image data of the first image region r1-30 of the frame F1 (scenery) for example.

Then, the image processing unit 901 copies, from the third frame, the image data of the range identified in Step S2902 (Step S2904). Specifically, the image processing unit 901 copies, from the frame F3, the image data of the same range Db1 as the range Da1 identified in Step S2902 for example.

Next, the image processing unit 901 updates the second frame (Step S2905). Specifically, the image processing unit 901 synthesizes the second image region r2-60 of the frame F2-60, the copied image data the first image region r1-30 (scenery), and the copied image data of the range Db1 to thereby update the frame F2-60 as the frame F2 for example.

Thereafter, the processing returns to Step S2901. When the buffer does not have the second frame (Step S2901: No), the image processing unit 901 completes the image processing (Steps S1413 and S1415). This allows the image processing unit 901 to generate the frame F2 causing a reduced sense of incongruity.

Synthesis Example 2

Figure 30:
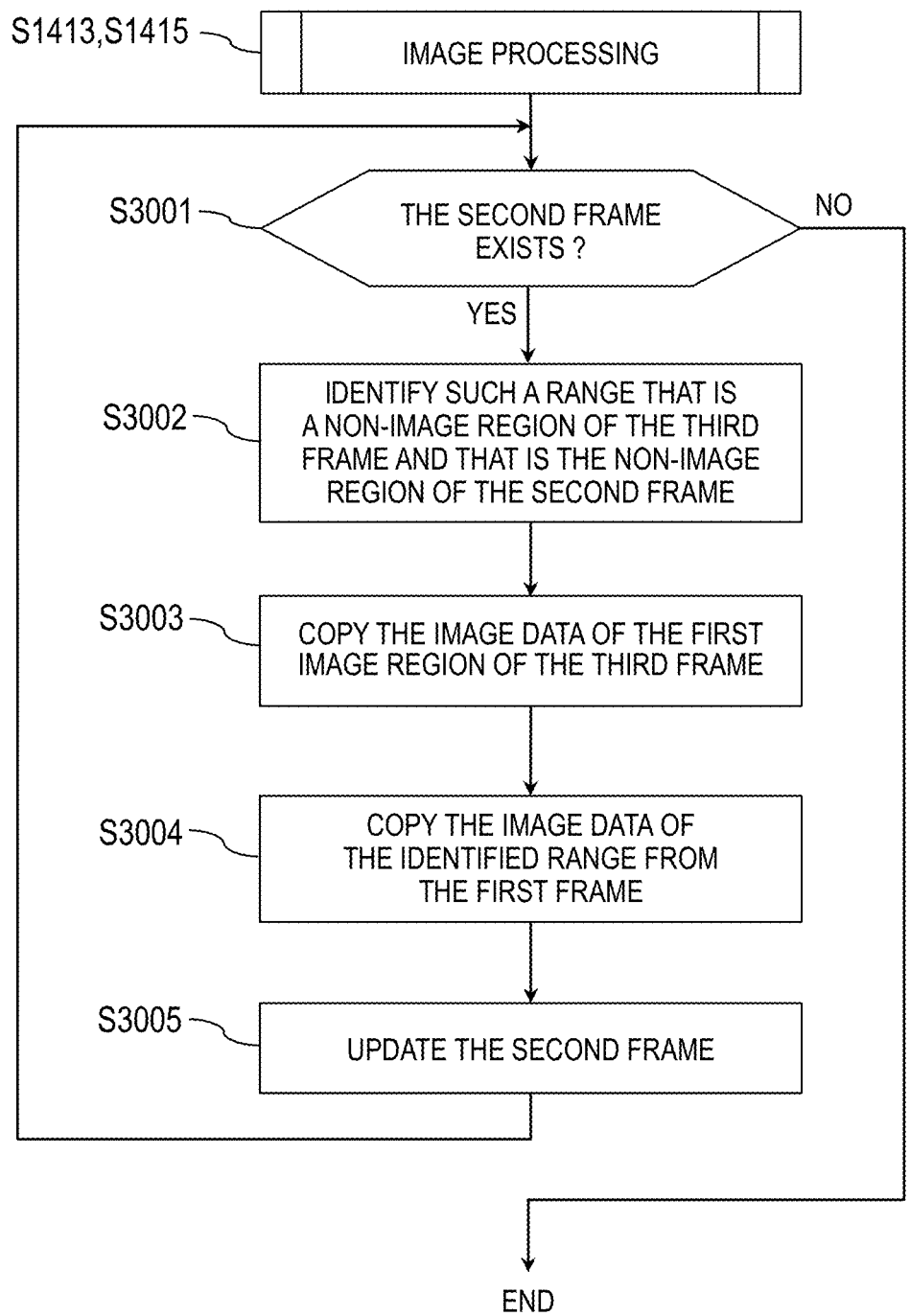
FIG. 30 is a flowchart illustrating the synthesis processing procedure example 2 by the synthesis example 2 of the frame F2 by the image processing unit.

FIG. 30 is a flowchart illustrating the synthesis processing procedure example 2 by the synthesis example 2 of the frame F2 by the image processing unit 901. It is noted that the input frame is sequentially accumulated in the buffer. The image processing unit 901 judges whether or not the buffer has the second frame (Step S3001). When the buffer has the second frame (Step S3001: Yes), then the image processing unit 901 identifies a range that is the non-image region of the third frame and that is the non-image region of the second frame (Step S3002). Specifically, the image processing unit 901 identifies the range Da2 in which the non-image region n3-60 of the frame F3-30 and the non-image region n2-30 of the frame F2-60 are overlapped example.

Next, the image processing unit 901 copies the image data of the first image region a1 of the third frame (Step S3003). Specifically, the image processing unit 901 copies the image data of the first image region r3-30 of the frame F3 (scenery) for example.

Then, the image processing unit 901 copies, from the first frame, the image data of the range identified in Step S3002 (Step S3004). Specifically, the image processing unit 901 copies, from the frame F1, the image data of the same range Db2 as the range Da2 identified in Step S3002 for example.

Next, the image processing unit 901 updates the second frame (Step S3005). Specifically, the image processing unit 901 synthesizes the second image region r2-60 of the frame F2-60, the copied image data of the first image region r3-30 (scenery), and the copied image data of the range Db2 to thereby the frame F2-60 as the frame F2 for example.

Thereafter, the processing returns to Step S3001. When the buffer does not have the second frame (Step S3001: No), the image processing unit 901 completes the image processing (Steps S1413 and S1415). This allows the image processing unit 901 to generate the frame F2 causing a reduced sense of incongruity.

Synthesis Example 3

Figure 31:
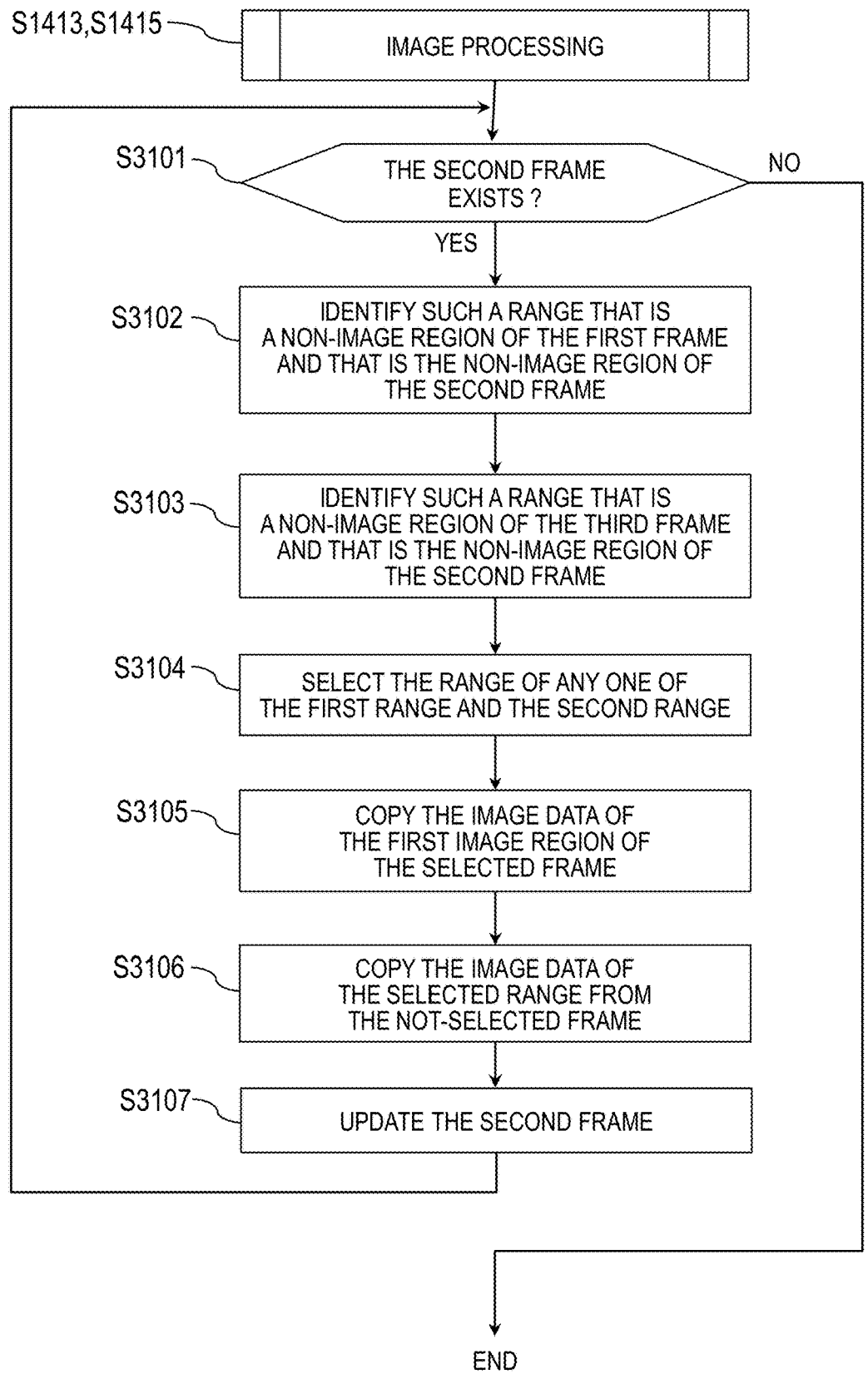
FIG. 31 is a flowchart illustrating the synthesis processing procedure example 3 by the synthesis example 3 of the frame F2 by the image processing unit.

FIG. 31 is a flowchart illustrating the synthesis processing procedure example 3 by the synthesis example 3 of the frame F2 by the image processing unit 901. It is noted that the input frame is sequentially accumulated in the buffer. The image processing unit 901 determines whether or not the buffer has the second frame (Step S3101). When the buffer has the second frame (Step S3101: Yes), the image processing unit 901 identifies the first range that is the non-image region of the first frame and that is the non-image region of the second frame (Step S3102). Specifically, the image processing unit 901 identifies the range Da1 in which the non-image region n1-60 of the frame F1-30 and the non-image region n2-30 of the frame F2-60 are overlapped.

The image processing unit 901 identifies the second range that is the non-image region of the third frame and the non-image region of the second frame (Step S3103). Specifically, the image processing unit 901 identifies the range Da2 in which the non-image region n3-60 of the frame F3-30 and the non-image region n2-30 of the frame F2-60 are overlapped for example.

Next, the image processing unit 901 selects any one of the identified first range and second range (Step S3104). Specifically, the image processing unit 901 selects a narrower range (or a range having a smaller area) from among the first range and the second range for example. The selected range is called a selected range. In the case of the ranges Da1 and Da2, the image processing unit 901 selects the range Da1. This can consequently minimize the range use for the synthesis, thus further suppressing the sense of incongruity.

Then, the image processing unit 901 copies the image data of the first image region a1 of the selected frame (Step S3105). The selected frame is a frame based on which the selected range is identified. When the first range (range Da1) is selected for example, the selected frame is the first frame (frame F1). When the second range (range Da2) is selected, the selected frame is the third frame (frame F3). Thus, the image data of the first image region a1 of the selected frame is the image data of the first image region r1-30 of the frame F1 (scenery) when the selected frame is the frame F1 and is the image data of the first image region r3-30 of the frame F3 (scenery) when the selected frame is the frame F3.

Then, the image processing unit 901 copies the image data of the selected range of Step S3104 from the not-selected frame (Step S3106). The not-selected frame is a frame based on which the not-selected range is identified. When the first range (range Da1) is not selected for example, the not-selected frame is the first frame (frame F1). When the second range (range Da2) is not selected, the not-selected frame is the third frame (frame F3). Thus, when the selected range is the range Da1, the image processing unit 901, copies, from the frame F3, the image data of the range Db1 at the same position as that of the range Da1 and, when the selected range is the range Da2, copies, from frame F1, the image data of the range Db2 at the same position as that of the range Da2.

Next, the image processing unit 901 updates the second frame (Step S3107). Specifically, when the selected range is the first range (range Da1) for example, the image processing unit 901 synthesizes the second image region r2-60 of the frame F2-60, the copied image data of the first image region r1-30 (scenery), and the copied image data of the range Db1 to thereby update the frame F2-60 as the frame F2. When the selected range is the second range (range Da2), the image processing unit 901 synthesizes the second image region r2-60 of the frame F2-60, the copied image data of the first image region r3-30 (scenery), and the copied image data of the range Db2 to thereby update the frame F2-60 as the frame F2.

Thereafter, the processing returns to Step S3101. When the buffer does not have the second frame (Step S3101: No), the image processing unit 901 completes the image processing (Steps S1413 and S1415). This allows the image processing unit 901 to select a narrower range, thus minimizing the sense of incongruity due to the copying operation.

Synthesis Example 4

Figure 32:
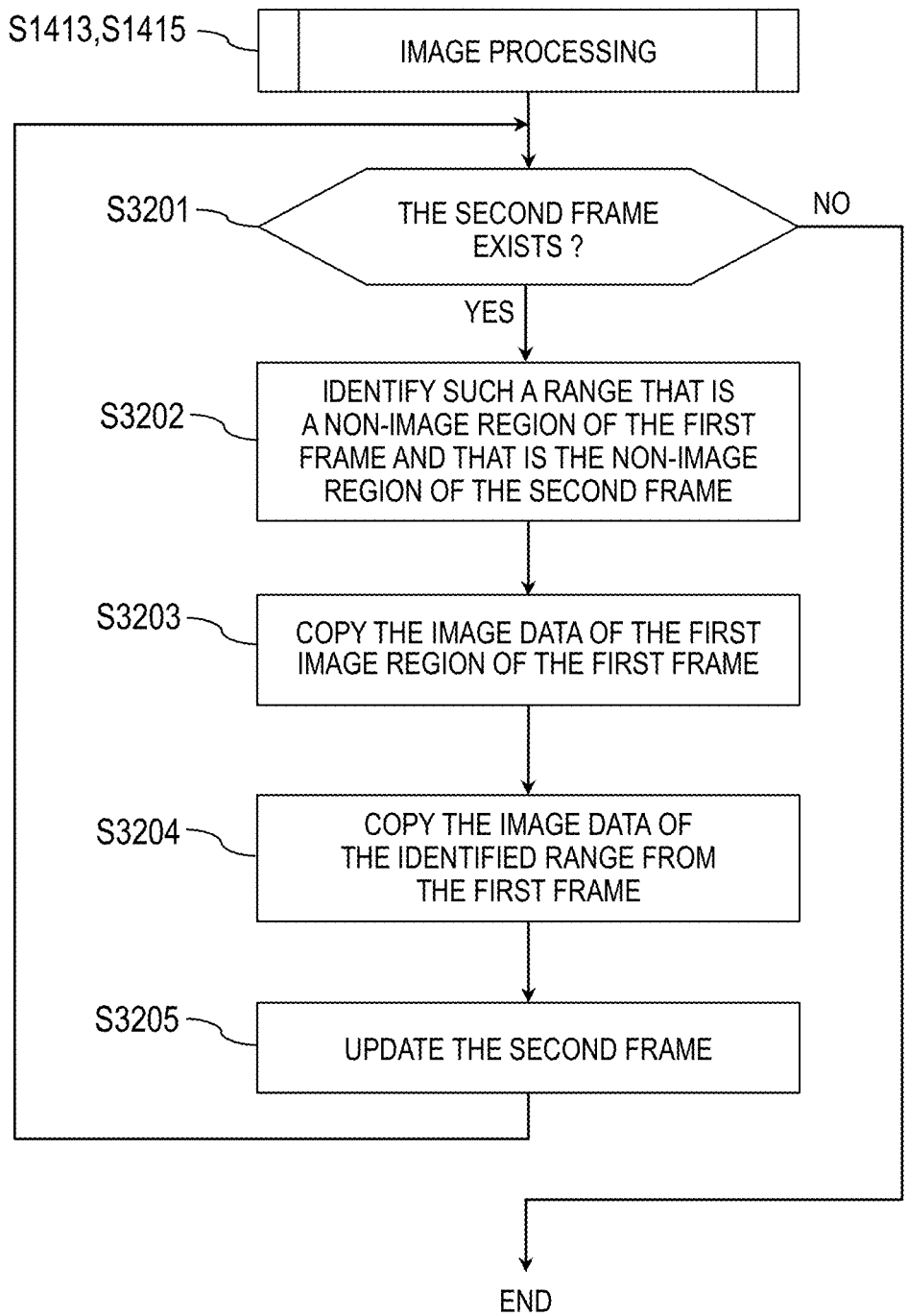
FIG. 32 is a flowchart illustrating the synthesis processing procedure example 4 by the synthesis example 4 of the frame F2 by the image processing unit.

FIG. 32 is a flowchart illustrating the synthesis processing procedure example 4 by the synthesis example 4 of the frame F2 by the image processing unit 901. It is noted that the input frame is sequentially accumulated in the buffer. The image processing unit 901 determines whether or not the buffer has the second frame (Step S3201). When the buffer has the second frame (Step S3201: Yes), the image processing unit 901 identifies a range that is the non-image region of the first frame and the non-image region of the second frame (Step S3202). Specifically, the image processing unit 901 identifies the range Da1 in which the non-image region n1-60 of the frame F1-30 and the non-image region n2-30 of the frame F2-60 are overlapped for example.

Next, the image processing unit 901 copies the image data of the first image region a1 of the first frame (Step S3203). Specifically, the image processing unit 901 copies the image data of the first image region r1-30 of the frame F1 (scenery) for example.

Then, the image processing unit 901 copies, from the first frame, the image data identified in Step S3202 (Step S3204). Specifically, the image processing unit 901 copies, from frame F1, the image data of the same range Db3 as the range Da1 identified in Step S3202 for example.

Next, the image processing unit 901 updates the second frame (Step S3205). Specifically, the image processing unit 901 synthesizes the second image region r2-60 of the frame F2-60, the copied image data of the first image region r1-30 (scenery), and the copied image data of the range Db1 to thereby update the frame F2-60 as the frame F2 for example.

Thereafter, the processing returns to Step S3201. When the buffer does not have the second frame (Step S3201: No), the image processing unit 901 completes the image processing (Steps S1413 and S1415). This allows the image processing unit 901 to generate the frame F2 causing a reduced sense of incongruity.

(2-1) As described above, the image processing apparatus of the illustrative embodiment 2 executes the image processing on a plurality of frames generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

The image processing apparatus has the identification unit 1213 and the synthesis unit 1214. The identification unit 1213 identifies the range Da1 that is the non-image region n1-60 corresponding to the second imaging region in the first frame and that is the non-image region n2-30 corresponding to the first imaging region in the second frame based on the first frame generated based on the outputs from the first imaging region and the second imaging region and the second frame generated based on the output from the second imaging region (e.g., frame F2-60) among a plurality of frames.

The synthesis unit 1214 synthesizes the second frame, the image data of the first image region r1-30 corresponding to the first imaging region at the first frame, the image data of the first image region r1-30 at the first frame, and identified image data of the range Da1 identified by the identification unit 1213 in other image regions other than the second frame.

As a result, a frame temporally close to the second frame can be interpolated to the non-image region n2-30 not imaged in the second frame. Thus, such a synthesized frame can be obtained that causes a lower sense of incongruity than the second frame.

(2-2) Furthermore, according to the above (2-1) image processing apparatus, the first frame is a frame generated temporally previous to the second frame (e.g., frame F1). Identified image data may be the image data of the range (Da1) in the first image region a1 (r3-30) of the frame (e.g., frame F3) generated temporally after the second frame based on the outputs from the first imaging region and the second imaging region (i.e., the image data of the range Db1).

Thus, the first frame temporally previous to the second frame and the third frame temporally after the second frame can be interpolated to the non-image region n2-30 not imaged in the second frame. Thus, such a synthesized frame can be obtained that causes a lower sense of incongruity than the second frame.

(2-3) Furthermore, according to the above (2-1) image processing apparatus, the first frame is a frame generated temporally after the second frame (e.g., frame F3). Identified image data may be the image data of the range (Da2) in the first image region a1 (r1-30) of the frame (e.g., frame F1) generated temporally previous to the second frame based on the outputs from the first imaging region and the second imaging region (i.e., the image data of the range Db2).

Thus, the first frame temporally previous to the second frame and the third frame temporally after the second frame can be interpolated to the non-image region n2-30 not imaged in the second frame. Thus, such a synthesized frame can be obtained that causes a lower sense of incongruity than the second frame.

(2-4) Furthermore, according to the above (2-1) image processing apparatus, the identification unit 1213 identifies the range used by the synthesis unit 1214 based on the first range (Da1) and the second range (Da2). The synthesis unit 1214 synthesizes the image data of the first image region a1(r1-30/r3-30) in one frame (F1/F3) from which one range (Da1/Da2) among the second frame, the first frame and the third frame that is identified by the identification unit 1213 is identified and the image data (Db1/Db2) of one range (Da1/Da2) in the first image region a1(r3-30/r1-30) of the other frame (F3/F1) from which the other range (Da2/Da1) among the first frame and the third frame that is not identified by the identification unit 1213 is identified.

This allows the image processing unit 901 to select a narrower range, thus minimizing the sense of incongruity due to the copy operation.

(2-5) Furthermore, according to the above (2-1) image processing apparatus, the first frame is a frame temporally generated prior to the second frame. Identified image data may be the image data of the range (Da1) in the second image region a2 of the first frame (i.e., the image data of the range Db3).

As a result, the first frame temporally previous to the second frame can be interpolated to the non-image region n2-30 not imaged in the second frame. Thus, such a synthesized frame can be obtained that causes a lower sense of incongruity than the second frame.

(2-6) Furthermore, the video compression apparatus according to illustrative embodiment 2 compresses video data including a plurality of frames generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

The video compression apparatus has the identification unit 1213 and the synthesis unit 1214. The identification unit 1213 identifies the range Da1 that is the non-image region n1-60 corresponding to the second imaging region in the first frame and that is the non-image region n2-30 corresponding to the first imaging region in the second frame based on the first frame generated based on the outputs from the first imaging region and the second imaging region and the second frame generated based on the output from the second imaging region (e.g., frame F2-60) among a plurality of frames.

The synthesis unit 1214 synthesizes the second frame, the image data of the first image region r1-30 corresponding to the first imaging region at the first frame, and the identified image data of the range Da1 identified by the identification unit 1213 in the image data of the first image region r1-30 at the first frame and other image regions other than the second frame.

The compression unit 902 compresses the first frame and the frame synthesized by the synthesis unit 1214.

This can provide a synthesized frame that can be compressed like the second frame and that causes a lower sense of incongruity than the second frame.

(2-7) Furthermore, the image processing program according to the illustrative embodiment 2 causes the processor 1201 to execute the image processing of a plurality of frames generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

The image processing program causes the processor 1201 to execute an identification processing and a synthesis processing. In the identification processing, the image processing program causes the processor 1201 to identify range Da1 that is the non-image region n1-60 corresponding to the second imaging region in the first frame and that is the non-image region n2-30 corresponding to the first imaging region in the second frame based on the first frame generated based on the outputs from the first imaging region and the second imaging region and the second frame generated based on the output from the second imaging region (e.g., frame F2-60) among a plurality of frames.

In the synthesis processing, the image processing program causes the processor 1201 to synthesize the second frame, the image data of the first image region r1-30 corresponding to the first imaging region at the first frame, the identified image data of the range Da1 identified by the identification processing in the image data of the first image region r1-30 at the first frame and other image regions other than the second frame.

This allows the non-image region n2-30 not imaged in the second frame to be interpolated by software using a frame temporally close to the second frame. Thus, the software can provide a synthesized frame causing a lower sense of incongruity than the second frame.

(2-8) Furthermore, the video compression program according to illustrative embodiment 2 causes the processor 1201 to execute the identification processing, the synthesis processing, and a compression processing.

The video compression program causes the processor 1201 to execute the identification processing and the synthesis processing. In the identification processing, the image processing program causes the processor 1201 to identify the range Da1 that is the non-image region n1-60 corresponding to the second imaging region in the first frame and that is the non-image region n2-30 corresponding to the first imaging region in the second frame based on the first frame generated based on the outputs from the first imaging region and the second imaging region and the second frame generated based on the output from the second imaging region (e.g., the frame F2-60) among a plurality of frames.

In the synthesis processing, the video compression program causes the processor 1201 to synthesize the second frame, the image data of the first image region r1-30 corresponding to the first imaging region at the first frame, and the identified image data of the range Da1 identified by the identification processing in the image data of the first image region r1-30 at the first frame and other image regions other than the second frame.

In the compression processing, the video compression program causes the processor 1201 to compress the first frame and the frame synthesized by the synthesis processing.

This can allow the software to provide a synthesized frame that can be compressed like the second frame and that causes a lower sense of incongruity than the second frame.

It is noted that the above-described (2-7) image processing program and (2-8) video compression program may be stored in a portable recording medium (e.g., CD-ROM, DVD-ROM, flash memory, the memory card 504). Furthermore, the above-described (2-7) image processing program and (2-8) video compression program may be recorded in a video compression apparatus or a server providing the downloading operation to the electronic device 500.

The following section will describe the illustrative embodiment 3. In the illustrative embodiment 1, in the frames F2, F4, . . . of FIG. 10, the ranges Da1, Da3, . . . exist. Thus, the ranges Da1, Da3 are painted with a specific color by the image processing unit 901 or is subjected by the image processing unit 901 to the demosaic processing. In the illustrative embodiment 3, as in the illustrative embodiment 2, the image processing unit 901 generates, without executing such an image processing, the frames F2, F4, . . . that cause a lower sense of incongruity.

It is noted that, in the illustrative embodiment 3, such a configuration that includes the image processing unit 901 and that does not include the imaging element 100 or the compression unit 902 is called an image processing apparatus. A configuration including the imaging element 100 and the preprocessing unit 1210 is called an imaging apparatus. It is noted that, in the illustrative embodiment 1, the compression unit 902 compresses the frame subjected to image processing of the image processing apparatus (the image processing unit 901). However, this compression of the frame is not always required and the frame may be directly outputted the liquid crystal monitor 503 without being compressed. It is noted that, in the illustrative embodiment 3, the same parts as those of the illustrative embodiment 1 and the illustrative embodiment 2 are denoted with the same reference numerals and will not be described further.

Figure 33:
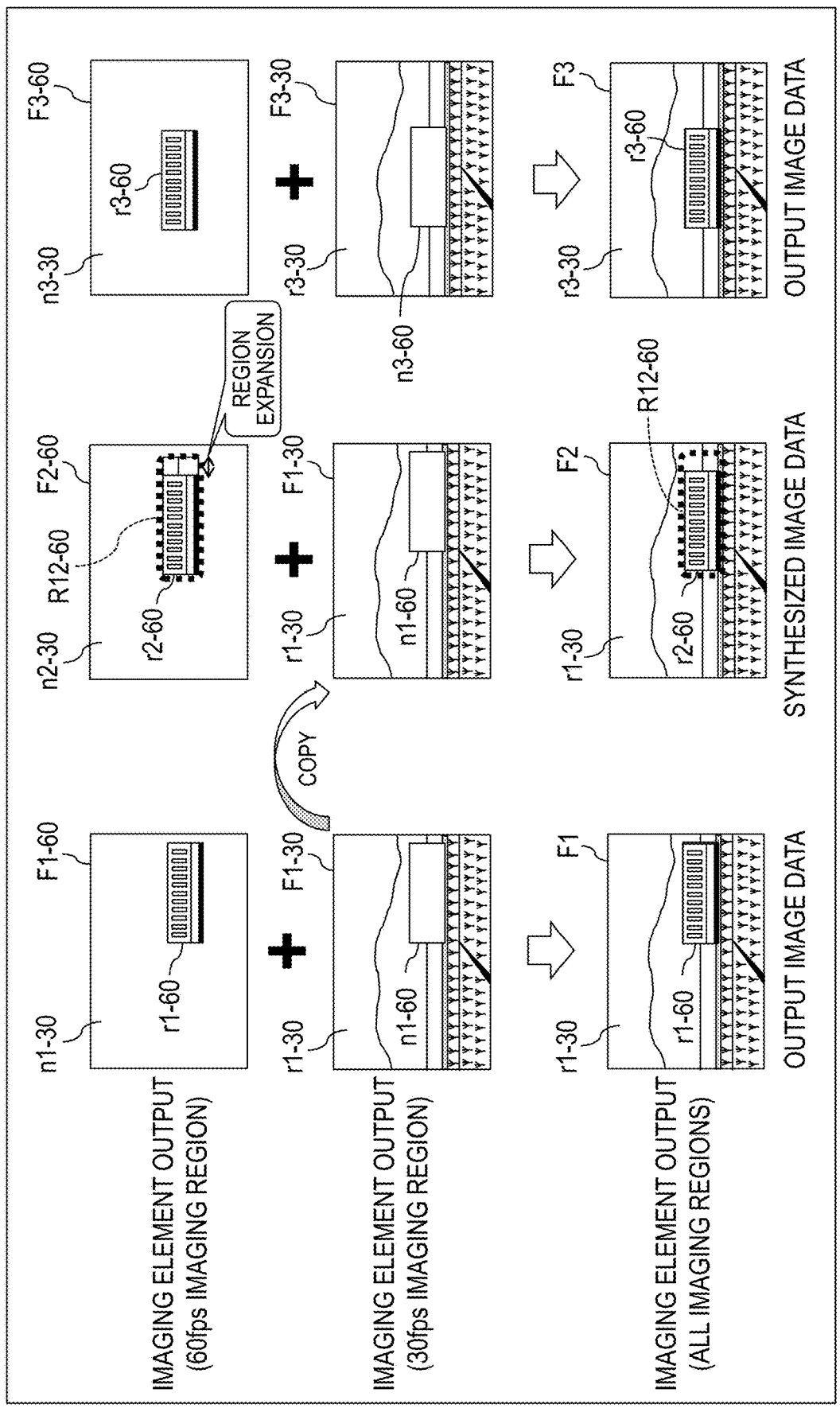
FIG. 33 illustrates the synthesis example of the frame F2 of 60 [fps] according to the illustrative embodiment 3.

FIG. 33 illustrates the synthesis example of the frame F2 of 60 [fps] according to the illustrative embodiment 3. Prior to the imaging of the frame F2-60, the preprocessing unit 1210 detects, from the frame F1 prior to the frame F2-60 for example, a specific subject such as a railway train and detects the motion vector of the specific subject in the previous frame F1. The preprocessing unit 1210 can use the image region of the specific subject of the frame F1 and the motion vector to obtain the image region R12-60 of 60 [fps] in the next frame F2-60.

In the synthesis of the frame F2 as a synthesized frame, as in the illustrative embodiment 1, the image processing unit 901 can copy the image data of the first image region r1-30 of the previous frame F1 (scenery) to synthesize the image data of the first image region r1-30 (scenery) and the image data of the image region R12-60 (the railway train and a part of the scenery) to thereby obtain the frame F2.

Figure 34:
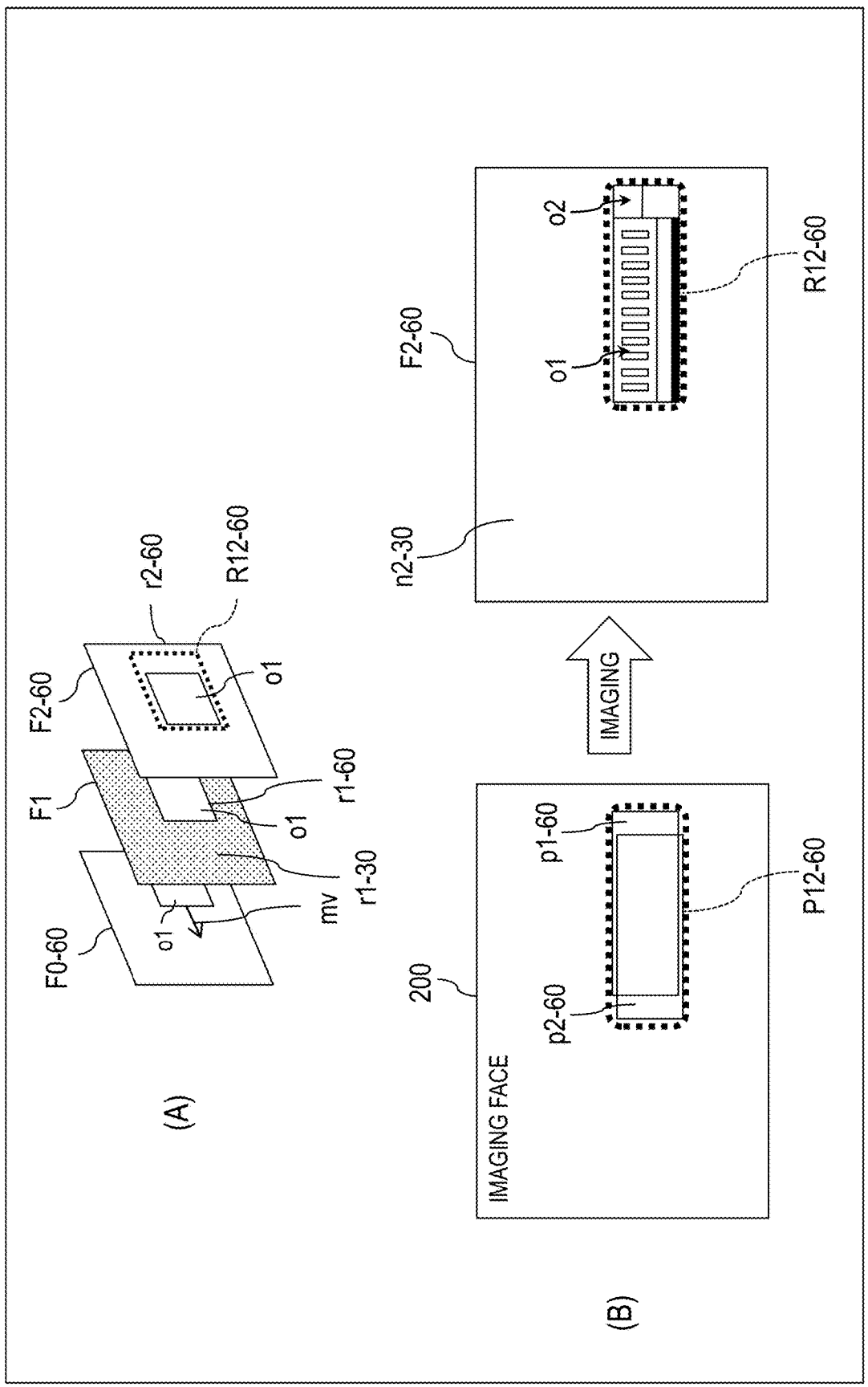
FIG. 34 illustrates the correspondence between the imaging region setting and the image region of the frame F2-60.

FIGS. 34(A) and 34(B) illustrate the correspondence between the imaging region setting and the image region of the frame F2-60. FIG. 34(A) illustrates an example of the detection of a motion vector. FIG. 34(B) illustrates the correspondence between the imaging region setting and the image region of the frame F2-60.

The imaging region p1-60 is an imaging region of an already-detected specific subject that is obtained after the generation of the frame F0-60 temporally previous to the frame F1 and prior to the generation of the frame F1. Thus, the frame F1 has the image data o1 of the specific subject (railway train) existing in the second image region r1-60 corresponding to the imaging region p1-60.

The preprocessing unit 1210 causes the detection unit 1211 to detect the motion vector my of the specific subject based on the image data o1 of the specific subject of the frame F0 and the image data o1 of the specific subject of the frame F1. Then, the preprocessing unit 1210 detects the second image region r2-60 of the next frame F2-60 in which the specific subject is displayed based on the second image region r1-60 of the specific subject of the frame F1 and the motion vector my and detects the detection imaging region p2-60 of the imaging face 200 of the imaging element 100 corresponding to the detected second image region r2-60.

The preprocessing unit 1210 causes the setting unit 1212 to set, during the generation of the frame F1, the frame rate of the specific imaging region P12-60 including the identified imaging region p1-60 and the detection imaging region p2-60 as the second frame rate to output the setting instruction to the imaging element 100. This allows the imaging element 100 to set the specific imaging region P12-60 to the second frame rate and to generate the frame F2-60.

The image processing unit 901 causes the synthesis unit 1214 to synthesize the image data of the first image region r1-30 included in the frame F1 and the image data of the specific imaging region P12-60 included in the second frame F2-60 generated by the imaging operation at the second frame rate set by the setting unit 1212. As a result, the frame F2-60 is updated as the frame F2.

It is noted that, after the generation of the frame F2-60 and prior to the generation of the next frame F3, the preprocessing unit 1210 sets the frame rate of the detection imaging region p2-60 to the second frame rate. The frame rates of other imaging regions other than the detection imaging region p2-60 of the imaging face 200 is set as the first frame rate. This allows, in the generation of the frame F3 obtained through the imaging operation including the imaging region of the first frame rate, the second imaging region in which the second frame rate is set is detection imaging region p2-60 only as in the frame F1. This allows the specific detection imaging region to be set for the frames F2-60, F4-60, . . . as a synthesis target, thus suppressing the wasteful processing in the frames F1, F3, . . . .

The frame F2-60 is configured so that the image region R12-60 includes the image data o1 of the specific subject (railway train) and the image data o2 of a part of the scenery. In this manner, the image region R12-60 is configured, when compared with the second image region r2-60, so as to be expanded at the opposite side to the direction along which the specific subject moves. Thus, there is no need as in the illustrative embodiment 2 to identify the ranges Da1 and Da2 to copy and synthesize the image data of the ranges Db1 and Db2 of other frames. It is noted that the synthesis processing of the illustrative embodiment 3 is executed in Step S1805 of FIG. 18 for example. This synthesis processing is applied to the synthesis of the frames F2-60, F4-60, . . . having the second frame rate only and is not executed for the frames F1, F3, . . . including the image region of the first frame rate.

As described above, in the illustrative embodiment 3, the image data as a synthesis source is composed of two image regions of the image region R12-60 and the first image region r1-30 of the frame F1. Thus, the frame F2 causing a lower sense of incongruity can be generated. Specifically, the pieces of image data o1 and o2 are image data imaged at the same timing. Thus, the pieces of image data o1 and o2 have therebetween a boundary that is not unnatural and that causes no sense of incongruity. Furthermore, the illustrative embodiment 3 does not require the processing as in the illustrative embodiment 2 to identify the ranges Da1 and Da2 and to select an optimal range from among the ranges Da1 and Da2. This can consequently reduce the synthesis processing load on the frame F2.

(3-1) As described above, the imaging apparatus according to the illustrative embodiment 3 has the imaging element 100, the detection unit 1211, and the setting unit 1212. The imaging element 100 has the first imaging region to image a subject and the second imaging region to image a subject. The first imaging region can have the first frame rate (e.g., 30 [fps]) and the second imaging region can have the second frame rate higher than the first frame rate (e.g., 60 [fps]).

The detection unit 1211 detects the detection imaging region p2-60 of the specific subject in the imaging element 100 based on the second image region r1-60 of the specific subject included in the frame F1 generated based on the output from the imaging element 100. The setting unit 1212 sets, as the second frame rate, the frame rate of the specific imaging region P12-60 that includes the imaging region p1-60 of the specific subject used for the generation of the frame F1 and the imaging region detected by the detection unit 1211 (hereinafter referred to as detection imaging region) p2-60.

Thus, the imaging region of the second frame rate can be set in an expanded manner in such a manner that the specific subject can be imaged at the second frame rate so that the frames F1 and F2 do not have the range Da1 in which non-image regions are overlapped, thus providing the suppression of the missing image of the frame F2-60 imaged at the second frame rate.

(3-2) Furthermore, in the above (3-1) imaging apparatus, the detection unit 1211 detects the detection imaging region p2-60 of the specific subject based on the second image region r1-60 of the specific subject included in the frame F1 and the motion vector my of the specific subject between the frame F1 and the frame F0-60 temporally previous to the frame F1.

This can realize the prediction of the detection imaging region p2-60 of the specific subject in an easy manner.

(3-3) Furthermore, in the above (3-1) imaging apparatus, the setting unit 1212 is configured, when the frame is the first frame F1 generated based on the output from the first imaging region, to set the frame rate of the specific imaging region to the second frame rate and to set, when the frame is the second frame F2-60 that is generated after the first frame F1 based on the output from the specific imaging region, the frame rate of the detection imaging region p2-60 to the second frame rate and to set the frame rates of imaging regions other than the detection imaging region p2-60 (a part of the imaging face 200 excluding the detection imaging region p2-60) to the first frame rate.

As a result, the specific detection imaging region only for the frames F2-60, F4-60, . . . as a synthesis target is set, thus suppressing the wasteful processing for the frames F1, F3, . . . .

(3-4) Furthermore, the image processing apparatus according to the illustrative embodiment 3 execute the image processing on the frame generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

This image processing apparatus has the detection unit 1211, the setting unit 1212, and the synthesis unit 1214. The detection unit 1211 detects the imaging region p2-60 of the specific subject in the imaging element 100 based on the second image region r1-60 of the specific subject included in the frame F1 generated based on the output from the imaging element 100. The setting unit 1212 sets the frame rate of the specific imaging region P12-60 including the imaging region p1-60 of the specific subject used for the generation of the frame F1 and the detection imaging region p2-60 detected by the detection unit 1211 to the second frame rate.

The synthesis unit 1214 synthesizes the image data of the first image region r1-30 included in the first frame F1 and the image data of the specific imaging region P12-60 included in the second frame F2-60 generated by the imaging at the second frame rate set by the setting unit 1212.

Thus, the imaging region of the second frame rate can be set in an expanded manner such that the specific subject can be imaged at the second frame rate so that the frames F1 and F2 do not have the range Da1 in which non-image regions are overlapped, thus providing the suppression of the missing image of the frame F2-60 imaged at the second frame rate. Furthermore, the interpolation of the overlapped range Da1 during the synthesis is not required, thus providing an image causing a lower sense of incongruity. Furthermore, the synthesis processing load also can be reduced.

(3-5) Furthermore, the video compression apparatus according to illustrative embodiment 3 compresses the video data including a plurality of frames generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

This video compression apparatus has the detection unit 1211, the setting unit 1212, the synthesis unit 1214, and the compression unit 902. The detection unit 1211 detects the imaging region p2-60 of the specific subject in the imaging element 100 based on the second image region r1-60 of the specific subject included in the frame F1 generated based on the output from the imaging element 100. The setting unit 1212 sets the frame rate of the specific imaging region P12-60 including the imaging region p1-60 of the specific subject used for the generation of the frame F1 and the imaging region p2-60 detected by the detection unit 1211 to the second frame rate.

The synthesis unit 1214 synthesizes the image data of the first image region r1-30 included in the first frame F1 and the image data of the specific imaging region P12-60 included in the second frame F2-60 generated by the imaging at the second frame rate set by the setting unit 1212. The compression unit 902 compresses the first frame F1 and the second frame F2 after the synthesis obtained by the synthesis unit 1214.

Thus, the imaging region of the second frame rate can be set in an expanded manner in such a manner that the specific subject can be imaged at the second frame rate so that the frames F1 and F2 do not have the range Da1 in which non-image regions are overlapped, thus providing the suppression of the missing image of the frame F2-60 imaged at the second frame rate. Furthermore, the interpolation of the overlapped range Da1 during the synthesis is not required, thus providing an image causing a lower sense of incongruity. Furthermore, the synthesis processing load also can be reduced. Furthermore, the frame F2-60 is updated as the frame F2 and the frame F2 is subsequently updated. Thus, a difference between the frames F1 and F2 can be minimized, thus providing a reduced compression processing load.

(3-6) Furthermore, the setting program according to the illustrative embodiment 3 causes the processor 1201 to execute the control of the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

The setting program causes the processor 1201 to execute a detection processing and a setting processing. In the detection processing, the setting program causes the processor 1201 to detect the imaging region p2-60 of the specific subject in the imaging element 100 based on the second image region r1-60 of the specific subject included in the frame F1 generated based on the output from the imaging element 100. In the setting processing, the setting program causes the processor 1201 to set the frame rate of the specific imaging region P12-60 including the imaging region p1-60 of the specific subject used for the generation of the frame F1 and the detection imaging region p2-60 detected by the detection processing to the second frame rate.

Thus, the imaging region of the second frame rate can be set in an expanded manner such that the specific subject can be imaged at the second frame rate so that the frames F1 and F2 do not have the range Da1 in which non-image regions are overlapped, thus providing the suppression of the missing image of the frame F2-60 imaged at the second frame rate by software.

(3-7) Furthermore, the image processing program according to the illustrative embodiment 3 causes the processor 1201 to execute the image processing of frames generated based on the output from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

The image processing program causes the processor 1201 to execute the detection processing, the setting processing, and the synthesis processing. In the detection processing, the image processing program causes the processor 1201 to detect the imaging region p2-60 of the specific subject in the imaging element 100 based on the second image region r1-60 of the specific subject included in the frame F1 generated based on the output from the imaging element 100. In the setting processing, the image processing program causes the processor 1201 to set the frame rate of the specific imaging region P12-60 including the imaging region p1-60 of the specific subject used for the generation of the frame F1 and the detection imaging region p2-60 detected by the detection processing to the second frame rate.

In the synthesis processing, the image processing program causes the processor 1201 to synthesize the image data of the first image region r1-30 included in the first frame F1 and the image data of the specific imaging region P12-60 included in the second frame F2-60 generated by the imaging at the second frame rate set by the setting processing.

Thus, the imaging region of the second frame rate can be set in an expanded manner in such a manner that the specific subject can be imaged at the second frame rate so that the frames F1 and F2 do not have the range Da1 in which non-image regions are overlapped, thus realizing, by software, the suppression of the missing image of the frame F2-60 imaged at the second frame rate. Furthermore, the interpolation of the overlapped range Da1 during the synthesis is not required, thus providing an image causing a lower sense of incongruity. Furthermore, the synthesis processing load also can be reduced by software. Furthermore, the frame F2-60 is updated as the frame F2 and the frame F2 is subsequently compressed. Thus, a difference between the frames F1 and F2 can be minimized, thus realizing a reduced compression processing load by software.

(3-8) Furthermore, the video compression program according to the illustrative embodiment 3 causes the processor 1201 to execute the compression of video data including a plurality of frames outputted from the imaging element 100 that has the first imaging region to image a subject and the second imaging region to image a subject and for which the first frame rate (e.g., 30 [fps]) can be set for the first imaging region and the second frame rate higher than the first frame rate (e.g., 60 [fps]) can be set for the second imaging region.

This video compression program causes the processor 1201 to execute the detection processing, the setting processing, the synthesis processing, and the compression processing. In the detection processing, the video compression program causes the processor 1201 to detect the imaging region p2-60 of the specific subject in the imaging element 100 based on the second image region r1-60 of the specific subject included in the frame F1 generated based on the output from the imaging element 100. In the setting processing, the video compression program causes the processor 1201 to set the frame rate of the specific imaging region P12-60 including the imaging region p1-60 of the specific subject used for the generation of the frame F1 and the detection imaging region p2-60 detected by the detection processing to the second frame rate.

In the synthesis processing, the video compression program causes the processor 1201 to synthesize the image data of the first image region r1-30 included in the first frame F1 and the image data of the specific imaging region P12-60 included in the second frame F2-60 generated by the imaging at the second frame rate set by the setting processing. In the compression processing, the video compression program causes the processor 1201 to compress the first frame F1 and the second frame F2 after the synthesis obtained by the synthesis processing.

Thus, the imaging region of the second frame rate can be set in an expanded manner in such a manner that the specific subject can be imaged at the second frame rate so that the frames F1 and F2 do not have the range Da1 in which non-image regions are overlapped, thus realizing, by software, the suppression of the missing image of the frame F2-60 imaged at the second frame rate. Furthermore, the interpolation of the overlapped range Da1 during the synthesis is not required, thus providing an image causing a lower sense of incongruity. Furthermore, the synthesis processing load also can be reduced by software. Furthermore, the frame F2-60 is updated as the frame F2 and the frame F2 is subsequently compressed. Thus, a difference between the frames F1 and F2 can be minimized, thus realizing a reduced compression processing load by software.

What is claimed is:

1. A video compression apparatus, comprising a processor and associated memory configured to:
    acquire video data including a plurality of frames outputted from an imaging element (i) that has a first imaging region to image a subject and a second imaging region to image a subject and (ii) for which a first frame rate can be set for the first imaging region and a second frame rate higher than the first frame rate can be set for the second imaging region;
    set, with regard to image data of the first imaging region, a specific motion vector showing that no motion exists in an object in the image data of the first imaging region;
    execute, with regard to image data of the second imaging region, detection of a motion vector;
    execute, with regard to the image data of the first imaging region, a motion compensation based on the specific motion vector; and
    execute, with regard to the image data of the second imaging region, a motion compensation based on the detected motion vector.

2. The video compression apparatus according to claim 1, wherein the processor is further configured to:
    generate, with regard to each of the plurality of frames, based on difference data between the frame and a prediction frame for predicting the frame, a reference frame referred to by a frame inputted temporally after the frame; and
    execute the motion compensation on the image data of the first imaging region based on the specific motion vector and the reference frame and execute the motion compensation on the image data of the second imaging region based on the detected motion vector and the reference frame.

3. A video compression apparatus comprising a processor and associated memory configured to:

acquire video data including a plurality of frames outputted from an imaging element (i) that has a first imaging region to image a subject and a second imaging region to image a subject and (ii) for which a first frame rate can be set for the first imaging region and a second frame rate higher than the first frame rate can be set for the second imaging region;

generate, with regard to each of the plurality of frames, based on difference data between the frame and a prediction frame for predicting the frame, a reference frame referred to by a frame inputted temporally after the frame;

execute detection of a motion vector on image data of the first imaging region and execute detection of a motion vector on image data of the second imaging region;

execute, with regard to the image data of the first imaging region, motion compensation based on the reference frame; and execute, with regard to the image data of the second imaging region, motion compensation based on the reference frame and the detected motion vector.

4. The video compression apparatus according to claim 3, wherein the processor is further configured to determine, with regard to the image data of the first imaging region, the reference frame as the prediction frame for predicting the frame temporally after the frame.

5. A video compression apparatus, further comprising a processor and associated memory configured to:

acquire video data including a plurality of frames outputted from an imaging element (i) that has a first imaging region to image a subject and a second imaging region to image a subject (ii) and for which a first frame rate can be set for the first imaging region and a second frame rate higher than the first frame rate can be set for the second imaging region; and compress the acquired video data based on a third frame and a fourth frame, the third frame being generated based on a first frame in the video data that is outputted from the first imaging region on first timing and a second frame in the video data that is outputted from the second imaging region on the first timing, and the fourth frame being generated based on the first frame outputted from the first imaging region on the first timing and a second frame outputted from the second imaging region on second timing different from the first timing.

6. The video compression apparatus according to claim 5, wherein the processor is further configured to:

update, based on (i) a first frame imaged by at least a first imaging region among the first imaging region for which the first frame rate is set and a second imaging region for which the second frame rate is set and (ii) a second frame imaged by the second imaging region temporally after the first frame among the plurality of frames, the second frame as a fifth frame obtained by synthesizing image data of the first imaging region in the first frame and image data of the second imaging region in the second frame; and update the second frame to the fifth frame by applying the image data of the second imaging region in the second frame to a range in the image data of the second imaging region in the second frame that is overlapped with the image data of the first imaging region in the first frame.

7. The video compression apparatus according to claim 6, wherein the processor is configured to update the second frame to the fifth frame by applying the image data of the second imaging region in the first frame to a range in the second frame that does not belong to any of the second imaging region in the second frame or the first imaging region in the first frame.

8. A video compression apparatus for compressing video data including a plurality of frames outputted from an imaging element (i) that has a first imaging region to image a subject and a second imaging region to image a subject and (ii) for which a first frame rate can be set for the first imaging region and a second frame rate higher than the first frame rate can be set for the second imaging region, the apparatus comprising a processor and associated memory configured to:

generate, with regard to respective ones of the plurality of frames and based on difference data between each frame and a prediction frame for predicting the frame, reference frames referred to by frames inputted temporally after the frame; and execute a motion compensation on a specific reference frame among the plurality of generated reference frames using a frame among the plurality of frames that was imaged by the second frame rate, wherein the respective plurality of frames includes at least image data of a first imaging region corresponding to the first imaging region for which the first frame rate is set, and the processor is configured to execute motion compensation on the image data of the first imaging region using, as the specific reference frame, one of the plurality of reference frames generated using a frame temporally previous to the frame.

9. A non-transitory computer-readable medium comprising a video compression program that causes a processor to execute:

acquisition processing to acquire video data including a plurality of frames outputted from an imaging element (i) that has a first imaging region to image a subject and a second imaging region to image a subject and (ii) for which a first frame rate can be set for the first imaging region and a second frame rate higher than the first frame rate can be set for the second imaging region; and compression processing to compress the video data acquired by the acquisition processing based on a third frame and a fourth frame, the third frame being generated based on a first frame in the video data that is outputted from the first imaging region on first timing and a second frame in the video data that is outputted from the second imaging region on the first timing, and the fourth frame being generated based on the first frame outputted from the first imaging region on the first timing and a second frame in the video data outputted from the second imaging region on second timing different from the first timing.

10. A non-transitory computer-readable medium comprising a video compression program that causes a processor to compress video data including a plurality of frames outputted from an imaging element (i) that has a first imaging region to image a subject and a second imaging region to image a subject and (ii) for which a first frame rate can be set for the first imaging region and a second frame rate higher than the first frame rate can be set for the second imaging region, the program causing the processor to execute:

generation processing to generate, with regard to respective ones of the plurality of frames and based on difference data between each frame and a prediction frame for predicting the frame, reference frames referred to by frames inputted temporally after the frame; and motion compensation processing to use a specific reference frame among the reference frames generated by the generation processing to execute the motion compensation on a frame imaged at the second frame rate among the plurality of frames, wherein the respective plurality of frames includes at least image data of a first imaging region corresponding to the first imaging region for which the first frame rate is set, and motion compensation is executed on the image data of the first imaging region using, as the specific reference frame, one of the plurality of reference frames generated using a frame temporally previous to the frame.

\* \* \* \* \*